(12) United States Patent
Tanaka et al.

(10) Patent No.: US 12,034,484 B2
(45) Date of Patent: Jul. 9, 2024

(54) OPTICAL COMMUNICATION NETWORK MANAGEMENT APPARATUS

(71) Applicant: NIPPON TELEGRAPH AND TELEPHONE CORPORATION, Tokyo (JP)

(72) Inventors: Takafumi Tanaka, Musashino (JP); Hideki Nishizawa, Musashino (JP); Tetsuro Inui, Musashino (JP); Seiki Kuwabara, Musashino (JP); Shuto Yamamoto, Musashino (JP); Seiji Okamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 162 days.

(21) Appl. No.: 17/797,743

(22) PCT Filed: Feb. 17, 2020

(86) PCT No.: PCT/JP2020/005952
§ 371 (c)(1),
(2) Date: Aug. 5, 2022

(87) PCT Pub. No.: WO2021/166015
PCT Pub. Date: Aug. 26, 2021

(65) Prior Publication Data
US 2023/0076671 A1    Mar. 9, 2023

(51) Int. Cl.
*H04B 10/27* (2013.01)
*H04B 10/07* (2013.01)
(Continued)

(52) U.S. Cl.
CPC ............ *H04B 10/27* (2013.01); *H04B 10/07* (2013.01); *H04L 41/14* (2013.01); *H04L 41/40* (2022.05)

(58) Field of Classification Search
CPC ......... H04B 10/07; H04B 10/27; H04L 41/14; H04L 41/40
(Continued)

(56) References Cited

U.S. PATENT DOCUMENTS 6,697,329 B1 * 2/2004 McAllister .............. H04L 45/22
370/235
2001/0033548 A1 * 10/2001 Saleh .................. H04J 14/0295
370/389
(Continued)

FOREIGN PATENT DOCUMENTS

JP    2011101140 A  *  5/2011
JP    2017034427 A  *  2/2017

OTHER PUBLICATIONS

"Establishment of fundamental technologies for advanced design and manufacturing in future industries", Strategic Proposal, Innovative Digital Twin, Center for Research and Development Strategy, Japan Science and Technology Agency, Mar. 2018.

*Primary Examiner* — Li Liu
(74) *Attorney, Agent, or Firm* — Harness, Dickey & Pierce, P.L.C.

(57) ABSTRACT

A virtual environment optical communication network is generated by setting configuration parameters of physical packages of a real environment optical communication network in package emulators that a computer program has virtually constructed to implement the physical packages, the real environment optical communication network being constructed by a plurality of node devices in which the physical packages are mounted, pieces of configuration data are generated based on pieces of resource data indicating resources required for optical paths detected based on acquired configuration parameters and a requested transmission mode, optical paths are set in the virtual environment optical communication network based on the generated
(Continued)

pieces of configuration data, and optical paths are set in the real environment optical communication network based on the pieces of configuration data that have been used to set the optical paths.

10 Claims, 27 Drawing Sheets

(51) Int. Cl.
*H04L 41/14* (2022.01)
*H04L 41/40* (2022.01)

(58) Field of Classification Search
USPC .................................. 398/25, 43, 45, 140
See application file for complete search history.

(56) References Cited

U.S. PATENT DOCUMENTS

| | | | | |
|---|---|---|---|---|
| 2015/0063802 A1* | 3/2015 | Bahadur | ............... | H04L 47/781 |
| | | | | 398/49 |
| 2016/0112327 A1* | 4/2016 | Morris | ................ | H04L 47/127 |
| | | | | 398/45 |
| 2021/0111959 A1* | 4/2021 | Shahriar | ................ | H04L 41/40 |

* cited by examiner

141

| INSTALLATION SITE | NODE NAME | PACKAGE NUMBER | PACKAGE TYPE | CAPACITY/ AMPLIFICATION FACTOR | SECURED RESOURCE CAPACITY | CONNECTION DESTINATION | SECTION LOSS |
|---|---|---|---|---|---|---|---|
| SITE A | NODE A | 1 | TPND | 400 G | 0 G | NODE B | 25 dB |
| SITE A | NODE A | 2 | TPND | 400 G | 0 G | NODE C | 30 dB |
| SITE A | NODE A | 3 | Amp | 30 dB | – | – | – |
| SITE B | NODE B | 1 | TPND | 400 G | 0 G | NODE A | 25 dB |
| SITE B | NODE B | 2 | TPND | 400 G | 0 G | NODE D | 20 dB |
| SITE B | NODE B | 3 | TPND | 200 G | 0 G | NODE C | 15 dB |
| SITE B | NODE B | 4 | Amp | 20 dB | – | – | – |
| SITE C | NODE C | 1 | TPND | 400 G | 0 G | NODE A | 30 dB |
| SITE C | NODE C | 2 | TPND | 400 G | 0 G | NODE D | 20 dB |
| SITE C | NODE C | 3 | TPND | 200 G | 0 G | NODE B | 15 dB |
| SITE C | NODE C | 4 | Amp | 15 dB | – | – | – |
| SITE D | NODE D | 1 | TPND | 400 G | 0 G | NODE B | 20 dB |
| SITE D | NODE D | 2 | TPND | 400 G | 0 G | NODE C | 20 dB |
| SITE D | NODE D | 3 | Amp | 20 dB | – | – | – |
| ... | ... | ... | ... | ... | ... | ... | ... |

FIG. 3

| TRANSMISSION MODE | START SITE | END SITE | CAPACITY |
|---|---|---|---|
| TRANSMISSION MODE 1 | SITE A | SITE D | 100 G |
| TRANSMISSION MODE 2 | SITE A | SITE B | 100 G |
| TRANSMISSION MODE 3 | SITE A | SITE C | 100 G |
| TRANSMISSION MODE 4 | SITE B | SITE C | 100 G |
| ⋮ | ⋮ | ⋮ | ⋮ |

| PATH IDENTIFICATION INFORMATION | TRANSMISSION MODE | START SITE | END SITE | PATH |
|---|---|---|---|---|
| 1 | TRANSMISSION MODE 1 | SITE A | SITE D | NODE A → NODE B → NODE D |
| 2 | TRANSMISSION MODE 1 | SITE A | SITE D | NODE A → NODE C → NODE D |
| 3 | TRANSMISSION MODE 1 | SITE A | SITE D | NODE A → NODE B → NODE C → NODE D |
| 4 | TRANSMISSION MODE 1 | SITE A | SITE D | NODE A → NODE C → NODE B → NODE D |

| PATH IDENTIFICATION INFORMATION | RESOURCE DATA | COST | STATE |
|---|---|---|---|
| 1 | NODE A : PkgNo. 1 : TPND : 100 G<br>NODE A : PkgNo. 3 : Amp : 30 dB<br>NODE B : PkgNo. 1 : TPND : 100 G<br>NODE B : PkgNo. 2 : TPND : 100 G<br>NODE B : PkgNo. 4 : Amp : 15 dB<br>NODE D : PkgNo. 1 : TPND : 100 G<br>NODE D : PkgNo. 3 : Amp : 20 dB | 1 | IDLE |
| 2 | NODE A : PkgNo. 2 : TPND : 100 G<br>NODE A : PkgNo. 3 : Amp : 30 dB<br>NODE C : PkgNo. 1 : TPND : 100 G<br>NODE C : PkgNo. 2 : TPND : 100 G<br>NODE C : PkgNo. 4 : Amp : 15 dB<br>NODE D : PkgNo. 2 : TPND : 100 G<br>NODE D : PkgNo. 3 : Amp : 20 dB | 1 | IDLE |
| 3 | NODE A : PkgNo. 1 : TPND : 100 G<br>NODE A : PkgNo. 3 : Amp : 30 dB<br>NODE B : PkgNo. 1 : TPND : 100 G<br>NODE B : PkgNo. 3 : TPND : 100 G<br>NODE B : PkgNo. 4 : Amp : 15 dB<br>NODE C : PkgNo. 3 : TPND : 100 G<br>NODE C : PkgNo. 2 : TPND : 100 G<br>NODE C : PkgNo. 4 : Amp : 20 dB<br>NODE D : PkgNo. 2 : TPND : 100 G<br>NODE D : PkgNo. 3 : Amp : 20 dB | 2 | IDLE |
| 4 | NODE A : PkgNo. 2 : TPND : 100 G<br>NODE A : PkgNo. 3 : Amp : 30 dB<br>NODE C : PkgNo. 1 : TPND : 100 G<br>NODE C : PkgNo. 3 : TPND : 100 G<br>NODE C : PkgNo. 4 : Amp : 15 dB<br>NODE B : PkgNo. 3 : TPND : 100 G<br>NODE B : PkgNo. 2 : TPND : 100 G<br>NODE B : PkgNo. 4 : Amp : 20 dB<br>NODE D : PkgNo. 1 : TPND : 100 G<br>NODE D : PkgNo. 3 : Amp : 20 dB | 2 | IDLE |

FIG. 6

| PATH IDENTIFICATION INFORMATION | CONFIGURATION DATA |
|---|---|
| 1 | (CONFIGURATION COMMANDS, SETTING ORDER DATA, AND TEST CHECKING PROCEDURE DATA FOR PATH IDENTIFICATION INFORMATION "1") |
| 2 | (CONFIGURATION COMMANDS, SETTING ORDER DATA, AND TEST CHECKING PROCEDURE DATA FOR PATH IDENTIFICATION INFORMATION "2") |
| 3 | (CONFIGURATION COMMANDS, SETTING ORDER DATA, AND TEST CHECKING PROCEDURE DATA FOR PATH IDENTIFICATION INFORMATION "3") |
| 4 | (CONFIGURATION COMMANDS, SETTING ORDER DATA, AND TEST CHECKING PROCEDURE DATA FOR PATH IDENTIFICATION INFORMATION "4") |

| PATH IDENTIFICATION INFORMATION | TEST RESULTS OF OPERATION CHECKING TEST PROCESS IN REAL ENVIRONMENT | PROCESSING TIME |
|---|---|---|
| 1 | (TEST RESULT OF PATH IDENTIFICATION INFORMATION "1") | 00:10:00 |
| 2 | (TEST RESULT OF PATH IDENTIFICATION INFORMATION "2") | 00:20:00 |
| 3 | (TEST RESULT OF PATH IDENTIFICATION INFORMATION "3") | 00:30:00 |
| 4 | (TEST RESULT OF PATH IDENTIFICATION INFORMATION "4") | 00:40:00 |

221

222

| PATH IDENTIFICATION INFORMATION | TEST RESULTS OF OPERATION CHECKING TEST PROCESS IN VIRTUAL ENVIRONMENT |
|---|---|
| 1 | (TEST RESULT OF PATH IDENTIFICATION INFORMATION "1") |
| 2 | (TEST RESULT OF PATH IDENTIFICATION INFORMATION "2") |
| 3 | (TEST RESULT OF PATH IDENTIFICATION INFORMATION "3") |
| 4 | (TEST RESULT OF PATH IDENTIFICATION INFORMATION "4") |

| MAIN LINE PATH IDENTIFICATION INFORMATION | REDUNDANT LINE PATH IDENTIFICATION INFORMATION | WEIGHT (0 TO 10) |
|---|---|---|
| 1 | 2 | 10 |
|   | 3 | 5 |
|   | 4 | 5 |
| 2 | 1 | 10 |
|   | 3 | 5 |
|   | 4 | 5 |
| 3 | 1 | 5 |
|   | 2 | 5 |
|   | 4 | 10 |
| 4 | 1 | 5 |
|   | 2 | 5 |
|   | 3 | 10 |

FIG. 25

OPTICAL COMMUNICATION NETWORK MANAGEMENT APPARATUS

CROSS-REFERENCE TO RELATED APPLICATIONS

This application is a 371 U.S. National Phase of International Application No. PCT/JP2020/005952, filed on Feb. 17, 2020. The entire disclosure of the above application is incorporated herein by reference.

TECHNICAL FIELD

The present invention relates to an optical communication network management apparatus that manages optical communication networks in virtual and real environments.

BACKGROUND ART

In order to start up and maintain an optical communication network, it is necessary to determine a connection configuration of the optical communication network and perform transmission design and accommodation design. First, measured physical parameters are input to a simulator to design an optical path and configuration commands to be set in physical packages of a communication device are generated from values obtained through the design. Then, the communication device is installed on site and the configuration commands are set in the physical packages of the communication device to perform a test.

Meanwhile, attempts have been made to construct an actual device or system by virtually implementing the device or system by a computer program using a technology called a digital twin rather than using the actual device as described above and performing a test such as intentionally causing a failure in the implemented virtual environment to improve the quality of parameters to be set or the like (see, for example, NPD 1).

CITATION LIST

Non Patent Document

NPD 1: Environment and Energy Unit, Center for Research and Development Strategy, Japan Science and Technology Agency, "STRATEGIC PROPOSAL, Innovative Digital Twin,—Establishment of fundamental technologies for advanced design and manufacturing in future industries—," Center for Research and Development Strategy, Japan Science and Technology Agency, March 2018, [Retrieved Jan. 13, 2020], Internet (URL: https://www.jst.go.jp/crds/pdf/2017/SP/CRDS-FY2017-SP-01.pdf)

SUMMARY OF THE INVENTION

Technical Problem

In constructing an optical communication network, a test is performed using a simulator or the like before an actual communication device is set as mentioned above. However, an actual optical communication network is constructed by connecting a plurality of communication devices to each other. Thus, there is a problem that actually setting a plurality of communication devices may cause an unexpected fault that cannot be detected by the simulator in advance.

To improve quality, it is conceivable to intentionally cause a failure in the actual optical communication network such that optical paths that are running are not affected to optimize the configuration of the optical communication network. However, in an optical communication network in which a plurality of communication devices are connected to each other, an unexpected fault may occur affecting optical paths that are running. Thus, there is a problem that it is difficult to easily perform optimization using an actual optical communication network.

It is desired to introduce the digital twin technology described above to optical communication networks as a means for solving the above problems, which requires a management apparatus that can maintain the states of an optical communication network in a virtual environment closer to the states of an optical communication network in a real environment.

In view of the above circumstances, it is an object of the present invention to provide a technology capable of maintaining the states of a virtual environment optical communication network closer to the states of a real environment optical communication network.

Means for Solving the Problem

An aspect of the present invention provides an optical communication network management apparatus including a virtual environment configuration management unit configured to generate a virtual environment optical communication network by setting configuration parameters of physical packages of a real environment optical communication network in package emulators that a computer program has virtually constructed to implement the physical packages, the real environment optical communication network being constructed by a plurality of node devices in which the physical packages are mounted, a configuration generation unit configured to generate pieces of configuration data based on pieces of resource data indicating resources required for optical paths detected based on the configuration parameters and a requested transmission mode, a virtual environment optical path setting unit configured to set the optical paths in the virtual environment optical communication network based on the pieces of configuration data generated by the configuration generation unit, and a real environment optical path setting unit configured to set the optical paths in the real environment optical communication network based on the pieces of configuration data that have been used to set the optical paths.

Effects of the Invention

According to the present invention, the states of the virtual environment optical communication network can be maintained closer to the states of the real environment optical communication network.

BRIEF DESCRIPTION OF DRAWINGS

FIG. 3 is a diagram showing a configuration of a configuration parameter table according to the first embodiment.

FIG. 4 is a diagram showing a configuration of transmission mode data according to the first embodiment.

FIG. 5 is a diagram showing a configuration of a transmission design table according to the first embodiment.

FIG. 6 is a diagram showing a configuration of a resource table according to the first embodiment.

FIG. 7 is a diagram showing a configuration of an optical path configuration table according to the first embodiment.

FIG. 8 is a diagram showing a configuration of a real environment test result table of the first embodiment.

FIG. 13 is a diagram showing a configuration of a virtual environment test result table of the second embodiment.

FIG. 25 is a diagram showing a configuration of a redundant line table according to the sixth embodiment.

DESCRIPTION OF EMBODIMENTS

First Embodiment

Figure 1:
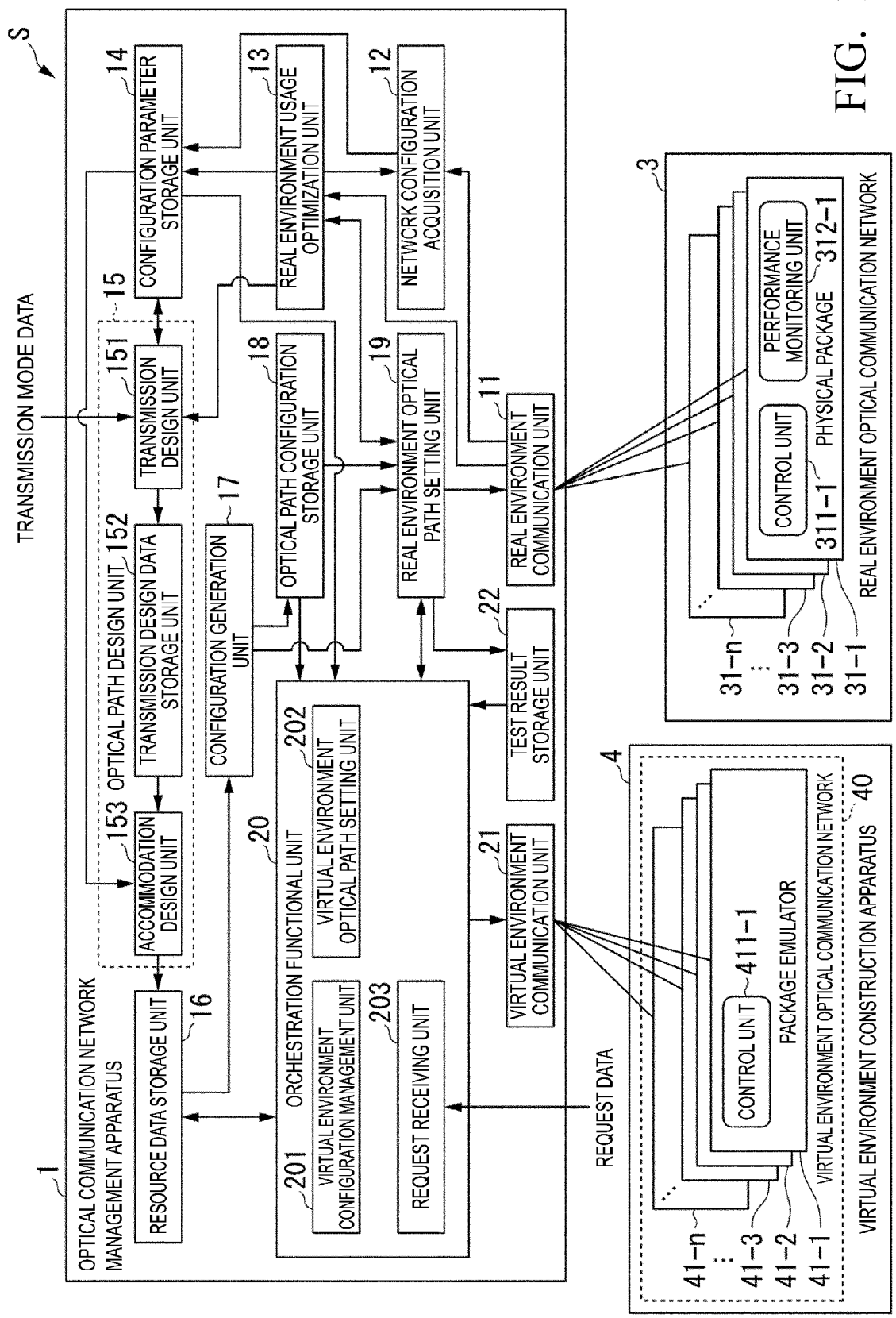
FIG. 1 is a block diagram illustrating a configuration of an optical communication network management system according to a first embodiment.

Hereinafter, embodiments of the present invention will be described with reference to the drawings. FIG. 1 is a block diagram illustrating a configuration of an optical communication network management system S according to a first embodiment. The optical communication network management system S includes an optical communication network management apparatus 1, a real environment optical communication network 3, and a virtual environment construction apparatus 4.

Figure 2:
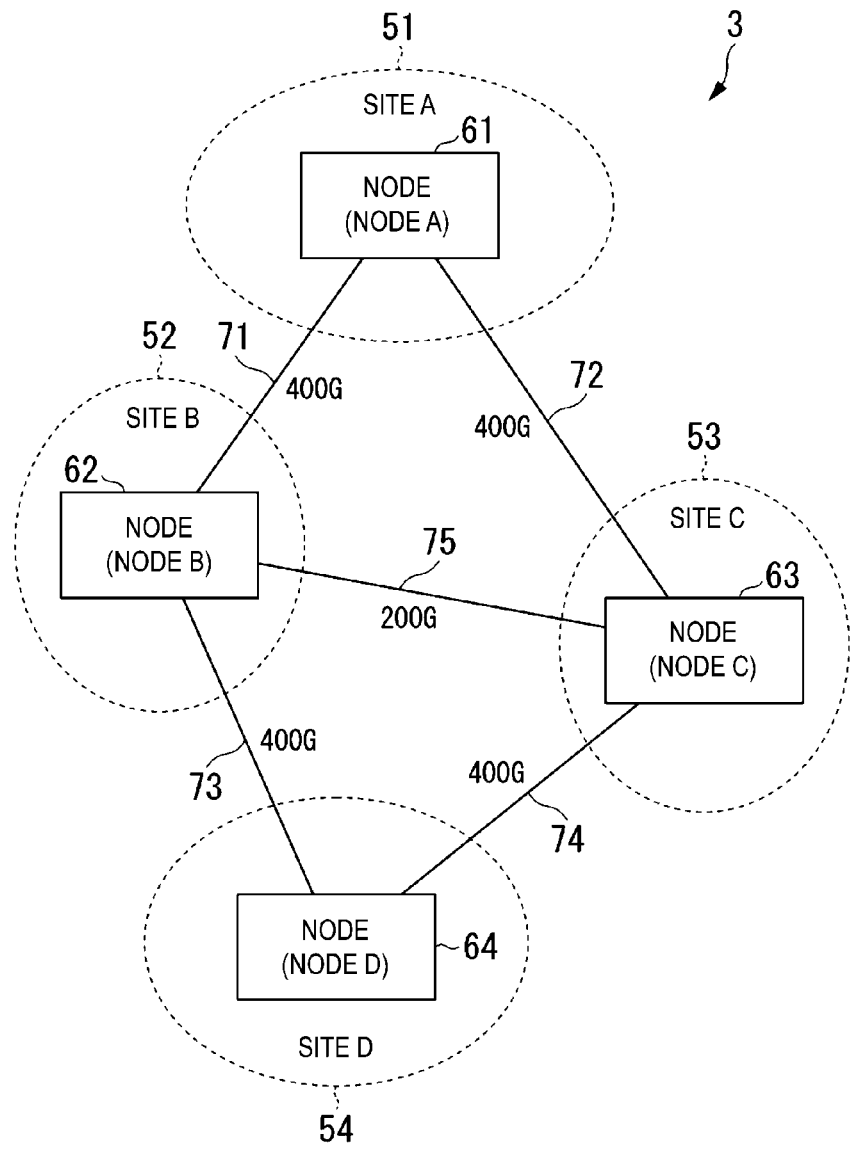
FIG. 2 is a (first) block diagram illustrating an example of a configuration of a real environment optical communication network of the first embodiment.

The real environment optical communication network 3 is an optical communication network in which communication services actually run. The real environment optical communication network 3 includes, for example, a plurality of node devices 61 to 64 as illustrated in FIG. 2 and optical fiber transmission lines 71 to 75 connecting the node devices 61 to 64. Only physical packages 31-1, 31-2, . . . , 32-$n$ including hardware such as transponders and amplifiers mounted in the plurality of node devices 61 to 64 of the real environment optical communication network 3 are illustrated in FIG. 1. Here, n is an integer of at least 2 or greater.

The physical packages 31-1 to 31-$n$ include control units 311-1 to 311-$n$ and performance monitoring units 312-1 to 312-$n$, respectively. The control units 311-1 to 311-$n$ control processes performed on hardware included in the physical packages 31-1 to 31-$n$, respectively. For example, each of the control units 311-1 to 311-$n$ control a process of setting an optical path and a process of changing the amplification factor of an amplifier. The control units 311-1 to 311-$n$ are functional units constructed by processing circuits such as central processing units (CPUs) or field programmable gate arrays (FPGAs), included in the physical packages 31-1 to 31-$n$, executing so-called manager applications which control processing of the physical packages 31-1 to 31-$n$.

The performance monitoring units 312-1 to 312-$n$ measure communication qualities such as the losses of optical paths set in the physical packages 31-1 to 31-$n$, the optical signal to noise ratios (OSNRs) thereof, the input/output optical levels of the physical packages, the excitation currents of optical amplifiers, and the optical level of each wavelength. In the following description, any of the physical packages 31-1 to 31-$n$ will sometimes be referred to as a physical package 31 with a number following the hyphen omitted. Similarly, any of the control units 311-1 to 311-$n$ will sometimes be referred to as a control unit 311 with a number following the hyphen omitted. Similarly, any of the performance monitoring units 312-1 to 312-$n$ will sometimes be referred to as a performance monitoring unit 312 with a number following the hyphen omitted.

The virtual environment construction apparatus 4 is, for example, a server apparatus including a CPU, a memory, and the like. The CPU executes computer programs that virtually implement the physical packages 31-1 to 31-$n$. The computer programs include manager applications for constructing the control units 311-1 to 311-$n$ of the physical packages 31-1 to 31-$n$. Executing the computer programs provides the virtual environment construction apparatus 4 with package emulators 41-1 to 41-$n$ that virtually implement the physical packages 31-1 to 31-$n$. The package emulators 41-1 to 41-$n$ construct a virtual environment optical communication network 40 that virtually implements the real environment optical communication network 3 illustrated in FIG. 2.

The package emulators 41-1 to 41-$n$ include control units 411-1 to 411-$n$, respectively. The control units 411-1 to 411-*n* are functional units that are constructed by executing the manager applications included in the computer programs that virtually implement the physical packages 31-1 to 31-*n* and virtually implement the control units 311-1 to 311-*n*, respectively. The control units 411-1 to 411-*n* control processes performed by the package emulators 41-1 to 11-*n*, for example, a process of setting an optical path. In the following description, any of the package emulators 41-1 to 41-*n* will sometimes be referred to as a package emulator 41 with a number following the hyphen omitted. Similarly, any of the control units 411-1 to 411-*n* will sometimes be referred to as a control unit 411 with a number following the hyphen omitted.

The optical communication network management apparatus 1 includes a real environment communication unit 11, a network configuration acquisitor 12, a real environment usage optimization unit 13, a configuration parameter storage unit 14, an optical path designer 15, a resource data storage unit 16, a configuration generator 17, an optical path configuration storage unit 18, a real environment optical path setter 19, an orchestration functional unit 20, a virtual environment communication unit 21, and a test result storage unit 22.

The real environment communication unit 11 transmits and receives data to and from each of the control units 311-1 to 311-*n* and each of the performance monitoring units 312-1 to 312-*n*. The network configuration acquisition unit 12 connects to each of the control units 311-1 to 311-*n* via the real environment communication unit 11. The network configuration acquisition unit 12 acquires configuration parameters of the physical packages 31-1 to 31-*n* collected by the control units 311-1 to 311-*n*.

The real environment usage optimization unit 13 connects to each of the performance monitoring units 312-1 to 312-*n* via the real environment communication unit 11. The real environment usage optimization unit 13 receives communication quality data indicating communication qualities measured and output by each of the performance monitoring units 312-1 to 312-*n*. The real environment usage optimization unit 13 optimizes the configuration parameters stored in the configuration parameter storage unit 14 by changing the configuration parameters as necessary based on the received communication quality data.

The configuration parameter storage unit 14 stores a configuration parameter table 141 in which configuration parameters acquired by the network configuration acquisition unit 12 are recorded. The configuration parameter table 141 has, for example, a data format shown in FIG. 3 with fields of "installation site," "node name," "package number," "package type," "capacity/amplification factor," "secured resource capacity," "connection destination," and "section loss."

The configuration parameter table 141 shown in FIG. 3 shows an example in which configuration parameters acquired from the physical packages 31-1 to 31-*n* that construct the real environment optical communication network 3 illustrated in FIG. 2 are recorded as an example.

The real environment optical communication network 3 illustrated in FIG. 2 has four node devices 61 to 64 as described above. The node devices 61 to 64 are given the names of "node A," "node B," "node C," and "node D" in advance, respectively. The node devices 61 to 64 are installed at sites 51 to 54, respectively, which are given the names of "site A," "site B," "site C," and "site D" in advance, respectively.

In the configuration parameter table 141, the names of the sites 51 to 54 such as site A and site B are written in the "installation site" field. The names given to the node devices 61 to 64 such as node A and node B are written in the "node name" field. The package numbers assigned to the physical packages 31-1 to 31-*n* included in the node devices 61 to 64 are written in the "package number" field. For example, the package numbers for each of the node devices 61 to 64 are assigned independent serial numbers in advance.

In the "package type" field, the types of the physical packages 31-1 to 31-*n*, for example, a type "TPND" for each physical package 31 which is a transponder for transmitting and receiving optical signals and a type "Amp" for each physical package 31 for amplification, are written. In the "capacity/amplification factor" field, a total available communication capacity is written in gigabits/second such as 400 G (gigabits/second) for each physical package 31 which is a transponder and an amplification factor is written in dB for each physical package 31 for amplification. It is assumed that other physical packages include an optical switch such as a wavelength selective switch (WSS) for optical add/drop multiplexing, an optical coupler for optical splitting, an optical attenuator for optical level adjustment, a dispersion compensation device for optical signal distortion correction, optical supervisory channel (OSC) monitoring and control equipment, and the like. It is also assumed that sensors for measuring environments in which the device is placed such as a temperature sensor, a humidity sensor, and an acceleration sensor are also included as physical packages.

In the "secured resource capacity" field, a communication capacity secured as a resource is written in gigabits/sec for each physical package 31 which is a transponder, while the field is blank for each physical package 31 for amplification. In the "connection destination" field for each physical package 31 which is a transponder, the name of a node device 61 to 64 that is a connection destination to which the physical package 31 is connected by an optical fiber transmission line 71 to 75 is written, while the field is blank for each physical package 31 for amplification.

In the "section loss" field for each physical package 31 which is a transponder, a transmission loss between the physical package 31 and a physical package 31 which is another transponder connected to it by an optical fiber transmission line 71 to 75 is written in dB.

The optical path design unit 15 extracts optical paths based on configuration parameters stored in the configuration parameter table 141 and transmission mode data given from the outside and detects resources required to accommodate the extracted paths. The optical path design unit 15 includes a transmission design unit 151, a transmission design data storage unit 152, and an accommodation design unit 153.

The transmission design unit 151 performs transmission design processing for optical paths based on the transmission mode data given from the outside and the configuration parameters stored in the configuration parameter table 141 and generates pieces of transmission design data for the paths. The transmission mode data is, for example, data in a data format shown in FIG. 4, and is composed of data on "transmission mode," "start site," "end site," and "capacity." The "transmission mode" data includes pieces of transmission mode identification information such as "transmission mode 1" and "transmission mode 2" from which it is possible to identify the transmission modes. Here, the "transmission mode" includes a modulation method, a baud rate, an error correction code, the number of carriers, and the like which are parameters relating to optical transmission (Reference: Japan Patent Application No. 2018-148920 titled "Optical transmission system and transmission mode selection method"). The "start site" data includes the name of the start site of the optical path. The "end site" data includes the name of the end site of the optical path. The "capacity" data includes a communication capacity expressed in gigabits/second.

The transmission design data storage unit 152 stores a transmission design table 1521 in which the pieces of transmission design data generated by the transmission design unit 151 are recorded. The transmission design table 1521 has, for example, a data structure shown in FIG. 5 with fields of "path identification information," "transmission mode," "start site," "end site," and "path."

In the "path identification information" field, pieces of path identification information from which it is possible to identify paths that the transmission design unit 151 has detected through a transmission design process are written. In the "transmission mode" field, pieces of transmission mode identification information corresponding to the pieces of transmission design data are written. In the "start site" field, the names of the start sites of optical paths corresponding to the pieces of transmission design data are written. In the "end site" field, the names of the end sites of the optical paths corresponding to the pieces of transmission design data are written. In the "path" field, path data indicated by the names of node devices 61 to 64 forming each path from the start to end that the transmission design unit 151 has detected through the transmission design process is written.

The accommodation design unit 153 performs an accommodation design process for detecting resources required for the pieces of transmission design data stored in the transmission design table 1521 based on both the configuration parameters stored in the configuration parameter table 141 of the configuration parameter storage unit 14 and the already secured resources recorded in the resource data storage unit 16. The accommodation design unit 153 generates pieces of resource data indicating the resources detected through the accommodation design process.

The resource data storage unit 16 stores a resource table 161 in which the pieces of resource data generated by the accommodation design unit 153 are recorded. The resource table 161 has, for example, a data structure shown in FIG. 6 with fields of "path identification information," "resource data," "cost," and "status."

In the "path identification information" field, pieces of path identification information are written. In the "resource data" field, pieces of resource data required for setting optical paths corresponding to the pieces of path identification information are written. As shown in FIG. 6, a piece of resource data is, for example, data including a combination of the names of required node devices 61 to 64, information indicating package numbers and types indicating physical packages 31-1 to 31-n required for each of the required node devices 61 to 64, and the values of the communication capacity and the amplification factor required for the required physical packages 31-1 to 31-n.

In the "cost" field, values indicating the costs of the paths corresponding to the pieces of path identification information are written. Here, a cost is, for example, a value represented as the number of relay node devices 61 to 64 on a path from a start node device 61 to 64 to an end node device 61 to 64.

In the "status" field, information indicating the usage status of an optical path corresponding to each piece of path identification information is written. When the optical path is not being used, "idle" is written. When the optical path is being used, "busy" is written. When the optical path cannot be used due to a fault or the like, "disabled" is written.

The configuration generation unit 17 generates a piece of configuration data to be applied to the physical packages 31-1 to 31-n and the package emulators 41-1 to 41-n based on a piece of resource data that the resource data storage unit 16 stores for each piece of path identification information. A piece of configuration data includes configuration commands for performing setting on the physical packages 31-1 to 31-n and the package emulators 41-1 to 41-n, setting order data indicating the setting order of the configuration commands, and test checking procedure data indicating the procedure of performing a test, which is performed when the configuration commands have been set, and checking a result of the test.

Here, the test and the test checking include, for example, a test such as testing and determining whether the optical path is conducting or measuring the OSNR and the like when the optical path is conducting. A configuration command included in the configuration data is also used to release the optical path.

The configuration generation unit 17 stores various configuration command templates such as those for setting optical paths for each type of physical packages 31-1 to 31-n in an internal storage area in advance. The configuration generation unit 17 selects configuration command templates corresponding to physical packages 31-1 to 31-n included in the piece of resource data from the configuration command templates and applies communication capacities and an amplification factors, which are to be set, to the selected configuration command templates to generate configuration commands.

For example, when an optical path between the node devices 61 and 62 is set, it is necessary to predetermine the setting order of configuration commands for the node devices 61 to 64, for example, such that after a configuration command is set for the node device 61, the next configuration command must be set for the node device 62. The configuration generation unit 17 stores data indicating such conditions of the setting order in the internal storage area in advance. The configuration generation unit 17 generates setting order data for the generated configuration commands based on the data indicating the conditions of the setting order.

The configuration generation unit 17 stores a test applied to be applied to each configuration command and test checking procedure data indicating the procedure of checking the test in the internal storage area in advance. The configuration generation unit 17 selects test checking procedure data corresponding to the generated configuration commands. The configuration generation unit 17 generates a piece of configuration data by combining the generated configuration commands, the generated setting order data, and the selected test checking procedure data.

The optical path configuration storage unit 18 stores an optical path configuration table 181 in which pieces of optical path configuration data generated by the configuration generation unit 17 are recorded. The optical path configuration table 181 has, for example, a data structure shown in FIG. 7 with fields of "path identification information" and "configuration data." In the "path identification information" field, pieces of path identification information are written. In the "configuration data" field, pieces of configuration data, each including configuration commands used to set an optical path corresponding to a piece of path identification information, setting order data indicating the setting order of the configuration commands, and test checking procedure data corresponding to the configuration commands, are written.

The real environment optical path setting unit 19 sets an optical path in the real environment optical communication network 3 based on each piece of configuration data stored in the optical path configuration table 181 of the optical path configuration storage unit 18, and if necessary, performs an operation checking test process for the set optical path.

The virtual environment communication unit 21 transmits and receives data to and from the virtual environment construction apparatus 4. The orchestration functional unit 20 includes a request receiving unit 203, a virtual environment configuration manager 20, and a virtual environment optical path setter 202. The request receiving unit 203 receives request data given from the outside which requests that optical paths be set and detects pieces of idle path identification information of optical paths, which match a condition specified in the request data, from the resource table 161.

The virtual environment configuration management unit 201 connects to the virtual environment communication unit 21 and generates package emulators 41-1 to 41-n in the virtual environment construction apparatus 4 based on configuration parameters stored in the configuration parameter table 141 of the configuration parameter storage unit 14, thereby constructing the virtual environment optical communication network 40.

The virtual environment optical path setting unit 202 sets an optical path in the virtual environment optical communication network 40 based on each piece of configuration data stored in the optical path configuration table 181 of the optical path configuration storage unit 18, and if necessary, performs an operation checking test process for the set optical path.

The test result storage unit 22 stores a real environment test result table 221. The real environment test result table 221 has a data structure shown in FIG. 8 with fields of "path identification information," "test result of operation checking test process in real environment," and "processing time." In the "path identification information" field, pieces of path identification information are written. In the "test result of operation checking test process in real environment" field, the test results of an operation checking test process that the real environment optical path setting unit 19 has performed based on test checking procedure data included in the pieces of configuration data are written. In the "processing time" field, the processing times when the real environment optical path setting unit 19 has performed the operation checking test process based on the test checking procedure data included in the pieces of configuration data are written.

Figure 9:
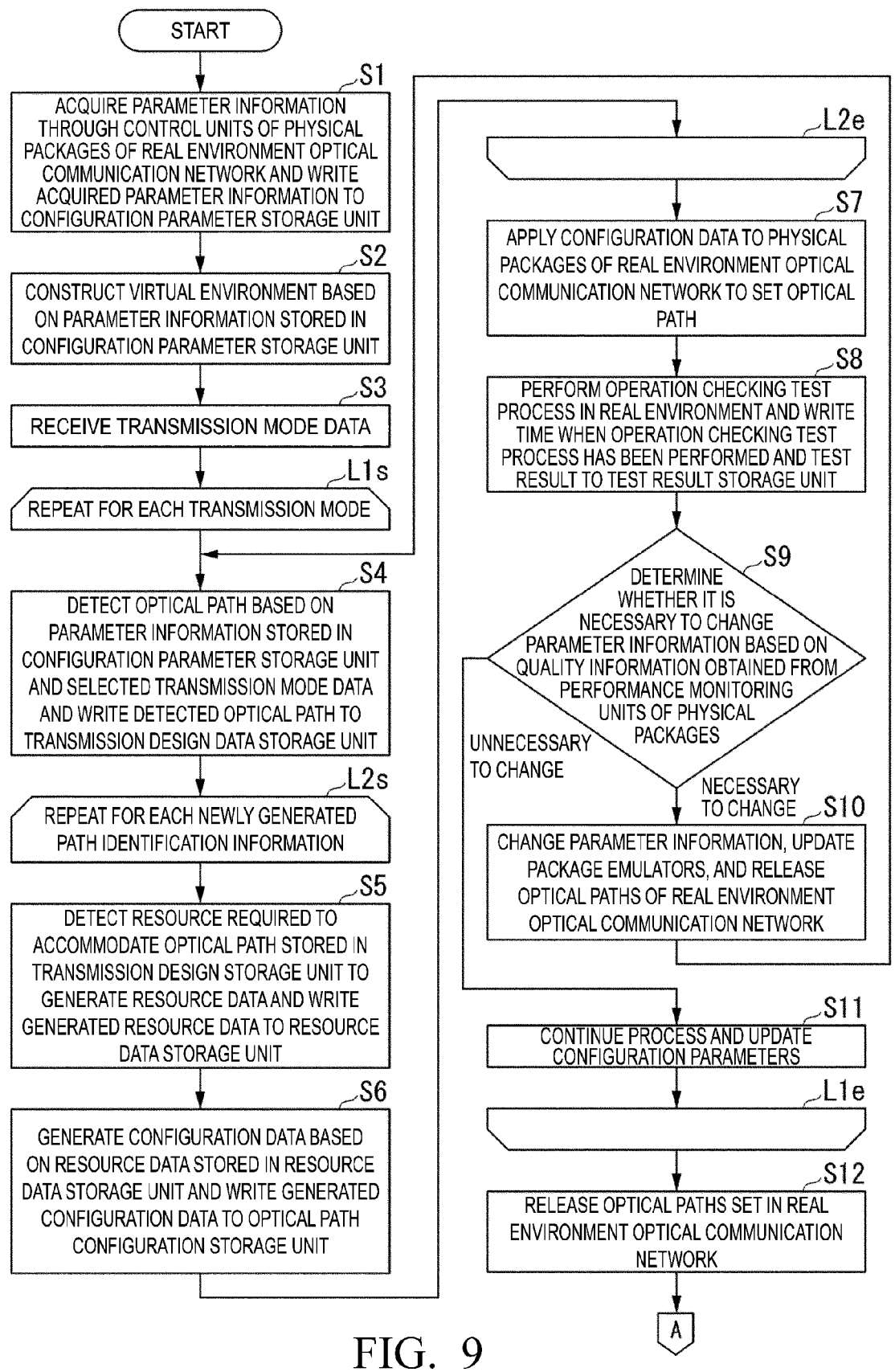
FIG. 9 is a (first) flowchart showing a flow of a process performed by the optical communication network management apparatus of the first embodiment.
Figure 10:
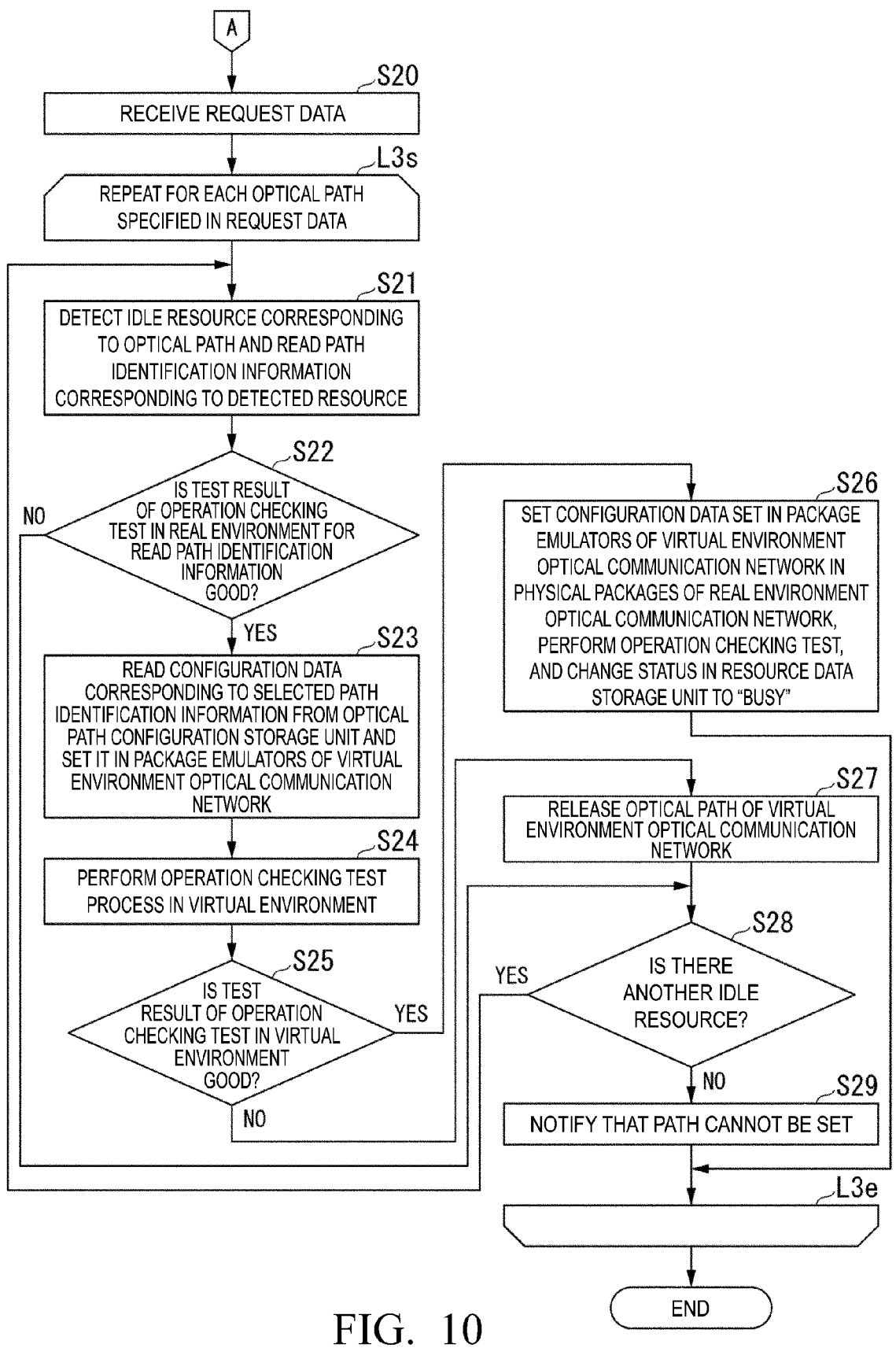
FIG. 10 is a (second) flowchart showing the flow of the process performed by the optical communication network management apparatus of the first embodiment.

Process of Optical Communication Network Management Apparatus of First Embodiment Hereinafter, a process performed by the optical communication network management apparatus 1 of the first embodiment will be described. FIGS. 9 and 10 are flowcharts showing a flow of the process performed by the optical communication network management apparatus 1 of the first embodiment.

The network configuration acquisition unit 12 connects to the control units 311-1 to 311-n of the physical packages 31-1 to 31-n of the real environment optical communication network 3 via the real environment communication unit 11 and transmits a request signal requesting configuration parameters. Upon receiving the request signal from the network configuration acquisition unit 12, the control units 311-1 to 311-n collect configuration parameters from the corresponding physical packages 31-1 to 31-n and transmit the collected configuration parameters to the network configuration acquisition unit 12. Upon receiving the configuration parameters from the control units 311-1 to 311-n, the network configuration acquisition unit 12 writes the received configuration parameters to the configuration parameter table 141 (step S1).

Upon detecting that configuration parameters have been written to the configuration parameter table 141, the virtual environment configuration management unit 201 reads the configuration parameters from the configuration parameter table 141. The virtual environment configuration management unit 201 generates package emulators 41-1 to 41-n in the virtual environment construction apparatus 4 based on the read configuration parameters to construct a virtual environment optical communication network 40 (step S2).

The transmission design unit 151 receives transmission mode data given from the outside (step S3). The processing of steps S4 to S11 shown below is performed repeatedly for each combination of a piece of transmission mode identification information, a start site, an end site, and a capacity included in the transmission mode data received by the transmission design unit 151 (loop of L1s to L1e).

For example, the transmission design unit 151 receives the transmission mode data shown in FIG. 4 and selects the first combination of "transmission mode 1." "Transmission mode 1" is a transmission mode for paths which starts at "site A" and ends at "site D," the transmission mode requiring a communication capacity of 100 G. The transmission design unit 151 detects paths which starts at "site A" and ends at "site D" and has a communication capacity of 100 G based on the configuration parameters stored in the configuration parameter table 141.

As can be seen from FIG. 2, there are the following four paths in the real environment optical communication network 3 which can secure a communication capacity of 100 G from the site A to the site D. That is, there are a path from the node A to the node D via the node B, a path from the node A to the node D via the node C, a path from the node A to the node D via the nodes B and C, and a path from the node A to the node D via the nodes C and B.

In the case of performing a transmission design process such that paths are dispersed, the transmission design unit 151 detects all the four paths in the transmission design process. The transmission design unit 151 generates pieces of path identification information from which it is possible to identify the paths and assigns the generated pieces of path identification information to pieces of path data indicating the four detected paths and further associates each piece of the path identification information with the piece of transmission mode identification information, the name of the start site, and the name of the end site to generate pieces of transmission design data. As shown in FIG. 5, the transmission design unit 151 writes and stores each of the pieces of transmission design data indicating the four paths in the transmission design table 1521 of the transmission design data storage unit 152 (step S4).

The processing of the following steps S5 and S6 is performed repeatedly for every piece of path identification information newly generated by the transmission design unit 151 (loop of L2s to L2e).

When a new piece of transmission design data has been generated in the transmission design table 1521, the accommodation design unit 153 performs an accommodation design process of detecting a resource required for a path corresponding to the new piece of transmission design data based on configuration parameters stored in the configuration parameter table 141. When records have already been generated in the resource table 161, it is necessary to take into consideration their secured resources and thus the accommodation design unit 153 performs an accommodation design process based on configuration parameters stored in the configuration parameter table 141 and pieces of resource data stored in the resource table 161.

The accommodation design unit 153 generates a piece of resource data indicating the resource detected through the accommodation design process and calculates a cost value based on the generated piece of resource data. The accommodation design unit 153 generates a new record in the resource table 161 in the resource data storage unit 16 and associates the generated record with the piece of resource data, the cost, and a piece of path identification information corresponding to the piece of resource data and writes and stores the associated record as shown in FIG. 6. Here, the accommodation design unit 153 writes "idle" to the "status" field of the resource table 161 as an initial value (step S5).

When a new record has been generated in the resource table 161, the configuration generation unit 17 generates a piece of configuration data for an optical path corresponding to the generated record. The configuration generation unit 17 associates the generated piece of configuration data with a piece of path identification information included in the record from which it has been generated and writes and stores the associated data in the optical path configuration table 181 of the optical path configuration storage unit 18 as shown in FIG. 7 (step S6).

When the processing of step S6 has been completed, the processing of steps S5 and S6 is performed for the next new piece of path identification information (loop L2e).

Upon completing the writing of pieces of configuration data corresponding to all newly generated records in the resource table 161 to the optical path configuration table 181, the configuration generation unit 17 outputs a temporary path setting instruction signal including pieces of path identification information corresponding to all generated pieces of configuration data to the real environment optical path setting unit 19 in order to temporarily set their optical paths in the real environment optical communication network 3.

Upon receiving the temporary path setting instruction signal from the configuration generation unit 17, the real environment optical path setting unit 19 reads pieces of configuration data corresponding to all pieces of path identification information included in the temporary path setting instruction signal from the optical path configuration table 181. The real environment optical path setting unit 19 refers to configuration commands and setting order data included in the read pieces of configuration data and applies the configuration commands to control units 311-1 to 311-n of corresponding physical packages 31-1 to 31-n via the real environment communication unit 11 in the setting order indicated by the setting order data to set the optical paths in the real environment optical communication network 3 (step S7).

The real environment optical path setting unit 19 performs an operation checking test process on the set optical paths as necessary based on test checking procedure data included in the read pieces of configuration data. The real environment optical path setting unit 19 acquires the times when the operation checking test process has been performed from a time measuring unit such as a clock provided internally. The real environment optical path setting unit 19 associates the pieces of path identification information corresponding to the pieces of configuration data used for the operation checking test process, the test results of the operation checking test process, and the acquired times and writes and stores the associated data in the real environment test result table 221 in the test result storage unit 22 as shown in FIG. 8. Upon completing the setting of optical paths corresponding to all pieces of path identification information included in the temporary path setting instruction signal, the real environment optical path setting unit 19 outputs a completion notification signal including all pieces of path identification information included in the temporary path setting instruction signal to the real environment usage optimization unit 13 (step S8).

When setting of an optical path in the real environment optical communication network 3 has failed in step S7, the real environment optical path setting unit 19 does not perform the operation checking test process in step S8 and writes information indicating that setting of the optical path has failed to the "test process of operation checking test process in real environment" field of the real environment test result table 221 and writes a time acquired from the internal time measuring unit at that time to the "processing time" field.

Upon receiving the completion notification signal from the real environment optical path setting unit 19, the real environment usage optimization unit 13 connects to the performance monitoring units 312-1 to 312-n of the physical packages 31-1 to 31-n via the real environment communication unit 11 and transmits a request signal requesting measurement of a communication quality to each of the performance monitoring units 312-1 to 312-n. Upon receiving the request signal from the real environment usage optimization unit 13, the performance monitoring units 312-1 to 312-n measure the communication qualities of the physical packages 31-1 to 31-n to generate communication quality data and transmit the generated communication quality data to the real environment usage optimization unit 13.

Upon receiving various communication quality data from the performance monitoring units 312-1 to 312-n, the real environment usage optimization unit 13 determines whether it is necessary to change a configuration parameter stored in the configuration parameter table 141 based on the received various communication quality data and predetermined thresholds for the various communication quality data (step S9).

For example, it is assumed that a threshold for a fiber loss, which is one of the measurement items measured by the performance monitoring units 312-1 to 312-n, is preset to 25 dB or less. Here, if the communication quality data received from the performance monitoring units 312-1 to 312-n indicates that the loss of an optical path set in the optical fiber transmission line 71 connecting the node device 61 of the node A and the node device 62 of the node B is "30 dB," this loss is not more than the threshold. Therefore, the real environment usage optimization unit 13 determines that it is necessary to change the value of the "section loss" field for the section loss between the node A and the node B in the first row of the configuration parameter table 141 and the value of the "section loss" field for the section loss between the node B and the node A in the fourth row by rewriting them with "30 dB" according to the actual condition.

Upon determining that it is necessary to change a configuration parameter ("necessary to change" in step S9), the real environment usage optimization unit 13 changes the configuration parameter that it is necessary to change from among the configuration parameters stored in the configuration parameter table 141.

Upon detecting that a configuration parameter in the configuration parameter table 141 has changed after the package emulators 41-1 to 41-n are generated, the virtual environment configuration management unit 201 identifies the changed configuration parameter. Then, the virtual environment configuration management unit 201 generates a configuration command necessary to set the changed configuration parameter. Similar to the configuration generation unit 17, the virtual environment configuration management unit 201 stores configuration command templates for each configuration parameter for each type of physical packages 31-1 to 31-$n$ in the internal storage area in advance. The virtual environment configuration management unit 201 selects a configuration command template corresponding to the configuration parameter from the configuration command templates and applies the changed configuration parameter to the selected configuration command template to generate a configuration command.

The virtual environment configuration management unit 201 connects to control units 411-1 to 411-$n$ of package emulators 41-1 to 41-$n$ corresponding to the changed configuration parameter via the virtual environment communication unit 21. The virtual environment configuration management unit 201 applies the generated configuration command to the connected control units 411-1 to 411-$n$ to change the configuration parameter. After changing the configuration parameter, the real environment usage optimization unit 13 outputs a path release instruction signal including pieces of path identification information of the optical paths which have been set in the real environment optical communication network 3 in step S7 to the real environment optical path setting unit 19.

Upon receiving the path release instruction signal from the real environment usage optimization unit 13, the real environment optical path setting unit 19 releases the optical paths corresponding to all pieces of path identification information included in the path release instruction signal. The real environment usage optimization unit 13 outputs a redesign instruction signal including all pieces of path identification information included in the completion notification signal to the transmission design unit 151 in order to cause the transmission design unit 151 to perform the transmission design process for the same transmission mode again based on the changed configuration parameter (step S10). Upon receiving the redesign instruction signal from the real environment usage optimization unit 13, the transmission design unit 151 deletes records of the transmission design table 1521 corresponding to the pieces of path identification information included in the completion notification signal and starts the processing of step S4 for the same transmission mode ("transmission mode 1" here). In the subsequent step S5, the accommodation design unit 153 deletes records corresponding to the pieces of path identification information deleted from the transmission design table 1521 from the resource table 161 and then performs an accommodation design process based on transmission design data of new pieces of path identification information generated in the transmission design table 1521.

For example, when the loss of an optical path set in the optical fiber transmission line 71 connecting the node A and the node B indicates "35 dB" exceeding a threshold of 30 dB as described above, the real environment usage optimization unit 13 rewrites the value of the "section loss" field for the section loss between the node A and the node B in the first row of the configuration parameter table 141 and the value of the "section loss" field for the section loss between the node B and the node A in the fourth row with "35 dB" in step S10.

In the processing of step S4 performed again, the transmission design unit 151 performs, for example, a transmission design process to avoid the path between the node A and the node B, or performs the following transmission design process, because the section loss between the node A and the node B indicates a large loss of "35 dB." That is, the transmission design unit 151 selects the path between the node A and the node B as in the previous step S4 upon determining that it is possible to increase the amplification factors of physical packages 31-1 to 31-$n$ for amplification of the nodes A and B based on predetermined amplification factor specifications of the physical packages 31-1 to 31-$n$ for amplification. In the transmission design process, the transmission design unit 151 rewrites amplification factors in the "capacity/amplification factor" field (in the third and seventh rows of the configuration parameter table 141) for the physical packages 31-1 to 31-$n$ for amplification of the nodes A and B in the configuration parameter table 141 to increase the amplification factors. After that, the accommodation design unit 153 performs a process of detecting a resource in step S5 and the configuration generation unit 17 generates a piece of configuration data in step S6. In step S7, the real environment optical path setting unit 19 sets optical paths based on the generated pieces of configuration data, such that the optical paths are set with the increased amplification factors of the physical packages 31-1 to 31-$n$ for amplification of the nodes A and B. This reduces the section loss between the nodes A and B.

Returning to step S9, upon determining that it is unnecessary to change a configuration parameter ("unnecessary to change" in step S9), the real environment usage optimization unit 13 outputs a configuration parameter update instruction signal, which is to update configuration parameters relating to the optical paths set in the real environment optical communication network 3, to the network configuration acquisition unit 12. Upon receiving the configuration parameter update instruction signal from the real environment usage optimization unit 13, the network configuration acquisition unit 12 performs the same processing as in step S1 to write configuration parameters received from the control units 311-1 to 311-$n$ to the configuration parameter table 141. As a result, the values of the communication capacity in the "secured resource capacity" in the configuration parameter table 141 are updated. After that, in the processing of step S4 performed by the transmission design unit 151, a transmission design process is performed taking into consideration the communication capacity secured as a resource. The real environment usage optimization unit 13 outputs a process continuation instruction signal to cause the transmission design unit 151 to perform a transmission design process for the next transmission mode (step S11).

Upon receiving the process continuation instruction signal from the real environment usage optimization unit 13, the transmission design unit 151 starts the processing of step S4 for the next transmission mode ("transmission mode 2" here) in the transmission mode data (loop L1$e$).

Upon completing the processing of the loop of L1$s$ to L1$e$ for all transmission modes included in the transmission mode data given to the transmission design unit 151, the real environment usage optimization unit 13 outputs an all-path release instruction signal to the real environment optical path setting unit 19. Upon receiving the all-path release instruction signal from the real environment usage optimization unit 13, the real environment optical path setting unit 19 releases all optical paths set in the real environment optical communication network 3 (step S12). After that, a process of setting optical paths to be actually run starts (the process is continued from reference sign A in FIG. 9 to reference sign A in FIG. 10).

The request receiving unit 203 receives request data given from the outside (step S20). Here, it is assumed that request data indicating a request to set two 100 G optical paths for the sites A and D has been received. The processing of steps S21 to S29 shown below is performed repeatedly as many times as the number of optical paths included in the request data (loop of L3s to L3e).

The request receiving unit 203 refers to the resource table 161, detects an idle resource corresponding to an optical path specified in the request data, and reads a piece of path identification information corresponding to the detected resource (step S21).

Here, it is assumed that the optical paths specified by the request data given to the request receiving unit 203 are optical paths corresponding to the conditions of one of the transmission modes in the transmission mode data given to the transmission design unit 151. Thus, the following description will be given assuming that the request receiving unit 203 can always detect a piece of path identification information of an idle resource corresponding to an optical path specified by the request data in the first step S21.

The request receiving unit 203 refers to the real environment test result table 221 and determines whether a test result corresponding to the read piece of path identification information is good (step S22). When the request receiving unit 203 has determined that the test result corresponding to the read piece of path identification information is not good (NO in step S22), the process proceeds to step S28.

Here, the fact that the test result of the operation checking test process is not good indicates, for example, that the test result does not satisfy a predetermined condition, examples of which involve predetermined thresholds for various communication quality data. For example, if a loss from a start site to an end site measured by a test exceeds a predetermined threshold, this corresponds to the case where a predetermined condition is not satisfied. It is also assumed that the case where optical path setting has failed is included in the cases where a test result is not good.

On the other hand, upon determining that the test result corresponding to the read piece of path identification information is good (YES in step S22), the request receiving unit 203 outputs a path setting request signal including the piece of path identification information to the virtual environment optical path setting unit 202.

Upon receiving the path setting request signal from the request receiving unit 203, the virtual environment optical path setting unit 202 reads a piece of configuration data corresponding to the piece of path identification information included in the path setting request signal from the optical path configuration table 181. The virtual environment optical path setting unit 202 refers to configuration commands and setting order data included in the read piece of configuration data and sets the configuration commands in control units 411-1 to 411-n of corresponding package emulators 41-1 to 41-n in the setting order indicated by the setting order data. As a result, an optical path is set in the virtual environment optical communication network 40 (step S23).

The virtual environment optical path setting unit 202 performs an operation checking test process on the set optical path according to test checking procedure data included in the read piece of configuration data (step S24). The virtual environment optical path setting unit 202 determines whether the result of the operation checking test process is good (step S25). Upon determining that the result of the operation checking test process is good (YES in step S25), the virtual environment optical path setting unit 202 outputs a path setting completion response signal including the piece of path identification information to the request receiving unit 203. Upon receiving the path setting completion response signal from the virtual environment optical path setting unit 202, the request receiving unit 203 outputs a path setting request signal including the piece of path identification information included in the path setting completion response signal to the real environment optical path setting unit 19.

Upon receiving the path setting request signal from the request receiving unit 203, the real environment optical path setting unit 19 reads a piece of configuration data corresponding to the piece of path identification information included in the path setting request signal from the optical path configuration table 181. The real environment optical path setting unit 19 refers to configuration commands and setting order data included in the read piece of configuration data and sets the configuration commands in control units 311-1 to 311-n of corresponding physical packages 31-1 to 31-n in the setting order indicated by the setting order data. As a result, an optical path is set in the real environment optical communication network 3.

The real environment optical path setting unit 19 performs an operation checking test process on the set optical path according to test checking procedure data included in the read piece of configuration data. The real environment optical path setting unit 19 acquires the time when the operation checking test process has been performed from the internal time measuring unit. The real environment optical path setting unit 19 associates the piece of path identification information corresponding to the piece of configuration data used for the operation checking test process, the test result of the operation checking test process, and the acquired time and writes and stores the associated data in the real environment test result table 221 in the test result storage unit 22 as shown in FIG. 8.

The real environment optical path setting unit 19 outputs a path setting completion response signal including the piece of path identification information included in the path setting request signal to the request receiving unit 203. Upon receiving the path setting completion response signal from the real environment optical path setting unit 19, the request receiving unit 203 rewrites the "status" field of the resource table 161 corresponding to the piece of path identification information included in the path setting completion response signal with "busy" (step S26).

On the other hand, upon determining that the result of the operation checking test process is not good (NO in step S25), the virtual environment optical path setting unit 202 releases the optical path set in the virtual environment optical communication network 40. If the virtual environment optical path setting unit 202 fails to set the optical path in step S23, the operation checking test process in step S24 is not performed and the virtual environment optical path setting unit 202 determines in step S25 that the result of the operation checking test process is not good.

The virtual environment optical path setting unit 202 outputs a resource data check instruction signal instructing to check whether there is another idle resource to the request receiving unit 203 (step S27).

Upon receiving the resource data check instruction signal from the virtual environment optical path setting unit 202 or upon determining NO in step S22, the request receiving unit 203 refers to the resource table 161 and determines whether there is another idle resource, that is, whether there is a resource that has not yet been subjected to the determination of step S22 (step S28).

Upon determining that there is another idle resource (YES in step S28), the request receiving unit 203 performs the processing from step S21 again. On the other hand, upon determining that there is no other idle resource (NO in step S28), the request receiving unit 203 notifies the outside that the path cannot be set (step S29).

After the processing of steps S26 and S29, the request receiving unit 203 repeats the process for the next optical path included in the request data (loop L3e), and when the process for all optical paths included in the request data has been completed, the process is terminated.

Figure 11:
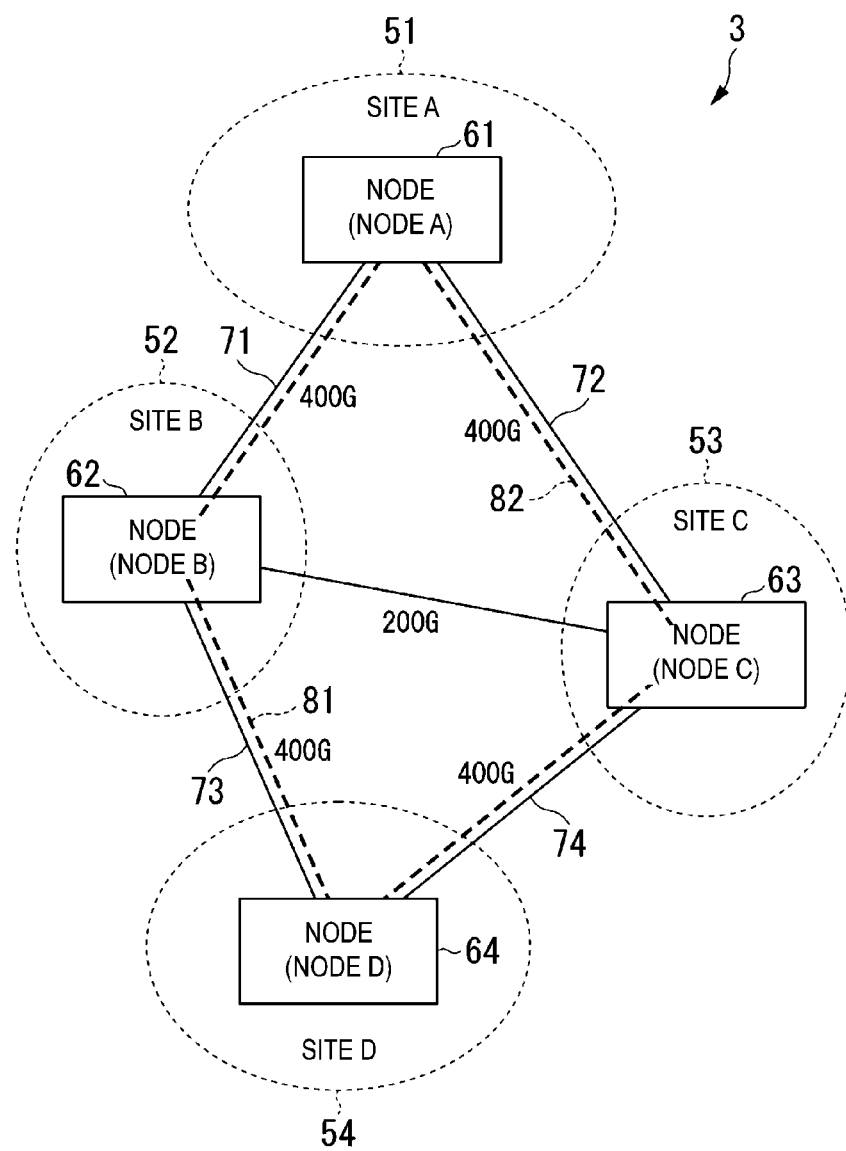
FIG. 11 is a (second) block diagram illustrating an example of the configuration of the real environment optical communication network of the first embodiment.

For example, it is assumed that, in step S21, the request receiving unit 203 detects pieces of resource data in ascending order of the value of the "cost" field of the resource table 161. In this case, when two 100 G optical paths for the sites A and D are set as specified by the request data, as shown in FIG. 11, an optical path 81 corresponding to the path identification information "1" in the resource table 161 and an optical path 82 corresponding to the path identification information "2" therein are set in the real environment optical communication network 3. At this time, entries of the "status" field corresponding to the path identification information "1" and "2" in the resource table 161 are rewritten with "busy."

When there are a plurality of pieces of resource data corresponding to optical paths specified by the request data in step S21 described above, the order in which the request receiving unit 203 detects the pieces of resource data is freely determined, such that the request receiving unit 203 may detect the pieces of resource data in ascending order of the value of cost as described above or may detect the pieces of resource data in a random order.

Although an example of a transmission design process performed by the transmission design unit 151 in step S4 above is shown as a process of detecting paths which can secure the communication capacity specified in the transmission mode data at the start and end sites, a received OSNR or the like can further be taken into consideration. For example, the transmission design unit 151 calculates a received OSNR of each detected path in the transmission design process, and when the calculated received OSNR is equal to or less than a predetermined threshold, transmission design may be performed such that the received OSNR exceeds the threshold through a method described below. This method selects paths which can use physical packages 31-1 to 31-n for communication having a large Tx OSNR or selects paths which can use physical packages 31-1 to 31-n for amplification having a good NF.

Although it is assumed in step S4 above that the transmission design unit 151 performs a transmission design process such that paths are dispersed, the transmission design unit 151 may also perform a transmission design process of detecting only paths which minimize the number of relay node devices 61 to 64, that is, the cost. When performing such a transmission design process, the transmission design unit 151 detects two paths, a path from the node A to the node D via the node B and a path from the node A to the node D via the node C.

Although the accommodation design unit 153 performs an accommodation design process for securing one line for each path in step S5 above, the accommodation design unit 153 may also perform, for example, an accommodation design process for securing a predetermined number of lines for each path.

An optical path that the real environment optical path setting unit 19 sets in step S26 is an optical path for which the test result of the operation checking test process in the real environment optical communication network 3 has been determined to be good in step S22. Therefore, in the processing of step S26, setting of the optical path is unlikely to fail and thus it is assumed that setting of the optical path does not fail.

If a failure to set the optical path in step S26 is taken into consideration, the following processing will be performed. When setting of an optical path has failed, the real environment optical path setting unit 19 does not perform the operation checking test process and writes information indicating that setting of the optical path has failed to the "test process of operation checking test process in real environment" field of the real environment test result table 221 and writes a time acquired from the internal time measuring unit at that time to the "processing time" field. The real environment optical path setting unit 19 outputs a path setting impossibility response signal including the piece of path identification information included in the path setting request signal to the request receiving unit 203. Upon receiving the path setting impossibility response signal from the real environment optical path setting unit 19, the request receiving unit 203 notifies the outside that the path cannot be set and the process is terminated.

The control units 311-1 to 311-n of the physical packages 31-1 to 31-n shown above implement the functions of, for example, a configuration execution unit, a state transition management unit, an error detection unit, and a log recording unit. The configuration execution unit acquires configuration commands from the optical communication network management apparatus 1 and executes the acquired configuration commands on the physical packages 31-1 to 31-n. The state transition management unit manages changes in the states of the physical packages 31-1 to 31-n due to the execution of the configuration commands. The error detection unit detects an error or the like when executing the configuration commands. The error detection unit outputs the detected error to the optical communication network management apparatus 1. The log recording unit records log data of the physical packages 31-1 to 31-n. The log recording unit outputs the log data to the optical communication network management apparatus 1 as necessary. The control units 411-1 to 411-n of the package emulators 41-1 to 41-n have the same functions as the control units 311-1 to 311-n of the physical packages 31-1 to 31-n. That is, the control units 411-1 to 411-n of the package emulators 41-1 to 41-n have the configuration command execution, log output, and error detection functions or the like that are performed by the control units 311-1 to 311-n of the physical packages 31-1 to 31-n. In this way, the control units 411-1 to 411-n of the package emulators 41-1 to 41-n can simulate not only the quality and design of transmission lines but also defects that have occurred during configuration execution.

In the optical communication network management apparatus 1 of the first embodiment described above, the network configuration acquisition unit 12 acquires configuration parameters from physical packages 31-1 to 31-n of the real environment optical communication network 3 which is constructed by the plurality of node devices 61 to 64 in which the physical packages 31-1 to 31-n are mounted. The configuration parameter storage unit 14 stores the configuration parameters acquired by the network configuration acquisition unit 12. The virtual environment configuration management unit 201 generates the virtual environment optical communication network 40 by setting the configuration parameters stored in the configuration parameter storage unit 14 in the package emulators 41-1 to 41-n which a computer program has virtually constructed as the physical packages 31-1 to 31-n. The optical path design unit 15 detects optical paths based on both the configuration parameters stored in the configuration parameter storage unit 14 and a requested transmission mode and generates pieces of resource data indicating resources required for the detected paths. The resource data storage unit 16 stores the pieces of resource data generated by the optical path design unit 15 in association with pieces of path identification information from which it is possible to identify the paths. The configuration generation unit 17 generates pieces of configuration data based on the pieces of resource data stored in the resource data storage unit 16. The optical path configuration storage unit 18 stores the pieces of configuration data generated by the configuration generation unit 17 in association with the pieces of path identification information. The virtual environment optical path setting unit 202 sets optical paths in the virtual environment optical communication network 40 based on the pieces of configuration data stored in the optical path configuration storage unit 18. The real environment optical path setting unit 19 sets the optical paths in the real environment optical communication network 3 based on the pieces of configuration data that the virtual environment optical path setting unit 202 has used to set the optical paths.

As a result, the optical communication network management apparatus 1 can manage both the real environment optical communication network 3 and the virtual environment optical communication network 40 that virtually implements the real environment optical communication network 3 while maintaining the states of the virtual environment optical communication network 40 closer to the states of the real environment optical communication network 3. Performing such management ensures, for example, that various failure states, configuration changes of optical paths, or the like can be simulated using the virtual environment optical communication network 40. In addition, verifying the fault tolerance on such a simulation ensures that problems in the real environment optical communication network 3 can be identified without affecting optical paths that are running, such that it is easy to achieve an improvement in the quality of the real environment optical communication network 3 and it is possible to reduce the operating expese (OPEX) required to run the real environment optical communication network 3, that is, the business and running cost.

In the optical communication network management apparatus 1 of the first embodiment described above, the real environment usage optimization unit 13 causes the real environment optical path setting unit 19 to temporarily set optical paths in the real environment optical communication network 3 and obtains communication quality data from the real environment optical communication network 3, thereby optimizing configuration parameters stored in the configuration parameter table 141. By optimizing the configuration parameters in this way, it is possible to maintain the states of the virtual environment optical communication network 40 closer to the states of the real environment optical communication network 3.

In the optical communication network management apparatus 1 of the first embodiment described above, each piece of configuration data stored in the optical path configuration storage unit 18 includes configuration commands, setting order data indicating the setting order of configuration commands, and test checking procedure data indicating a test checking procedure. Then, the virtual environment optical path setting unit 202 applies the configuration commands in the order indicated by the setting order data included in each piece of configuration data stored in the optical path configuration storage unit 18 to set an optical path in the virtual environment optical communication network 40 and performs an operation checking test process on the optical path that has been successfully set based on test checking procedure data. When the test result of the operation checking test process performed by the virtual environment optical path setting unit 202 is good, the real environment optical path setting unit 19 sets the optical path in the real environment optical communication network 3 using the piece of configuration data that the virtual environment optical path setting unit 202 has applied to the virtual environment optical communication network 40. As a result, it is possible to check the accuracy of configuration commands and the accuracy of the setting order in the virtual environment optical communication network 40 in advance and it is further possible to set an optical path in the real environment optical communication network 3 after confirming that there is no problem in the set optical path through the operation checking test process. Therefore, it is possible to prevent the occurrence of an unexpected fault when setting optical paths in the real environment optical communication network 3.

Second Embodiment

Figure 12:
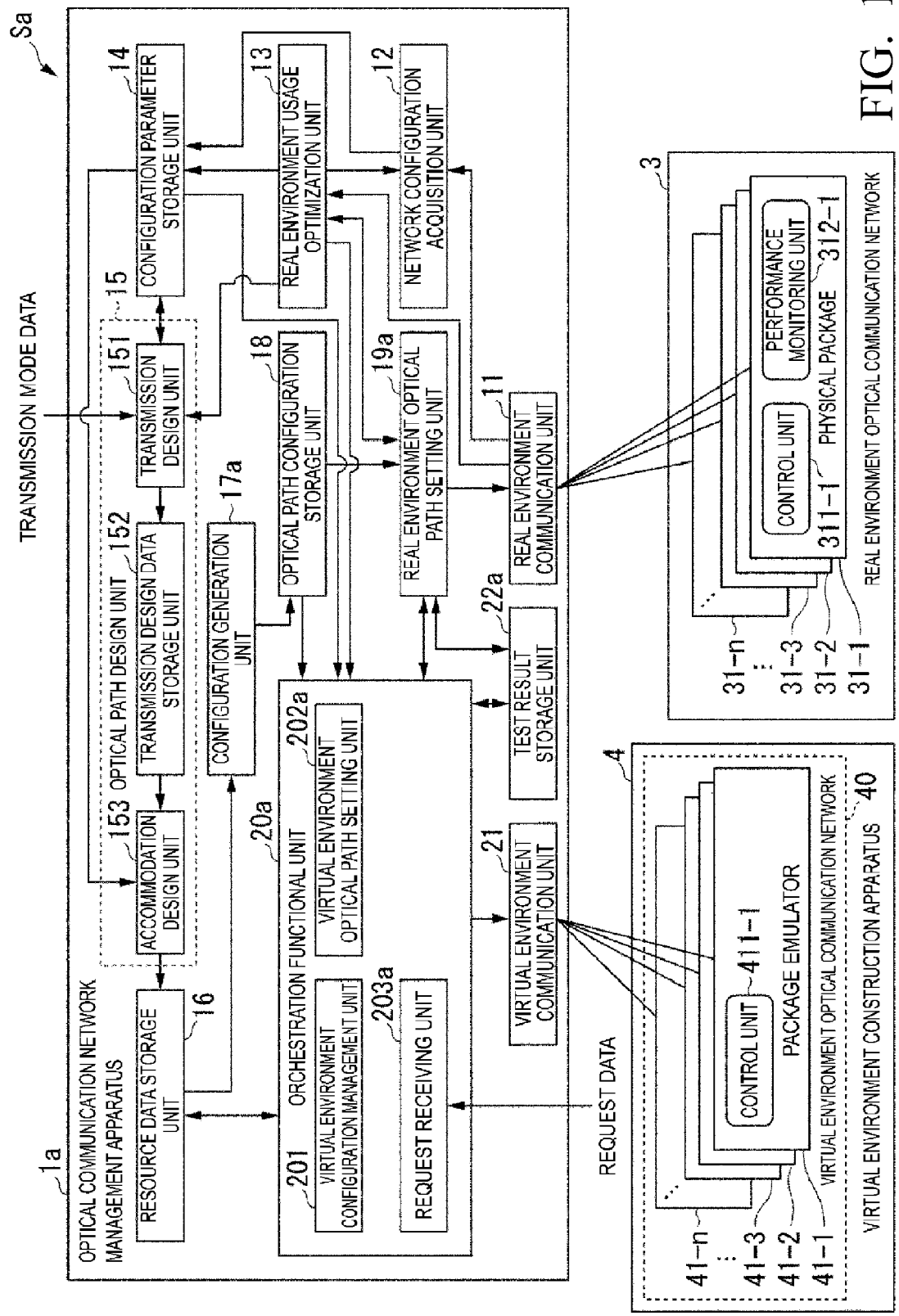
FIG. 12 is a block diagram illustrating a configuration of an optical communication network management system according to a second embodiment.

FIG. 12 is a block diagram illustrating a configuration of an optical communication network management system Sa according to a second embodiment. In the optical communication network management system S of the first embodiment, after optical paths are temporarily set in the real environment optical communication network 3 and the real environment usage optimization unit 13 performs a process of optimizing configuration parameters, an operation checking test process is performed through the virtual environment optical communication network 40. On the other hand, the optical communication network management system Sa of the second embodiment differs from the first embodiment in that the operation checking test process is first performed in the virtual environment optical communication network 40.

In the second embodiment, the same components as those of the first embodiment are designated by the same reference signs and different components from those of the first embodiment are described below. The optical communication network management system Sa includes an optical communication network management apparatus 1a, a real environment optical communication network 3, and a virtual environment construction apparatus 4.

The optical communication network management apparatus 1a includes a real environment communication unit 11, a network configuration acquisition unit 12, a real environment usage optimization unit 13, a configuration parameter storage unit 14, an optical path design unit 15, a resource data storage unit 16, a configuration generation unit 17a, an optical path configuration storage unit 18, a real environment optical path setting unit 19a, an orchestration functional unit 20a, a virtual environment communication unit 21, and a test result storage unit 22a.

The configuration generation unit 17a has the same configuration as the configuration generation unit 17 of the first embodiment except for the following points. Upon completing the writing of generated pieces of configuration data to the optical path configuration table 181, the configuration generation unit 17 of the first embodiment outputs a temporary path setting instruction signal including all pieces of path identification information corresponding to all generated pieces of configuration data to the real environment optical path setting unit 19. On the other hand, the configuration generation unit 17a of the second embodiment outputs a temporary path setting instruction signal including pieces of path identification information corresponding to the generated pieces of configuration data to the virtual environment optical path setting unit 202a of the orchestration functional unit 20a.

The test result storage unit 22a stores the real environment test result table 221 shown in FIG. 8 and a virtual environment test result table 222 shown in FIG. 13. The virtual environment test result table 222 has fields of "path identification information" and "test result of operation checking test process in virtual environment." In the "path identification information" field, pieces of path identification information are written. In the "test result of operation checking test process in virtual environment" field, the test results of an operation checking test process that the virtual environment optical path setting unit 202a has performed based on test checking procedure data included in the pieces of configuration data are written.

Unlike the real environment optical path setting unit 19 of the first embodiment, the real environment optical path setting unit 19a receives a temporary path setting instruction signal from the virtual environment optical path setting unit 202a. Upon receiving the temporary path setting instruction signal from the virtual environment optical path setting unit 202a, the real environment optical path setting unit 19a refers to the virtual environment test result table 222 in the test result storage unit 22a and extracts pieces of path identification information for which the test results of the operation checking test process in the virtual environment optical communication network 40 are good. The real environment optical path setting unit 19a temporarily sets optical paths corresponding to the extracted pieces of path identification information in the real environment optical communication network 3. Upon receiving a path setting request signal from the request receiving unit 203a, the real environment optical path setting unit 19a sets an optical path corresponding to a piece of path identification information included in the path setting request signal.

The orchestration functional unit 20a includes a virtual environment configuration management unit 201, a virtual environment optical path setting unit 202a, and a request receiving unit 203a. The virtual environment optical path setting unit 202a has the following configuration in addition to the configuration of the virtual environment optical path setting unit 202 of the first embodiment. Upon performing an operation checking test process on an optical path, the virtual environment optical path setting unit 202a of the second embodiment associates the test result of the operation checking test process with a piece of path identification information corresponding to the optical path and writes the associated data to the virtual environment test result table 222. Upon receiving the temporary path setting instruction signal from the configuration generation unit 17a, the virtual environment optical path setting unit 202a temporarily sets optical paths corresponding to pieces of path identification information included in the temporary path setting instruction signal in the virtual environment optical communication network 40.

Upon receiving request data given from the outside which requests that optical paths be set, the request receiving unit 203a detects pieces of path identification information of optical paths, which match a condition specified in the request data, which are idle, and for which the test results of the operation checking test processes in the real and virtual environment optical communication networks 3 and 40 are good, from the resource table 161 in the resource data storage unit 16.

Figure 14:
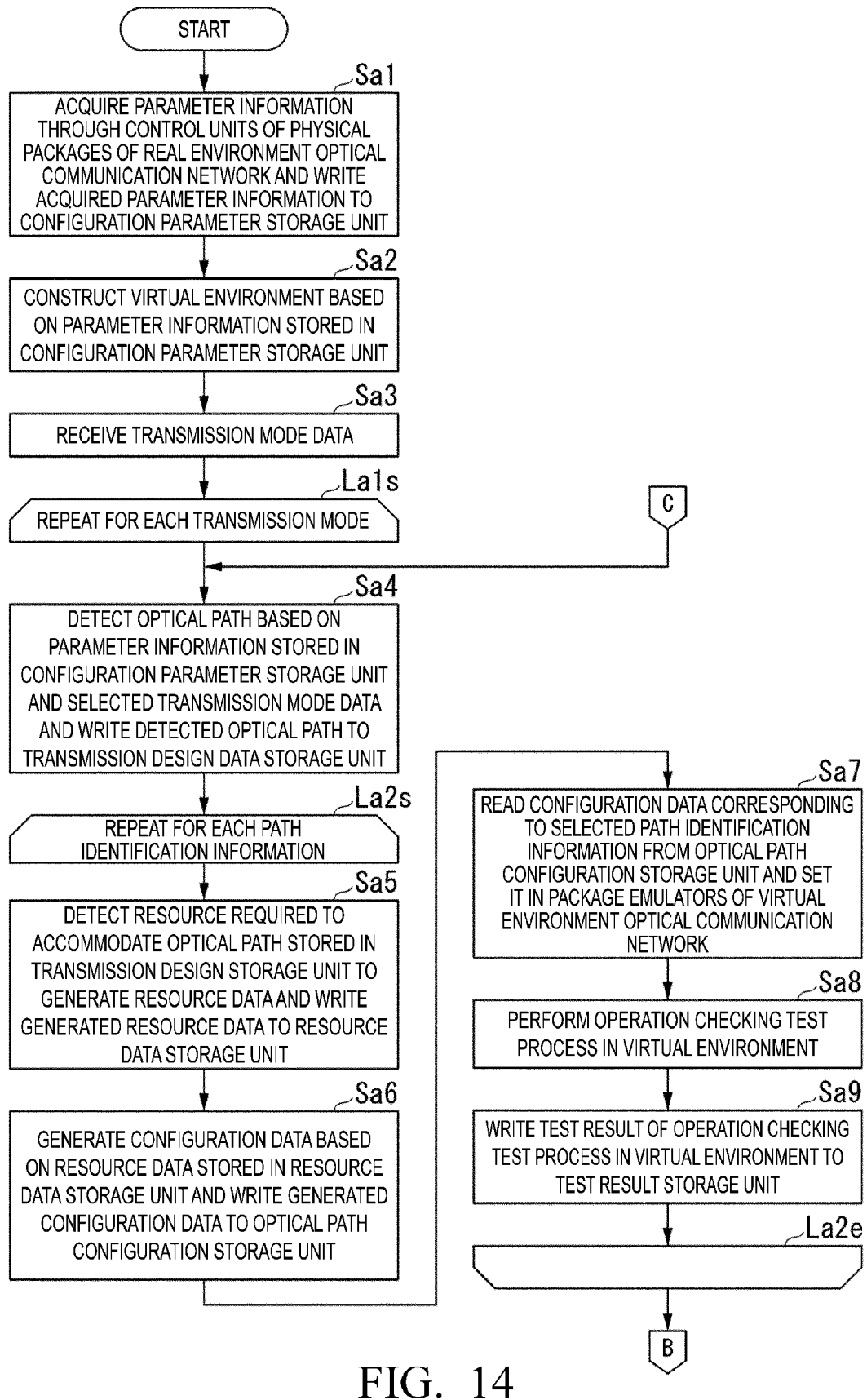
FIG. 14 is a (first) flowchart showing a flow of a process performed by the optical communication network management apparatus of the second embodiment.
Figure 15:
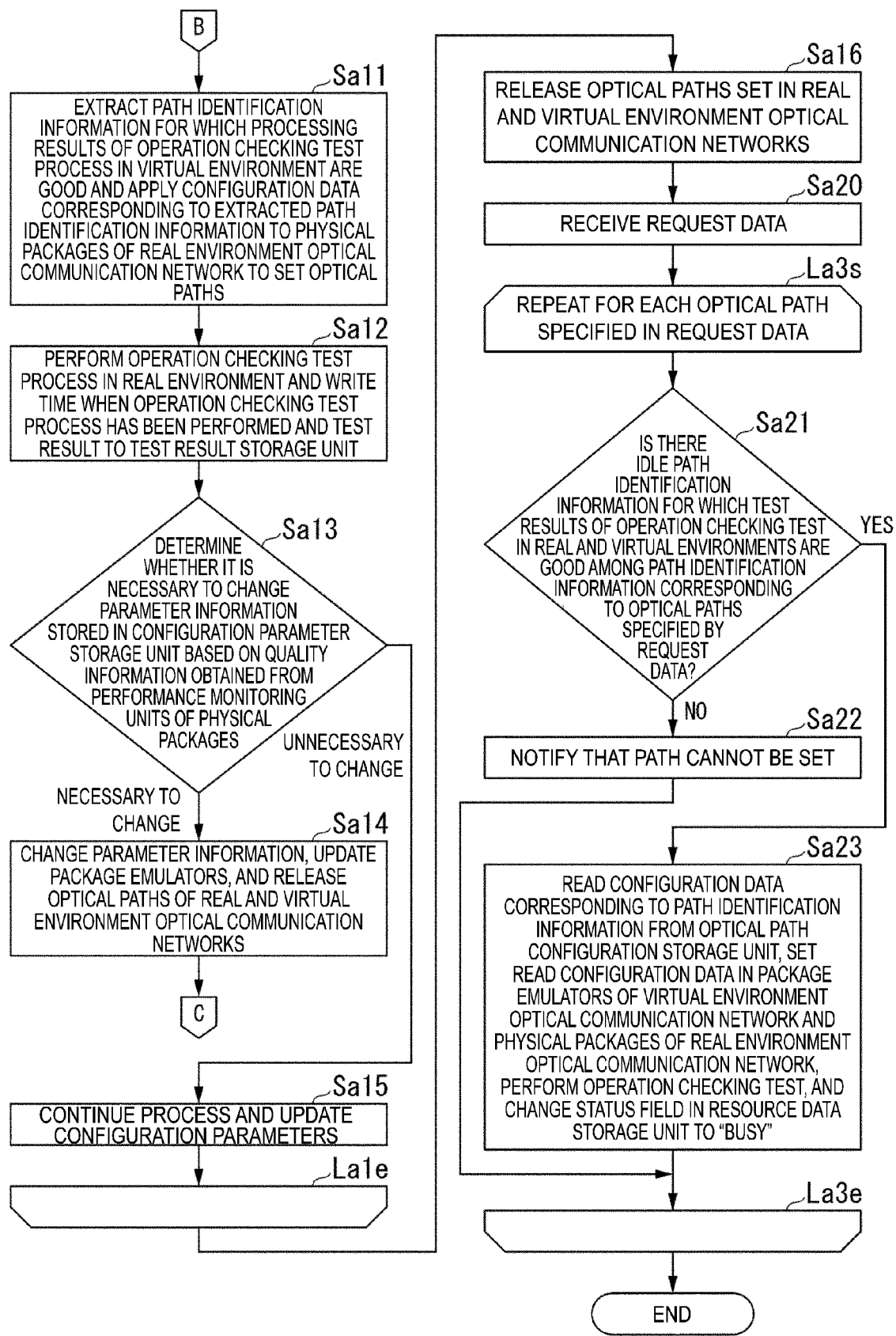
FIG. 15 is a (second) flowchart showing the flow of the process performed by the optical communication network management apparatus of the second embodiment.

Process of Optical Communication Network Management Apparatus of Second Embodiment Hereinafter, a process performed by the optical communication network management apparatus 1 of the second embodiment will be described. FIGS. 14 and 15 are flowcharts showing a flow of the process performed by the optical communication network management apparatus 1 of the second embodiment.

In step Sa1, the same processing as in step S1 in FIG. 9 is performed by the network configuration acquisition unit 12. In step Sa2, the same processing as in step S2 of FIG. 9 is performed by the virtual environment configuration management unit 201.

The transmission design unit 151 receives the transmission mode data given from the outside (step Sa3). The processing of steps Sa4 to Sa15 shown below is performed repeatedly for each combination of a piece of transmission mode identification information, a start site, an end site, and a capacity included in the transmission mode data (loop of La1s to La1e).

In step Sa4, the same processing as in step S4 of FIG. 9 is performed by the transmission design unit 151. The following processing of steps Sa5 to Sa9 is performed repeatedly as many times as the number of pieces of path identification information generated by the transmission design unit 151 (loop of La2s to La2e). In step Sa5, the same processing as in step S5 of FIG. 9 is performed by the accommodation design unit 153.

When a new record has been generated in the resource table 161, the configuration generation unit 17a generates a piece of configuration data for an optical path corresponding to the generated record. The configuration generation unit 17a associates the generated piece of configuration data with a corresponding piece of path identification information and writes and stores the associated data in the optical path configuration table 181 as shown in FIG. 7. Upon completing the writing of the generated piece of configuration data to the optical path configuration table 181, the configuration generation unit 17a outputs a temporary path setting instruction signal including a piece of path identification information corresponding to the generated piece of configuration data to the virtual environment optical path setting unit 202a (step Sa6).

Upon receiving the temporary path setting instruction signal from the configuration generation unit 17a, the virtual environment optical path setting unit 202a reads a piece of configuration data corresponding to the piece of path identification information included in the temporary path setting instruction signal from the optical path configuration table 181. The virtual environment optical path setting unit 202a refers to configuration commands and setting order data included in the read piece of configuration data and sets the configuration commands in control units 411-1 to 411-n of corresponding physical emulators 41-1 to 41-n. As a result, an optical path corresponding to the piece of path identification information included in the temporary path setting instruction signal is set in the virtual environment optical communication network 40 (step Sa7).

The virtual environment optical path setting unit 202a performs an operation checking test process on the set optical path based on test checking procedure data included in the piece of configuration data corresponding to the optical path (step Sa8). The virtual environment optical path setting unit 202a associates the piece of path identification information corresponding to the piece of configuration data used for the operation checking test process with a test result of the operation checking test process and writes and stores the associated data in the virtual environment test result table 222 in the test result storage unit 22 as shown in FIG. 13 (step Sa9).

When setting of an optical path has failed in the virtual environment optical communication network 40 in step Sa7, the virtual environment optical path setting unit 202a does not perform the operation checking test process in step Sa8 and writes information indicating that setting of the optical path has failed to the "test process of operation checking test process in virtual environment" field of the virtual environment test result table 222 in step Sa9.

When the processing up to step Sa9 has been completed, the processing from step Sa5 is performed for the next new piece of path identification information (loop La2e).

When the processing of the loop of La2s to La2e has been completed for all pieces of path identification information (reference sign B in the flowchart of FIG. 14), a process of setting optical paths in the real environment optical communication network 3 starts (reference sign B in the flowchart of FIG. 15).

When the processing up to step Sa9 has been completed for all pieces of path identification information, the virtual environment optical path setting unit 202a outputs a temporary path setting instruction signal including all pieces of path identification information that have been subjected to the processing to the real environment optical path setting unit 19a.

Upon receiving the temporary path setting instruction signal from the virtual environment optical path setting unit 202a, the real environment optical path setting unit 19a refers to the virtual environment test result table 222 in the test result storage unit 22a and extracts all pieces of path identification information for which the test results of the operation checking test process are good from pieces of path identification information included in the temporary path setting instruction signal. The real environment optical path setting unit 19a reads pieces of configuration data corresponding to all extracted pieces of path identification information from the optical path configuration table 181. The real environment optical path setting unit 19a refers to configuration commands and setting order data included in the read pieces of configuration data and applies the configuration commands to control units 311-1 to 311-n of corresponding physical packages 31-1 to 31-n via the real environment communication unit 11 in the setting order indicated by the setting order data to set optical paths in the real environment optical communication network 3 (step Sa11).

The real environment optical path setting unit 19a performs an operation checking test process on each of the set optical paths based on test checking procedure data included in a piece of configuration data corresponding to the set optical path. The real environment optical path setting unit 19a acquires the processing times when the operation checking test process has been performed from a time measuring unit provided internally. The real environment optical path setting unit 19a associates the pieces of path identification information corresponding to the pieces of configuration data used for the operation checking test process, the test results of the operation checking test process, and the acquired processing times and writes and stores the associated data in the real environment test result table 221 in the test result storage unit 22 as shown in FIG. 8 (step Sa12).

For an optical path of which setting has failed in step Sa11, the real environment optical path setting unit 19a does not perform the operation checking test process in step Sa12 and writes information indicating that setting of the optical path has failed to the "test process of operation checking test process in real environment" field of the real environment test result table 221 and writes a time acquired from the internal time measuring unit at that time to the "processing time" field.

When the processing of step Sa12 has been completed for all pieces of path identification information extracted in step Sa11, the real environment optical path setting unit 19a outputs a completion notification signal including all pieces of path identification information included in the temporary path setting instruction signal to the real environment usage optimization unit 13.

In step Sa13, the same processing as in step S9 in FIG. 9 is performed by the real environment usage optimization unit 13. Upon determining that it is necessary to change a configuration parameter ("necessary to change" in step Sa13), the real environment usage optimization unit 13 changes the configuration parameter that it is necessary to change from among the configuration parameters stored in the configuration parameter table 141.

Upon detecting that a configuration parameter in the configuration parameter table 141 has changed after the package emulators 41-1 to 41-n are generated, the virtual environment configuration management unit 201 identifies the changed configuration parameter and generates a configuration command necessary to set the changed configuration parameter. The virtual environment configuration management unit 201 connects to control units 411-1 to 411-n of package emulators 41-1 to 41-n corresponding to the changed configuration parameter via the virtual environment communication unit 21. The virtual environment configuration management unit 201 applies the generated configuration command to the connected control units 411-1 to 411-n to change the configuration parameter. After changing the configuration parameter, the real environment usage optimization unit 13 outputs a path release instruction signal including all pieces of path identification information of the optical paths which have been set in the real environment optical communication network 3 in step Sa11 to the real environment optical path setting unit 19a and the virtual environment optical path setting unit 202a.

Upon receiving the path release instruction signal from the real environment usage optimization unit 13, the real environment optical path setting unit 19a releases the optical paths corresponding to all pieces of path identification information included in the path release instruction signal. Upon receiving the path release instruction signal from the real environment usage optimization unit 13, the virtual environment optical path setting unit 202a releases the optical paths corresponding to the pieces of path identification information included in the path release instruction signal. The real environment usage optimization unit 13 outputs a redesign instruction signal including all pieces of path identification information included in the completion notification signal to the transmission design unit 151 in order to cause the transmission design unit 151 to perform the transmission design process for the same transmission mode again based on the changed configuration parameter (step Sa14). Upon receiving the redesign instruction signal from the real environment usage optimization unit 13, the transmission design unit 151 deletes records of the transmission design table 1521 corresponding to the pieces of path identification information included in the completion notification signal and starts the processing of step S4 for the same transmission mode ("transmission mode 1" here). In the subsequent step S5, the accommodation design unit 153 deletes records corresponding to the pieces of path identification information deleted from the transmission design table 1521 from the resource table 161 and then performs an accommodation design process based on transmission design data of new pieces of path identification information generated in the transmission design table 1521.

Upon determining that it is unnecessary to change a configuration parameter ("unnecessary to change" in step Sa13), the real environment usage optimization unit 13 performs the same processing as that of step S11 in FIG. 9 (step Sa15). Upon receiving a process continuation instruction signal from the real environment usage optimization unit 13, the transmission design unit 151 starts the processing of step Sa4 for the next transmission mode ("transmission mode 2" here) in the transmission mode data (loop La1e).

Upon completing the processing of the loop of La1s to La1e for all transmission modes included in the transmission mode data given to the transmission design unit 151, the real environment usage optimization unit 13 outputs an all-path release instruction signal to the real environment optical path setting unit 19a and the virtual environment optical path setting unit 202a. Upon receiving the all-path release instruction signal from the real environment usage optimization unit 13, the real environment optical path setting unit 19a releases all optical paths set in the real environment optical communication network 3. Upon receiving the all-path release instruction signal from the real environment usage optimization unit 13, the virtual environment optical path setting unit 202a releases all optical paths set in the virtual environment optical communication network 40 (step Sa16). After that, a process of setting optical paths to be actually run starts.

The request receiving unit 203a receives request data given from the outside (step Sa20). Here, similar to the first embodiment, it is assumed that request data indicating a request to set two 100 G optical paths for the sites A and D has been received. The processing of steps Sa21 to Sa23 shown below is performed repeatedly as many times as the number of optical paths included in the request data (loop of La3s to La3e).

The request receiving unit 203a refers to the resource table 161, the real environment test result table 221, and the virtual environment test result table 222. The request receiving unit 203a determines whether there is a piece of path identification information that matches conditions that the piece of path identification information be idle and the test results of the operation checking test process in both the real and virtual environment optical communication networks 3 and 40 be good among pieces of path identification information corresponding to the optical paths specified in the request data (step Sa21).

Upon determining that there is no piece of path identification information matching the conditions (NO in step Sa21), the request receiving unit 203a notifies the outside that a path cannot be set (step Sa22). On the other hand, upon determining that there is a piece of path identification information matching the conditions (YES in steps Sa21), the request receiving unit 203a outputs a path setting request signal including the piece of path identification information to the virtual environment optical path setting unit 202a.

Upon receiving the path setting request signal from the request receiving unit 203a, the virtual environment optical path setting unit 202a reads a piece of configuration data corresponding to the piece of path identification information included in the path setting request signal from the optical path configuration table 181. The virtual environment optical path setting unit 202a refers to setting order data and configuration commands included in the read piece of configuration data and applies the configuration commands to control units 411-1 to 411-n of corresponding package emulators 41-1 to 41-n via the virtual environment communication unit 21 in the setting order indicated by the setting order data to set an optical path in the virtual environment optical communication network 40.

The virtual environment optical path setting unit 202a performs an operation checking test process on the set optical path based on test checking procedure data included in the read piece of configuration data. The virtual environment optical path setting unit 202a associates the piece of path identification information corresponding to the piece of configuration data used for the operation checking test process with the test result of the operation checking test process and writes and stores the associated data in the virtual environment test result table 222 in the test result storage unit 22 as shown in FIG. 13.

After writing to the virtual environment test result table 222, the virtual environment optical path setting unit 202a outputs a path setting completion response signal including the piece of path identification information included in the path setting request signal to the request receiving unit 203a. Upon receiving the path setting completion response signal from the virtual environment optical path setting unit 202a, the request receiving unit 203a outputs a path setting request signal including the piece of path identification information included in the path setting completion response signal to the real environment optical path setting unit 19a.

Upon receiving the path setting request signal from the request receiving unit 203a, the real environment optical path setting unit 19a reads a piece of configuration data corresponding to the piece of path identification information included in the path setting request signal from the optical path configuration table 181. The real environment optical path setting unit 19a sets configuration commands in control units 311-1 to 311-n of corresponding physical packages 31-1 to 31-n via the real environment communication unit 11 in the setting order indicated by setting order data included in the read piece of configuration data to set an optical path in the real environment optical communication network 3.

The real environment optical path setting unit 19a performs an operation checking test process on the set optical path according to test checking procedure data included in the read piece of configuration data. The real environment optical path setting unit 19a acquires the time when the operation checking test process has been performed from the internal time measuring unit. The real environment optical path setting unit 19a associates the piece of path identification information corresponding to the piece of configuration data used for the operation checking test process, the test result of the operation checking test process, and the acquired time and writes and stores the associated data in the real environment test result table 221 in the test result storage unit 22 as shown in FIG. 8.

The real environment optical path setting unit 19a outputs a path setting completion response signal including the piece of path identification information included in the path setting request signal to the request receiving unit 203a. Upon receiving the path setting completion response signal from the real environment optical path setting unit 19a, the request receiving unit 203a rewrites the "status" field of the resource table 161 corresponding to the piece of path identification information included in the path setting completion response signal with "busy" (step Sa23).

After the processing of steps Sa22 and Sa23, the request receiving unit 203a repeats the process for the next optical path included in the request data (loop La3e), and when the process for all optical paths included in the request data has been completed, the process is terminated.

In the second embodiment, an optical path that the virtual environment optical path setting unit 202a sets in step Sa23 is an optical path for which the test result in the virtual environment optical communication network 40 has already been determined to be good. Therefore, in the second embodiment, it is not determined whether the test result of the operation checking test process of the optical path in the virtual environment optical communication network 40 is good as in step S25 of the first embodiment, but the determination process of step S25 may also be performed as in the first embodiment. In this case, the setting of the optical path in the real environment optical communication network 3 shown in step S26 is performed when the determination result in step S25 is good and the processing of steps S27 to S29 is performed when the determination result is not good.

An optical path that the real environment optical path setting unit 19a sets in step Sa26 is an optical path for which the test result in the real environment optical communication network 3 has already been determined to be good. Therefore, in step Sa23, setting of the optical path in the real environment optical communication network 3 is unlikely to fail and thus it is assumed that setting of the optical path does not fail, similar to step Sa26 of the first embodiment.

If a failure to set the optical path in the real environment optical path setting unit 19a in step Sa23 is taken into consideration, the following processing will be performed. When setting of an optical path has failed, the real environment optical path setting unit 19a does not perform the operation checking test process and writes information indicating that setting of the optical path has failed to the "test process of operation checking test process in real environment" field of the real environment test result table 221 and writes a time acquired from the internal time measuring unit at that time to the "processing time" field. The real environment optical path setting unit 19a outputs a path setting impossibility response signal including the piece of path identification information included in the path setting request signal to the request receiving unit 203a. Upon receiving the path setting impossibility response signal from the real environment optical path setting unit 19a, the request receiving unit 203a notifies the outside that the path cannot be set and the process is terminated.

The configuration of the second embodiment described above can achieve the following advantages in addition to the same advantages as those of the first embodiment. That is, in the configuration of the second embodiment, after performing an operation checking test process in the virtual environment optical communication network 40, only optical paths for which the test results of the operation checking test process are good are set in the real environment optical communication network 3. Therefore, in the configuration of the second embodiment, the process of optimizing configuration parameters can be performed while minimizing the process of setting configuration commands in the real environment optical communication network 3 and the influence upon the real environment optical communication network 3 can be reduced compared to the configuration of the first embodiment.

Third Embodiment

Figure 16:
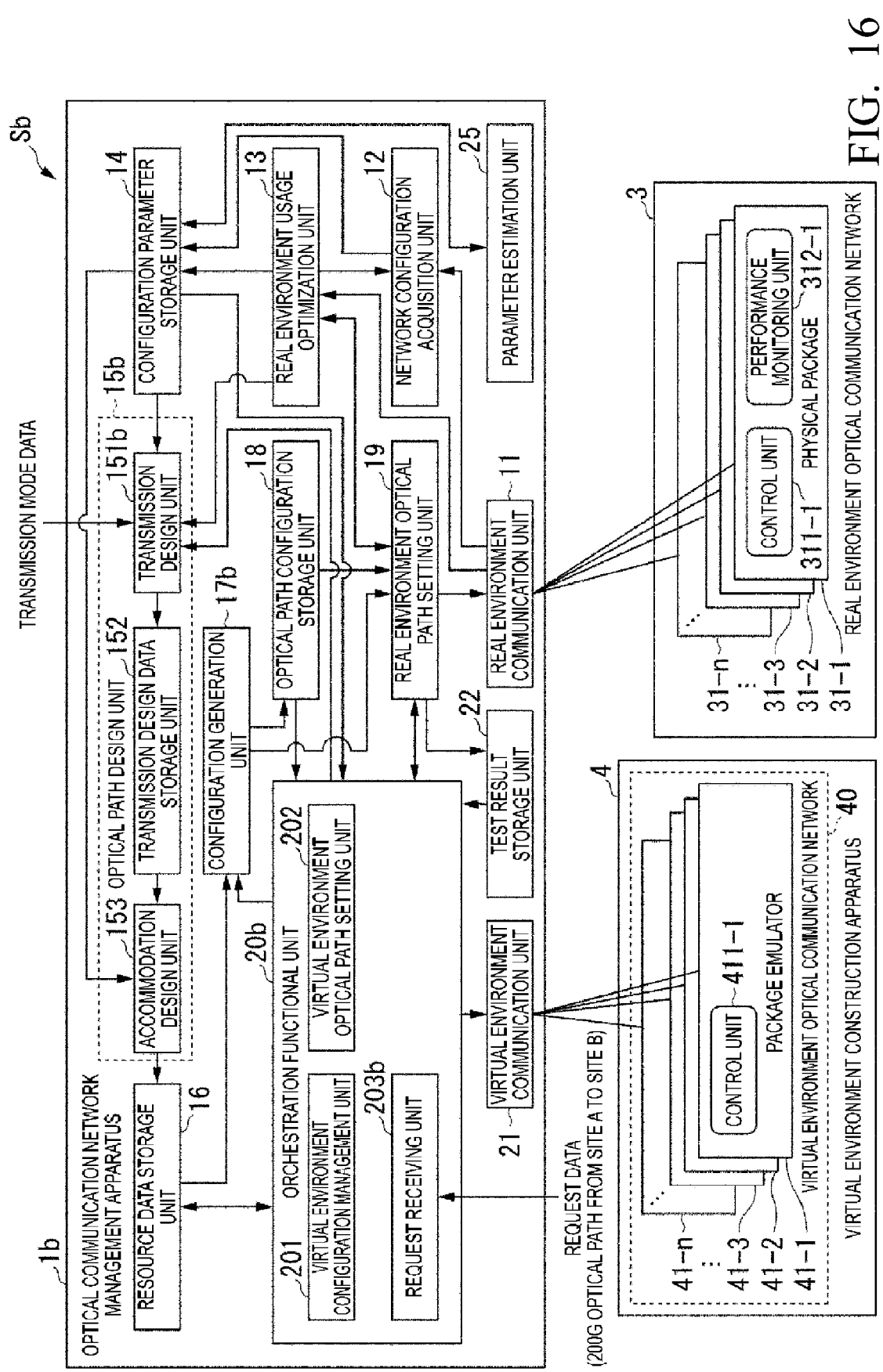
FIG. 16 is a block diagram illustrating a configuration of an optical communication network management system according to a third embodiment.

FIG. 16 is a block diagram illustrating a configuration of an optical communication network management system Sb according to a third embodiment. In the optical communication network management system S of the first embodiment, it is assumed that the request data given to the request receiving unit 203 is data requesting the setting of optical paths that match one of the modes shown in the transmission mode data given to the transmission design unit 151. In the actual operation, an optical path of a mode other than the modes indicated by the transmission mode data may be urgently requested. The third embodiment has a configuration for setting an optical path of a mode other than the modes indicated by the transmission mode data that has been given in advance.

In the third embodiment, the same components as those of the first embodiment are designated by the same reference signs and different components from those of the first embodiment are described below. The optical communication network management system Sb includes an optical communication network management apparatus 1b, a real environment optical communication network 3, and a virtual environment construction apparatus 4.

The optical communication network management apparatus 1b includes a real environment communication unit 11, a network configuration acquisition unit 12, a real environment usage optimization unit 13, a configuration parameter storage unit 14, an optical path design unit 15b, a resource data storage unit 16, a configuration generation unit 17b, an optical path configuration storage unit 18, a real environment optical path setting unit 19, an orchestration functional unit 20b, a virtual environment communication unit 21, and a test result storage unit 22.

The orchestration functional unit 20b includes a virtual environment configuration management unit 201, a virtual environment optical path setting unit 202, and a request receiving unit 203b.

Upon receiving request data given from the outside which requests that optical paths be set, the request receiving unit 203b refers to a resource table 161 in the resource data storage unit 16 and determines whether there is an idle resource that matches a condition specified in the request data. When there is no idle resource in the resource table 161 which matches the condition specified in the request data, the request receiving unit 203b generates transmission mode data indicating the condition specified in the request data and outputs an additional transmission design instruction signal including the generated transmission mode data to the transmission design unit 151b. Further, when outputting the additional transmission design instruction signal to the transmission design unit 151b, the request receiving unit 203b transmits a transmission mode added state setting instruction signal for setting a transmission mode added state to the configuration generation unit 17b.

The configuration generation unit 17b has the same configuration as the configuration generation unit 17 of the first embodiment except for the following points. Upon receiving the transmission mode added state setting instruction signal from the request receiving unit 203b, the configuration generation unit 17b sets a flag indicating the transmission mode added state in an internal storage area. When the flag indicating the transmission mode added state has been set in the internal storage area, the configuration generation unit 17b outputs, after writing and storing a piece of configuration data in the optical path configuration storage unit 18, a configuration generation notification signal notifying that a new piece of configuration data has been generated to the request receiving unit 203b without outputting a temporary path setting instruction signal to the real environment optical path setting unit 19.

The optical path design unit 15b includes a transmission design unit 151b, a transmission design data storage unit 152, and an accommodation design unit 153. The transmission design unit 151b has the same configuration as the transmission design unit 151 of the first embodiment and further receives an additional transmission design instruction signal including transmission mode data from the request receiving unit 203b. Upon receiving the additional transmission design instruction signal from the request receiving unit 203b, the transmission design unit 151b performs a transmission design process based on the transmission mode data included in the additional transmission design instruction signal.

Figure 17:
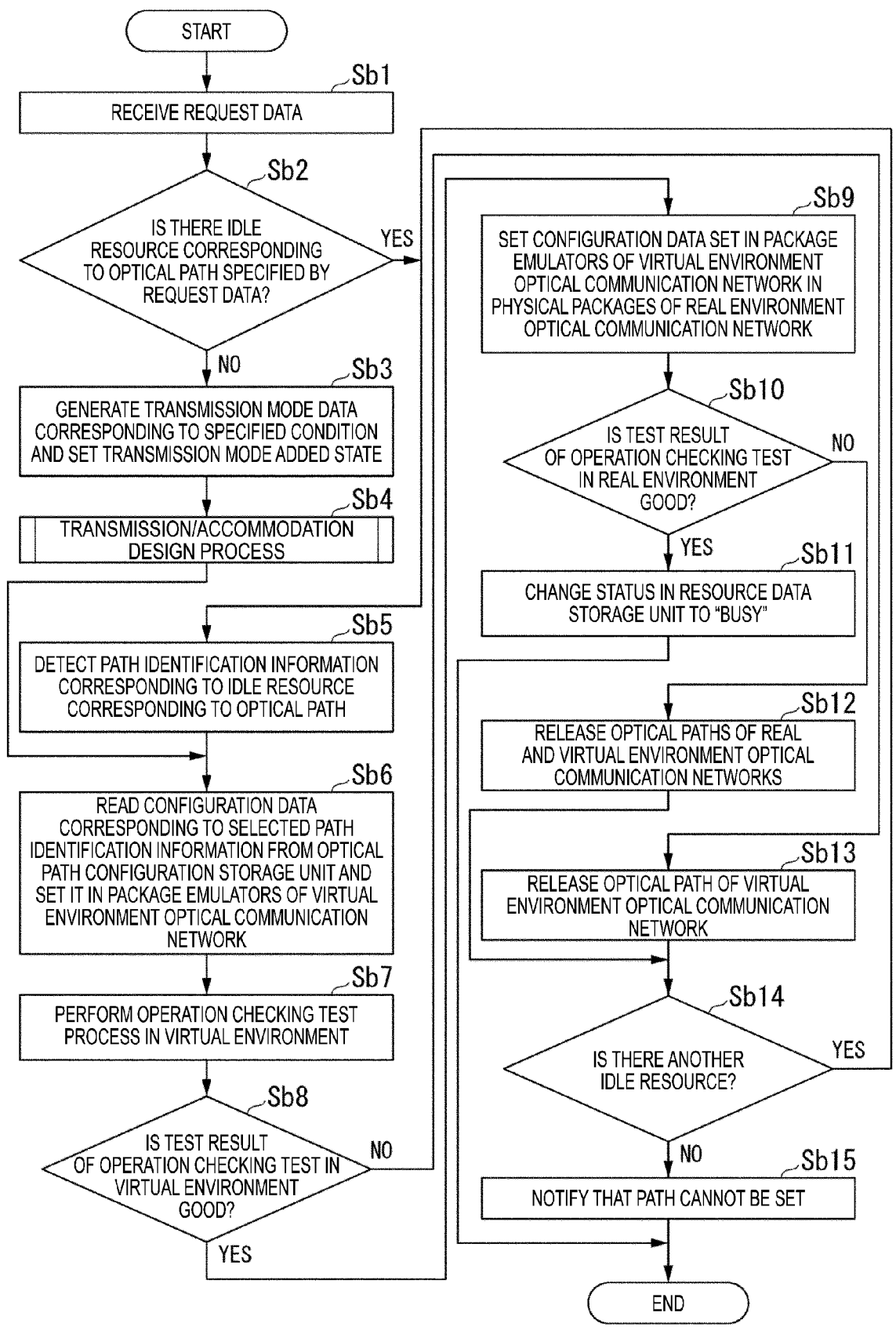
FIG. 17 is a flowchart showing a flow of a process performed by the optical communication network management apparatus of the third embodiment.

Process of Optical Communication Network Management Apparatus of Third Embodiment Hereinafter, a process performed by the optical communication network management apparatus 1b of the third embodiment will be described. FIG. 17 is a flowchart showing a flow of the process performed by the optical communication network management apparatus 1b according to the third embodiment. It is assumed that, before the process according to the flowchart of FIG. 17 starts, the process shown in the flowcharts of FIGS. 9 and 10 of the first embodiment has already been completed and optical paths that are running have been set.

The request receiving unit 203b receives request data given from the outside (step Sb1). The request receiving unit 203b refers to the resource table 161 and determines whether there is an idle resource that matches a condition specified in the received request data (step Sb2).

Upon determining that there is an idle resource in the resource table 161 which matches the condition specified in the request data (YES in step Sb2), the request receiving unit 203b detects a piece of path identification information corresponding to the idle resource matching the condition specified in the request data from the resource table 161. The request receiving unit 203b outputs a path setting request signal including the detected piece of path identification information to the virtual environment optical path setting unit 202 (step Sb5).

On the other hand, upon determining that there is no idle resource in the resource table 161 which matches the condition specified in the request data (NO in step Sb2), the request receiving unit 203b generates transmission mode data indicating the condition specified in the request data and outputs an additional transmission design instruction signal including the generated transmission mode data to the transmission design unit 151b and then waits for a certain period of time (step Sb3).

For example, it is assumed that the condition specified in the request data indicates an optical path of 200 G from the site A to the site B and this condition is not included in the transmission mode data given to the transmission design unit 151b. Because the condition is not included in the transmission mode data, there is no resource data that matches the condition in the resource table 161. Therefore, the request receiving unit 203b determines "No" in the processing of step Sb2. In step Sb3, the request receiving unit 203b generates a piece of transmission mode identification information indicating that a transmission mode has been added, for example, a piece of transmission mode identification information called an "additional transmission mode 1," and associates data of a start site being the "site A," an end site being "site B," and the capacity being "200 G" with the generated piece of transmission mode identification information to generate transmission mode data.

The request receiving unit 203b outputs an additional transmission design instruction signal including the generated transmission mode data to the transmission design unit 151b. When outputting the additional transmission design instruction signal to the transmission design unit 151b, the request receiving unit 203b transmits a transmission mode added state setting instruction signal for setting a transmission mode added state to the configuration generation unit 17b.

Upon receiving the transmission mode added state setting instruction signal from the request receiving unit 203b, the configuration generation unit 17b sets a flag indicating the transmission mode added state in the internal storage area.

Figure 18:
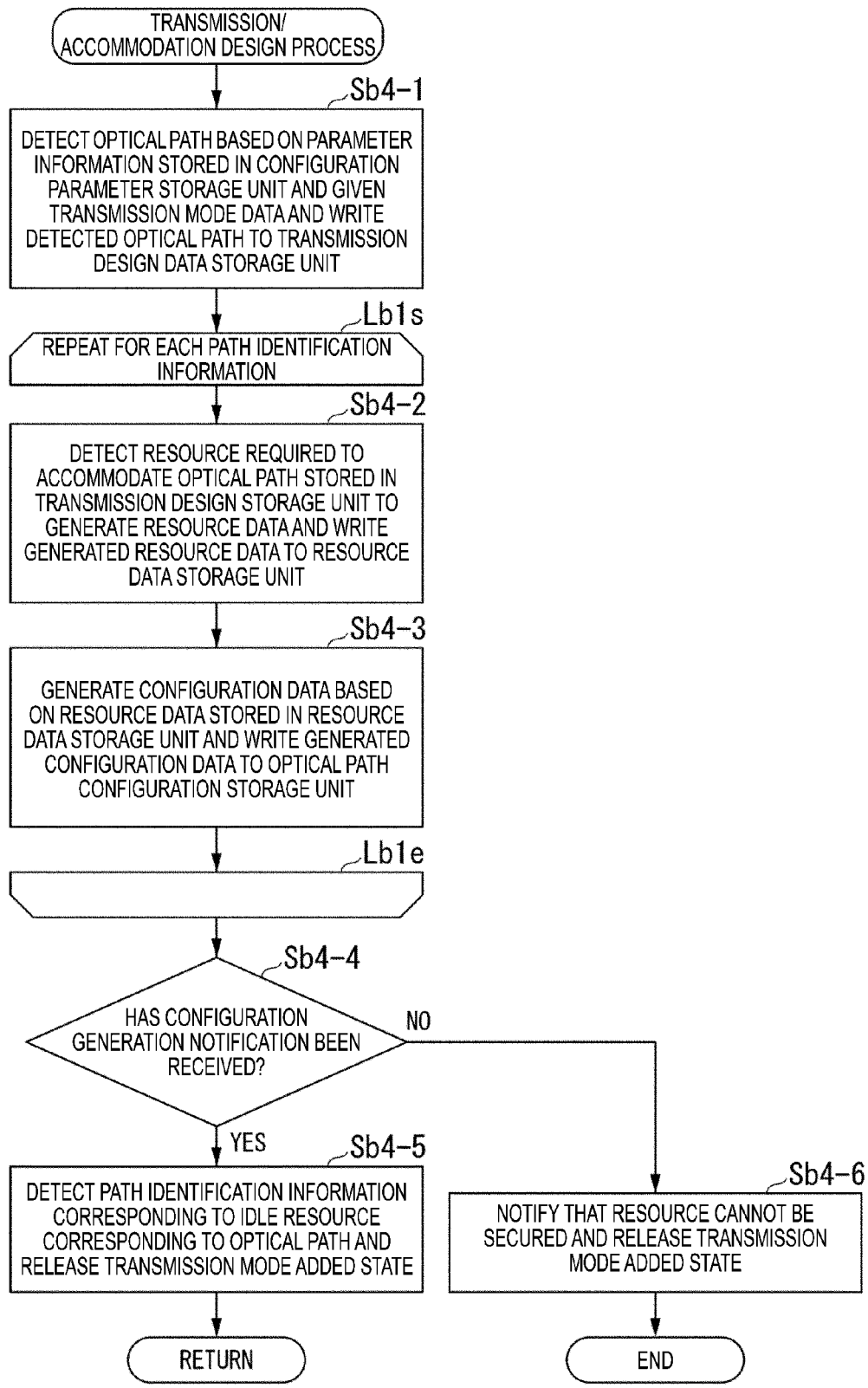
FIG. 18 is a flowchart of a subroutine of transmission and accommodation design processing in the process performed by the optical communication network management apparatus of the third embodiment.

After step Sb3, a subroutine of transmission and accommodation design processing shown in FIG. 18 starts (step Sb4).

Upon receiving the additional transmission design instruction signal from the request receiving unit 203b, the transmission design unit 151b reads the transmission mode data included in the additional transmission design instruction signal. The transmission design unit 151b detects a path that satisfies a condition indicated by the transmission mode data based on configuration parameters stored in the configuration parameter table 141. The transmission design unit 151b generates and adds a piece of path identification information to data indicating the detected path to generate a piece of transmission design data and writes and stores the generated piece of transmission design data in the transmission design table 1521 of the transmission design data storage unit 152 (step Sb4-1).

The following processing of steps Sb4-2 and Sb4-3 is performed repeatedly as many times as the number of pieces of path identification information generated by the transmission design unit 151b (loop of Lb1s to Lb1e).

In step Sb4-2, the same processing as in step S5 of FIG. 9 is performed by the accommodation design unit 153. In step Sb4-3, the same processing as in step S6 of FIG. 9 is performed by the configuration generation unit 17b. When the processing of step S6 has been completed, the processing of steps S5 and S6 is performed for the next new piece of path identification information (loop L2e). When the processing of the loop of Lb1s to Lb1e has been completed and a resource of the condition specified in the request data has been detected by the accommodation design unit 153, an idle record is generated in the resource table 161.

The configuration generation unit 17b refers to the internal storage area upon completing the writing of pieces of configuration data corresponding to all newly generated records in the resource table 161 to the optical path configuration table 181. Because the flag indicating the transmission mode added state has been set in the internal storage area, the configuration generation unit 17b does not output a temporary path setting instruction signal to the real environment optical path setting unit 19 and outputs a configuration generation completion notification signal to the request receiving unit 203b.

After waiting for a certain period of time, the request receiving unit 203b determines whether the configuration generation notification signal has been received from the configuration generation unit 17b (step Sb4-4). Upon determining that a configuration generation notification signal has been received from the configuration generation unit 17b (YES in step Sb4-4), the request receiving unit 203b detects a piece of path identification information corresponding to the idle resource from the resource table 161 and outputs a path setting request signal including the detected piece of path identification information to the virtual environment optical path setting unit 202.

The request receiving unit 203b transmits a transmission mode added state release instruction signal for releasing the transmission mode added state to the configuration generation unit 17b. Upon receiving the transmission mode added state release instruction signal from the request receiving unit 203b, the configuration generation unit 17b releases the flag indicating the transmission mode added state in the internal storage area (step Sb4-5). After that, the subroutine of transmission/accommodation design processing is terminated and the process proceeds to step Sb6 of FIG. 7.

On the other hand, upon determining that the configuration generation notification signal has not been received from the configuration generation unit 17b (NO in step Sb4-4), the request receiving unit 203b notifies the outside that a resource cannot be secured. The request receiving unit 203b transmits a transmission mode added state release instruction signal for releasing the transmission mode added state to the configuration generation unit 17b. Upon receiving the transmission mode added state release instruction signal from the request receiving unit 203b, the configuration generation unit 17b deletes the flag indicating the transmission mode added state in the internal storage area (step Sb4-6). After that, the process is terminated without returning to the process of FIG. 17.

The virtual environment optical path setting unit 202 receives the path setting request signal from the request receiving unit 203b and performs the same processing as in step S23 of FIG. 10 based on the path setting request signal (step Sb6). In the processing of steps Sb7 and Sb8, the same processing as in steps S24 and S25 of FIG. 10 is performed by the virtual environment optical path setting unit 202.

Upon determining in step Sb8 that the result of the operation checking test process is not good (NO in step Sb8), the virtual environment optical path setting unit 202 releases the optical path set in the virtual environment optical communication network 40. When setting of the optical path has failed in step Sb6, the virtual environment optical path setting unit 202 does not perform the operation checking test process in step Sb7 and determines in step Sb8 that the result of the operation checking test process is not good. The virtual environment optical path setting unit 202 outputs a resource data check instruction signal instructing to check whether there is another idle resource to the request receiving unit 203b (step Sb13).

Upon determining in step Sb8 that the result of the operation checking test process is good (YES in step Sb8), the virtual environment optical path setting unit 202 outputs a path setting completion response signal including the piece of path identification information to the request receiving unit 203b. Upon receiving the path setting completion response signal from the virtual environment optical path setting unit 202, the request receiving unit 203b outputs a path setting request signal including the piece of path identification information included in the path setting completion response signal to the real environment optical path setting unit 19.

Upon receiving the path setting request signal from the request receiving unit 203b, the real environment optical path setting unit 19 reads a piece of configuration data corresponding to the piece of path identification information included in the path setting request signal from the optical path configuration table 181. The real environment optical path setting unit 19 refers to configuration commands and setting order data included in the read piece of configuration data and sets the configuration commands in control units 311-1 to 311-n of corresponding physical packages 31-1 to 31-n in the setting order indicated by the setting order data.

Upon setting an optical path in the real environment optical communication network 3, the real environment optical path setting unit 19 performs an operation checking test process on the set optical path according to test checking procedure data included in the read piece of configuration data. The real environment optical path setting unit 19 acquires the time when the operation checking test process has been performed from a time measuring unit provided internally. The real environment optical path setting unit 19 associates the piece of path identification information corresponding to the piece of configuration data used for the operation checking test process, the test result of the operation checking test process, and the acquired time and writes and stores the associated data in the real environment test result table 221 in the test result storage unit 22 as shown in FIG. 8.

When setting of an optical path in the real environment optical communication network 3 has failed, the real environment optical path setting unit 19 does not perform the operation checking test process and writes information indicating that setting of the optical path has failed to the "test process of operation checking test process in real environment" field of the real environment test result table 221 and writes a time acquired from the internal time measuring unit at that time to the "processing time" field.

When setting of an optical path is successful, the real environment optical path setting unit 19 outputs a path setting completion response signal including the piece of path identification information included in the path setting request signal to the request receiving unit 203b. On the other hand, when setting of an optical path has failed, the real environment optical path setting unit 19 outputs a path setting impossibility response signal including the piece of path identification information included in the path setting request signal to the request receiving unit 203b (step Sb9).

Upon receiving the path setting completion response signal or the path setting impossibility response signal from the real environment optical path setting unit 19, the request receiving unit 203b refers to the "test result of operation checking test in real environment" field of the real environment test result table 221 corresponding to the piece of path identification information included in the path setting completion response signal or the path setting impossibility response signal and determines whether the test result of the operation checking test process in the real environment optical communication network 3 is good (step Sb10).

Upon determining that the test result of the operation checking test process in the real environment optical communication network 3 is good (YES in step Sb10), the request receiving unit 203b rewrites the "status" field of the resource table 161 corresponding to the piece of path identification information that is being processed with "busy" (step Sb11) and the process is terminated.

On the other hand, upon determining that the test result of the operation checking test process in the real environment optical communication network 3 is not good (NO in step Sb10), the request receiving unit 203b outputs a path release instruction signal including the piece of path identification information that is being processed to the real environment optical path setting unit 19 and the virtual environment optical path setting unit 202 and the process proceeds to step Sb14. Upon receiving the path release instruction signal from the request receiving unit 203b, the real environment optical path setting unit 19 releases an optical path corresponding to the piece of path identification information included in the path release instruction signal. Upon receiving the path release instruction signal from the request receiving unit 203b, the virtual environment optical path setting unit 202 releases an optical path corresponding to the piece of path identification information included in the path release instruction signal (step Sb12).

Upon receiving the resource data check instruction signal from the virtual environment optical path setting unit 202 after the processing of step Sb12 or through the processing of step Sb13, the request receiving unit 203b refers to the resource table 161 and determines whether there is another idle resource (step Sb14). Upon determining that there is another idle resource (YES in step Sb14), the request receiving unit 203b proceeds to the processing of step Sb5. On the other hand, upon determining that there is no other idle resource (NO in step Sb14), the request receiving unit 203b notifies the outside that the path cannot be set and the process is terminated (step Sb15).

The request data given to the request receiving unit 203b may include information on a setting start time and a setting end time of the optical path in addition to the start site, the end site, and the communication capacity of the optical path. In this case, the resource table 161 is provided with a field named "period" for recording the setting start time and the setting end time of the optical path and the request receiving unit 203b rewrites the "status" field with "busy" and writes the data on the setting start date and time and the setting end date and time of the optical path to the "period" field. The request receiving unit 203b acquires time information from a time measuring unit such as a clock provided internally at regular time intervals and outputs, for an optical path for which the acquired time has reached the setting end date and time, a path release instruction signal including a piece of path identification information of the optical path to the virtual environment optical path setting unit 202 and the real environment optical path setting unit 19 to release the optical path.

By including the data on the setting period of an optical path in the resource table 161 as described above, the following processing can be performed in the third embodiment. That is, it is assumed that the request receiving unit 203b outputs an additional transmission design instruction signal for adding a new transmission mode and the setting start date and time and the setting end date and time of an optical path are indicated in the additional transmission design instruction signal. Here, the accommodation design unit 153 refers to the resource table 161, and when it can detect a resource that can be secured between the setting start date and time and the setting end date and time of the optical path to be added, can generate a record for the idle resource in the resource table 161 by limiting the period of the resource. Thus, in the real environment optical communication network 3, a requested optical path can be set for a requested period.

According to the configuration of the third embodiment described above, even when the request receiving unit 203 has received a request for an optical path of a mode other than modes indicated in transmission mode data given to the transmission design unit 151b, it is possible to set the optical path of the mode other than the modes indicated in the transmission mode data because the optical path design unit 15b additionally performs a transmission design process and an accommodation design process for the requested optical path.

While the request data given to the request receiving units 203 and 203a matches one of the modes in the transmission mode data given to the transmission design unit 151 in the first and second embodiments, the processing from step S20 of the first embodiment and the processing from step Sa20 of the second embodiment may be replaced with the processing of the third embodiment shown in FIG. 17 in order to deal with any request data.

Fourth Embodiment

Figure 19:
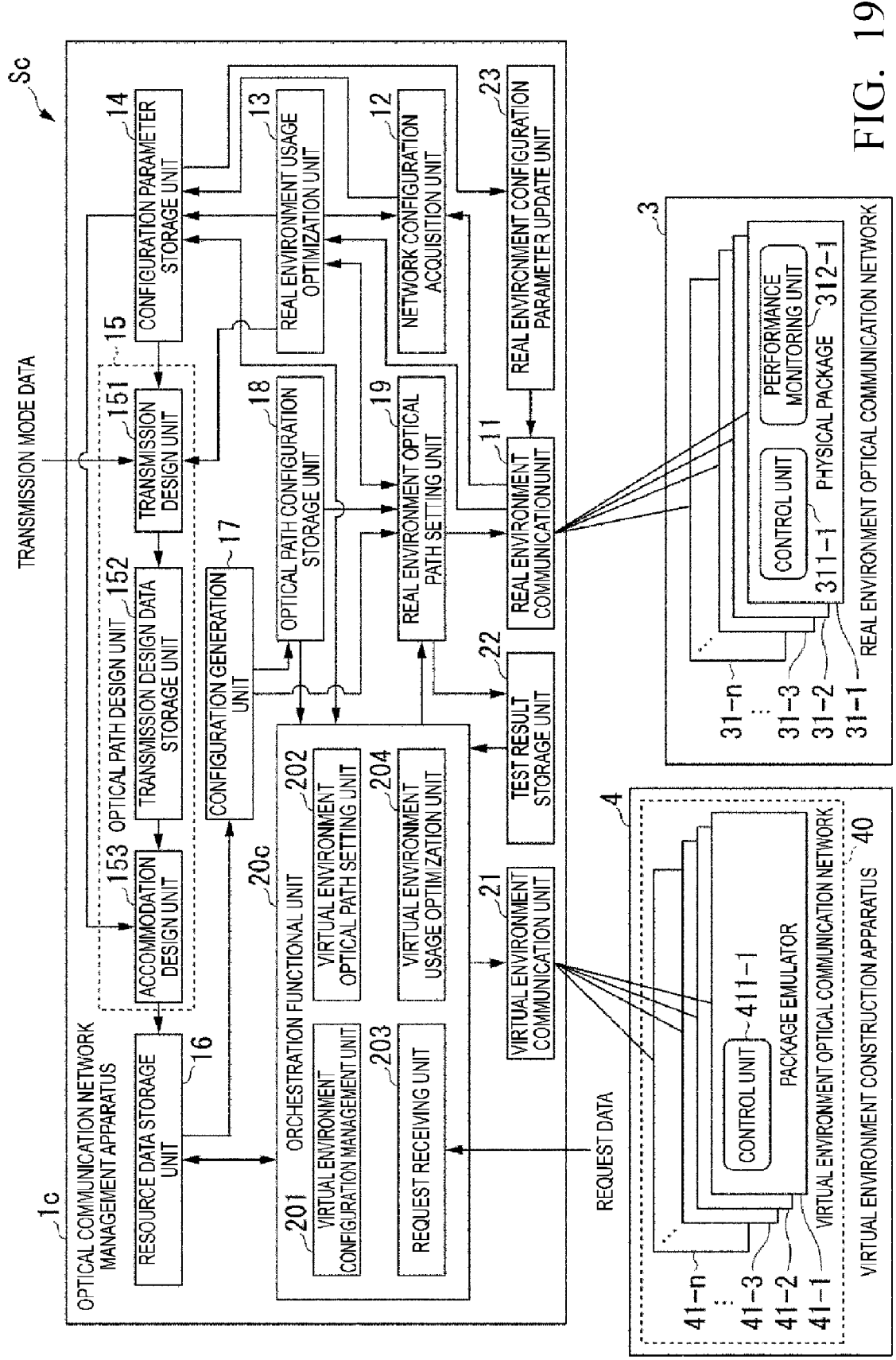
FIG. 19 is a block diagram illustrating a configuration of an optical communication network management system according to a fourth embodiment.

FIG. 19 is a block diagram illustrating a configuration of an optical communication network management system Sc according to a fourth embodiment. In the fourth embodiment, a freely defined fault is caused in a virtual environment optical communication network 40 and configuration parameters are optimized based on a result of the caused fault.

In the fourth embodiment, the same components as those of the first embodiment are designated by the same reference signs and different components from those of the first embodiment are described below. The optical communication network management system Sc includes an optical communication network management apparatus 1c, a real environment optical communication network 3, and a virtual environment construction apparatus 4.

The optical communication network management apparatus 1c includes a real environment communication unit 11, a network configuration acquisition unit 12, a real environment usage optimization unit 13, a configuration parameter storage unit 14, an optical path design unit 15, a resource data storage unit 16, a configuration generation unit 17, an optical path configuration storage unit 18, a real environment optical path setting unit 19, an orchestration functional unit 20c, a virtual environment communication unit 21, a test result storage unit 22, and a real environment configuration parameter update unit 23.

Upon detecting that a configuration parameter in the configuration parameter table 141 stored in the configuration parameter storage unit 14 has changed, the real environment configuration parameter update unit 23 identifies the changed configuration parameter and updates configuration parameters of control units 311-1 to 311-n corresponding to the identified changed configuration parameter by rewriting them with the identified configuration parameter.

The orchestration functional unit 20c includes a virtual environment configuration management unit 201, a virtual environment optical path setting unit 202, a request receiving unit 203, and a virtual environment usage optimizer 204. The virtual environment usage optimization unit 204 causes a freely defined fault in the virtual environment optical communication network 40.

Here, a freely defined fault is, for example, a fault such as that of causing freely specified package emulators 41-1 to 41-n to be failed, cutting a VIRTUAL ENVIRONMENT OPTICAL fiber transmission line connected to the package emulators 41-1 to 41-n, increasing the loss of a VIRTUAL ENVIRONMENT OPTICAL fiber transmission line, or rotating the polarization of light at high speed to cause polarization fluctuations. The freely defined fault may be any fault as long as it can be detected by the control units 411-1 to 411-n.

The virtual environment usage optimization unit 204 receives a fault notification signal transmitted by the control units 411-1 to 411-n of the package emulators 41-1 to 41-n. Upon receiving the fault notification signal, the virtual environment usage optimization unit 204 determines whether the caused fault can be avoided by changing a configuration parameter or changing an optical path based on the cause of the caused fault and a result of the fault included in the fault notification signal.

When the fault can be avoided by changing a configuration parameter, the virtual environment usage optimization unit 204 identifies a configuration parameter to be changed, generates a changed configuration parameter, and rewrites the configuration parameter identified in the configuration parameter table 141 with the generated configuration parameter.

When the fault can be avoided by changing an optical path, the virtual environment usage optimization unit 204 refers to the resource table 161 in the resource data storage unit 16 and detects a piece of path identification information of a switching source optical path from which switching is made and a piece of path identification information of a switching destination optical path to which switching is made. When switching is possible, the virtual environment usage optimization unit 204 performs optical path switching in the virtual environment optical communication network 40 and the real environment optical communication network 3.

Figure 20:
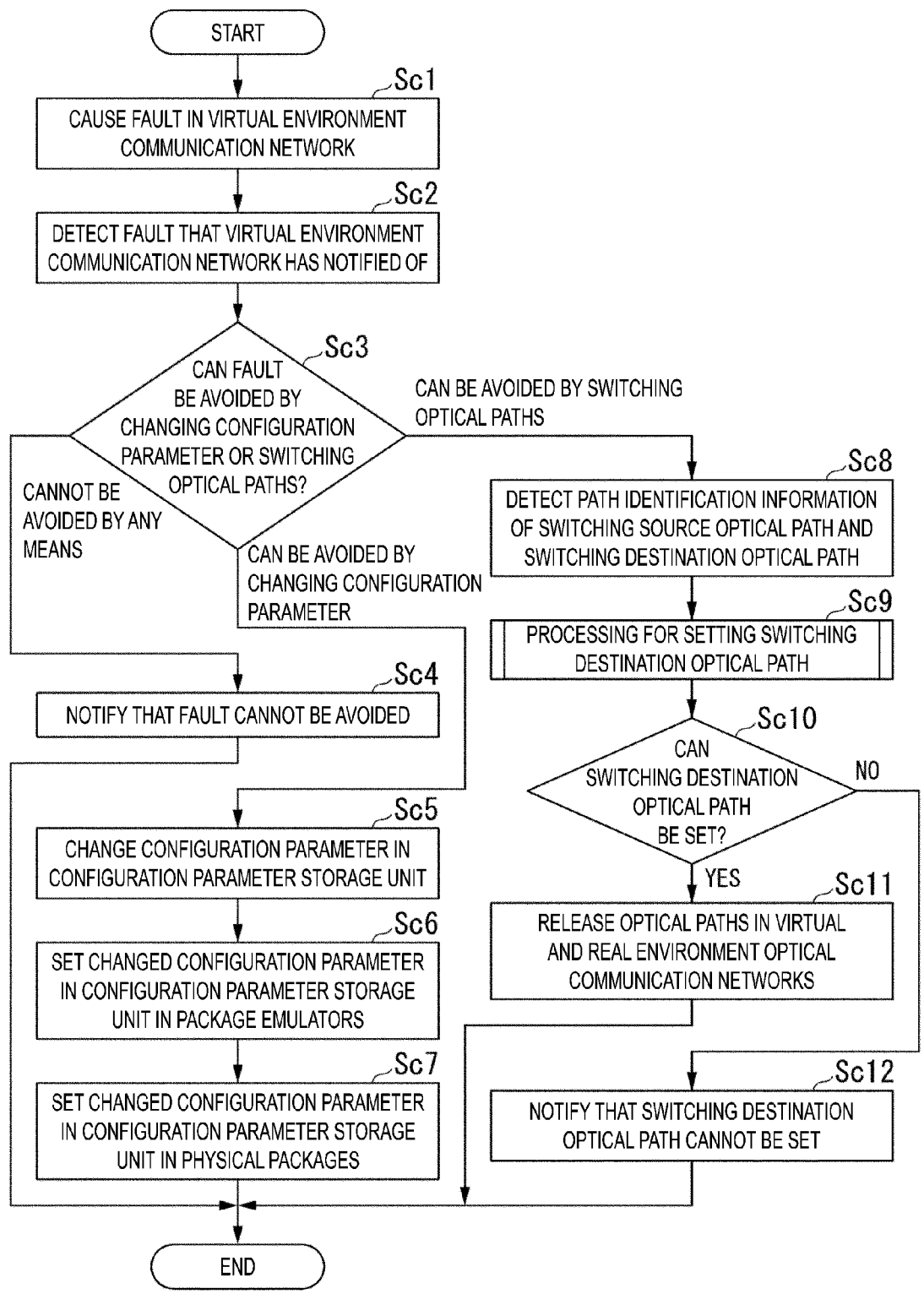
FIG. 20 is a flowchart showing a flow of a process performed by the optical communication network management apparatus of the fourth embodiment.

Process of Optical Communication Network Management Apparatus of Fourth Embodiment Hereinafter, a process performed by the optical communication network management apparatus 1c of the fourth embodiment will be described. FIG. 20 is a flowchart showing a flow of the process performed by the optical communication network management apparatus 1c according to the fourth embodiment. It is assumed that, before the process according to the flowchart of FIG. 20 starts, the process shown in the flowcharts of FIGS. 9 and 10 of the first embodiment has already been completed and optical paths that are running have been set.

The virtual environment usage optimization unit 204 connects to the control units 411-1 to 411-n of the package emulators 41-1 to 41-n via the virtual environment communication unit 21 and causes a freely defined fault in the virtual environment optical communication network 40 (step Sc1). The control units 411-1 to 411-n detect the fault and transmit a fault notification signal including the content of the detected fault to the virtual environment usage optimization unit 204 via the virtual environment communication unit 21. The virtual environment usage optimization unit 204 receives the fault notification signal transmitted by the control units 411-1 to 411-n (step Sc2).

The virtual environment usage optimization unit 204 determines whether the caused fault can be avoided by changing a configuration parameter or changing an optical path based on the cause of the caused fault and a result of the caused fault included in the fault notification signal (step Sc3). Upon determining that the fault cannot be avoided by any means ("cannot be avoided by any means" in step Sc3), the virtual environment usage optimization unit 204 notifies the outside that the caused fault cannot be avoided (step Sc4) and the process is terminated.

On the other hand, upon determining that the fault can be avoided by changing a configuration parameter ("can be avoided by changing configuration parameter" in step Sc3), the virtual environment usage optimization unit 204 identifies a configuration parameter to be changed and generates a changed configuration parameter for the identified configuration parameter. The virtual environment usage optimization unit 204 rewrites the configuration parameter identified in the configuration parameter table 141 with the generated changed configuration parameter (step Sc5).

Upon detecting that the configuration parameter in the configuration parameter table 141 has changed, the virtual environment configuration management unit 201 identifies the changed configuration parameter and generates a configuration command necessary to set the identified configuration parameter. The virtual environment configuration management unit 201 connects to the control units 411-1 to 411-n of the package emulators 41-1 to 41-n via the virtual environment communication unit 21. The virtual environment configuration management unit 201 applies the generated configuration command to the connected control units 411-1 to 411-n to change corresponding configuration parameters (step Sc6).

Upon detecting that the configuration parameter table 141 has changed, the real environment configuration parameter update unit 23 identifies the changed configuration parameter and generates a configuration command necessary to set the identified configuration parameter. Similar to the configuration generation unit 17, the real environment configuration parameter update unit 23 stores configuration command templates for each configuration parameter for each type of physical packages 31-1 to 31-n in the internal storage area in advance. The real environment configuration parameter update unit 23 selects a configuration command template corresponding to the configuration parameter from the configuration command templates and applies the set configuration parameter to the selected configuration command template to generate a configuration command.

The real environment configuration parameter update unit 23 connects to the control units 311-1 to 311-n of the physical packages 31-1 to 31-n via the real environment communication unit 11. The real environment configuration parameter update unit 23 applies the generated configuration command to the connected control units 311-1 to 311-n to change corresponding configuration parameters (step Sc7) and the process is terminated.

On the other hand, upon determining that the fault can be avoided by changing an optical path ("can be avoided by changing optical path" in step Sc3), the virtual environment usage optimization unit 204 refers to the resource table 161 and detects a piece of path identification information corresponding to an idle resource that is a candidate for a switching destination optical path and a piece of path identification information of a switching source optical path that is running (step Sc8).

Figure 21:
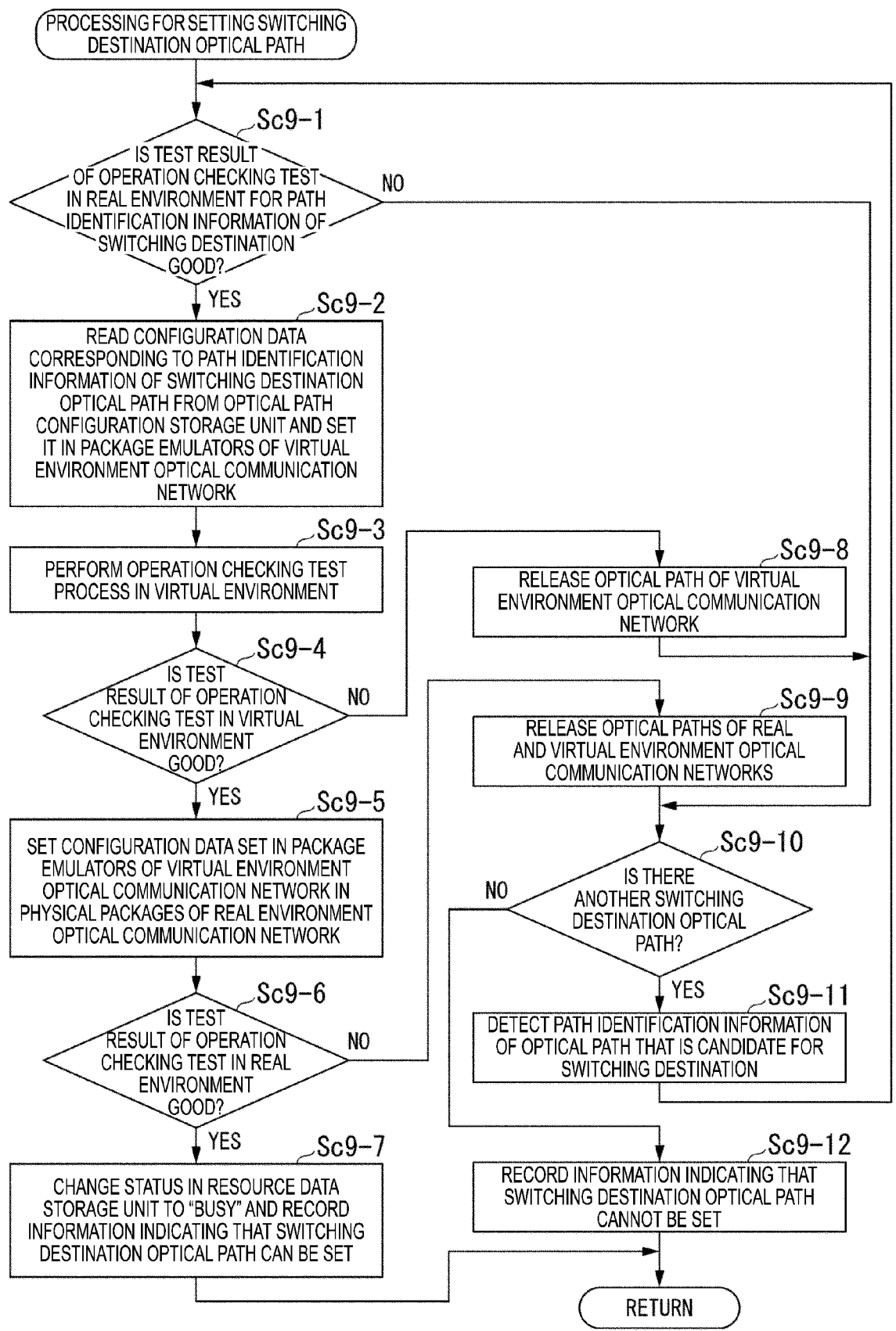
FIG. 21 is a flowchart of a subroutine of switching destination optical path setting processing in the process performed by the optical communication network management apparatus of the fourth embodiment.

The virtual environment usage optimization unit 204 performs a subroutine of switching destination optical path setting processing shown in FIG. 21 based on the piece of path identification information of the switching destination optical path (step Sc9).

The virtual environment usage optimization unit 204 refers to the real environment test result table 221 and determines whether the test result of the operation checking test process corresponding to the piece of path identification information of the switching destination optical path is good (step Sc9-1). Upon determining that the read test result corresponding to the piece of path identification information is not good (NO in step Sc9-1), the virtual environment usage optimization unit 204 proceeds to the processing of step Sc9-10.

On the other hand, upon determining that the test result of the operation checking test process corresponding to the piece of path identification information of the switching destination optical path is good (YES in step Sc9-1), the virtual environment usage optimization unit 204 outputs a path setting request signal including the piece of path identification information to the virtual environment optical path setting unit 202.

The virtual environment optical path setting unit 202 receives the path setting request signal from the virtual environment usage optimization unit 204 and performs the same processing as in step S23 of FIG. 10 based on the path setting request signal (step Sc9-2). In the processing of steps Sc9-3 and Sc9-4, the same processing as in steps S24 and S25 of FIG. 10 is performed by the virtual environment optical path setting unit 202.

Upon determining in step Sc9-4 that the result of the operation checking test process is not good (NO in step Sc9-4), the virtual environment optical path setting unit 202 releases the optical path set in the virtual environment optical communication network 40 in Sc9-2. When setting of the optical path has failed in step Sc9-2, the virtual environment optical path setting unit 202 does not perform the operation checking test process in step Sc9-3 and determines in step Sc9-4 that the result of the operation checking test process is not good. The virtual environment optical path setting unit 202 outputs a resource data check instruction signal instructing to check whether there is another idle resource to the virtual environment usage optimization unit 204 (step Sc9-8).

Upon determining in step Sc9-4 that the result of the operation checking test process is good (YES in step Sc9-4), the virtual environment optical path setting unit 202 outputs a path setting completion response signal including the piece of path identification information to the virtual environment usage optimization unit 204. Upon receiving the path setting completion response signal from the virtual environment optical path setting unit 202, the virtual environment usage optimization unit 204 outputs a path setting request signal including the piece of path identification information included in the path setting completion response signal to the real environment optical path setting unit 19.

Upon receiving the path setting request signal from the virtual environment usage optimization unit 204, the real environment optical path setting unit 19 performs the same processing as in step Sb9 shown in FIG. 17 of the third embodiment based on the path design request (step Sc9-5). However, in the case of the processing of step Sc9-5, the real environment optical path setting unit 19 outputs a path setting completion response signal or a path setting impossibility response signal to the virtual environment usage optimization unit 204.

Upon receiving the path setting completion response signal or the path setting impossibility response signal from the real environment optical path setting unit 19, the virtual environment usage optimization unit 204 refers to the "test result of operation checking test in real environment" field of the real environment test result table 221 corresponding to the piece of path identification information included in the path setting completion response signal or the path setting impossibility response signal and determines whether the test result of the operation checking test process in the real environment optical communication network 3 is good (step Sc9-6).

Upon determining that the test result of the operation checking test process in the real environment optical communication network 3 is good (YES in step Sc9-6), the virtual environment usage optimization unit 204 rewrites the "status" field of the resource table 161 corresponding to the piece of path identification information that is being processed with "busy" and records information indicating that a switching destination optical path can be set in the internal storage area (step Sc9-7).

On the other hand, upon determining that the test result of the operation checking test process in the real environment optical communication network 3 is not good (NO in step Sc9-6), the virtual environment usage optimization unit 204 outputs a path release instruction signal including the piece of path identification information that is being processed to the real environment optical path setting unit 19 and the virtual environment optical path setting unit 202 and the process proceeds to step Sc9-10. Upon receiving the path release instruction signal from the virtual environment usage optimization unit 204, the real environment optical path setting unit 19 releases an optical path corresponding to the piece of path identification information included in the path release instruction signal. Upon receiving the path release instruction signal from the virtual environment usage optimization unit 204, the virtual environment optical path setting unit 202 releases an optical path corresponding to the piece of path identification information included in the path release instruction signal (step Sc9-9).

Upon determining "No" in step Sc9-1 or upon receiving a resource data check instruction signal from the virtual environment optical path setting unit 202 through the processing of step Sc9-8, or after the processing of step Sc9-9, the virtual environment usage optimization unit 204 refers to the resource table 161 and determines whether there is another piece of idle path identification information that is a candidate for a switching destination optical path (step Sc9-10).

Upon determining that there is another piece of idle path identification information that is a candidate for a switching destination optical path (YES in step Sc9-10), the virtual environment usage optimization unit 204 reads a piece of path identification information corresponding to an idle resource that is a candidate for a switching destination optical path from the resource table 161 (step Sc9-11) and performs the processing from step Sc9-1.

On the other hand, upon determining that there is no other idle resource that is a candidate for a switching destination optical path (NO in step Sc9-10), the virtual environment usage optimization unit 204 records information indicating that a switching destination optical path cannot be set in the internal storage area (step Sc9-12) and the subroutine is terminated.

The virtual environment usage optimization unit 204 refers to the internal storage area and determines whether a switching destination optical path can be set (step Sc10). Upon determining that a switching destination optical path can be set (YES in step Sc10), the virtual environment usage optimization unit 204 outputs a path release instruction signal including the piece of path identification information of the switching source optical path to the virtual environment optical path setting unit 202 and the real environment optical path setting unit 19 and rewrites the "status" field corresponding to the piece of path identification information of the switching source optical path in the resource table 161 with "idle." Upon receiving the path release instruction signal from the virtual environment usage optimization unit 204, the virtual environment optical path setting unit 202 releases the optical path of the piece of path identification information included in the path release instruction signal in the virtual environment optical communication network 40. Upon receiving the path release instruction signal from the virtual environment usage optimization unit 204, the real environment optical path setting unit 19 releases the optical path of the piece of path identification information included in the path release instruction signal in the real environment optical communication network 3 (step Sc11) and the process is terminated.

On the other hand, upon determining that a switching destination optical path cannot be set (NO in step Sc10), the virtual environment usage optimization unit 204 notifies the outside that the optical path cannot be switched (step Sc12) and the process is terminated.

In the optical communication network management apparatus 1c of the fourth embodiment described above, the virtual environment usage optimization unit 204 performs an optimization process that includes causing a freely defined fault in the virtual environment optical communication network 40 and changing a configuration parameter stored in the configuration parameter storage unit 14 such that the fault can be avoided or changing an optical path such that the fault can be avoided based on the cause of the caused fault and the result of the fault. Thus, it is possible to optimize the configurations of optical paths that are running in the real environment optical communication network 3 and also to maintain the states of the virtual environment optical communication network 40 closer to the states of the real environment optical communication network 3 through the optimized configuration parameters. In other words, in the fourth embodiment, simulating various failure states, configuration changes of optical paths, or the like and verifying the fault tolerance on the simulation ensures that problems in the real environment optical communication network 3 can be identified without affecting optical paths that are running. As a result, it is easy to achieve an improvement in the quality of the real environment optical communication network 3 and it is possible to reduce the OPEX required to run the real environment optical communication network 3.

In the fourth embodiment described above, the virtual environment configuration management unit 201 may construct a plurality of virtual environment optical communication networks 40 in the virtual environment construction apparatus 4 and the virtual environment usage optimization unit 204 may cause different faults in the plurality of virtual environment optical communication networks 40 to perform the processing shown in FIG. 20. Causing different faults in the plurality of virtual environment optical communication networks 40 can optimize configuration parameters faster.

In the fourth embodiment described above, if a problem occurs when the virtual environment configuration management unit 201 sets a configuration parameter in the control units 411-1 to 411-n of the package emulators 41-1 to 41-n in step Sc6, the configuration parameter set in step Sc6 may be restored to the original and the real environment configuration parameter update unit 23 may not perform the processing of step Sc7. This can prevent an unexpected fault from occurring in the real environment optical communication network 3 in which there are optical paths that are running.

Fifth Embodiment

Figure 22:
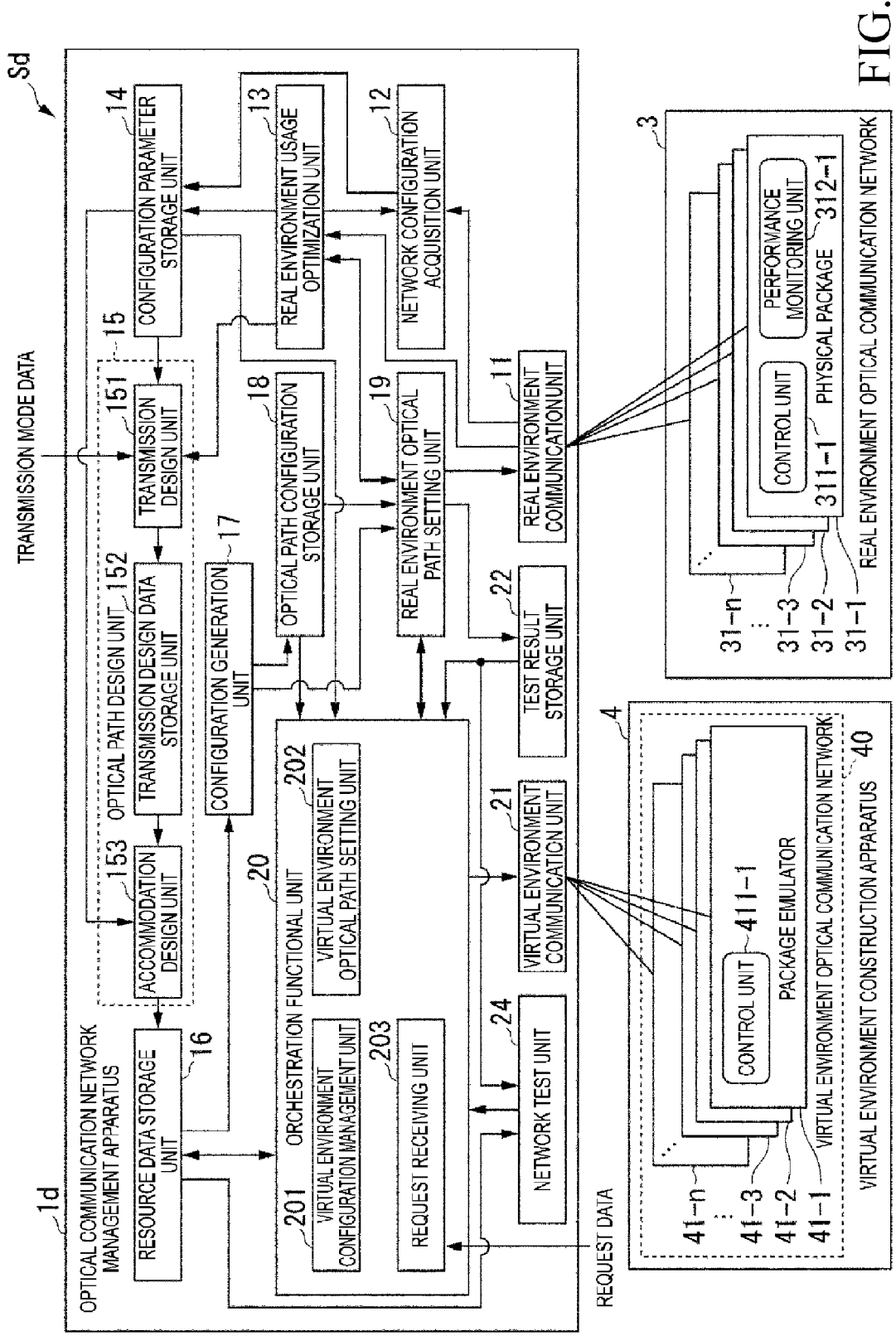
FIG. 22 is a block diagram illustrating a configuration of an optical communication network management system according to a fifth embodiment.

FIG. 22 is a block diagram illustrating a configuration of an optical communication network management system Sd according to a fifth embodiment. In the fifth embodiment, configuration parameters of a real environment optical communication network 3 are optimized by tentatively setting an optical path in the real environment optical communication network 3 using an idle resource.

In the fifth embodiment, the same components as those of the first embodiment are designated by the same reference signs and different components from those of the first embodiment are described below. The optical communication network management system Sd includes an optical communication network management apparatus 1d, the real environment optical communication network 3, and a virtual environment construction apparatus 4.

The optical communication network management apparatus 1d includes a real environment communication unit 11, a network configuration acquisition unit 12, a real environment usage optimization unit 13, a configuration parameter storage unit 14, an optical path design unit 15, a resource data storage unit 16, a configuration generation unit 17, an optical path configuration storage unit 18, a real environment optical path setting unit 19, an orchestration functional unit 20, a virtual environment communication unit 21, a test result storage unit 22, and a network test unit 24.

The network test unit 24 includes a time measuring unit such as a clock provided internally and acquires time information from the time measuring unit at regular time intervals. The network test unit 24 refers to a resource table 161 in the resource data storage unit 16 and a real environment test result table 221 in the test result storage unit 22 and detects a piece of idle path identification information which has not been subjected to the operation checking test process in the real environment optical communication network 3 for a certain predetermined time. The network test unit 24 outputs a temporary path setting instruction signal including the detected piece of path identification information to the virtual environment optical path setting unit 202, thereby setting an optical path in each of the virtual environment optical communication network 40 and the real environment optical communication network 3 to perform an operation checking test process for the set optical path and update configuration parameters.

Figure 23:
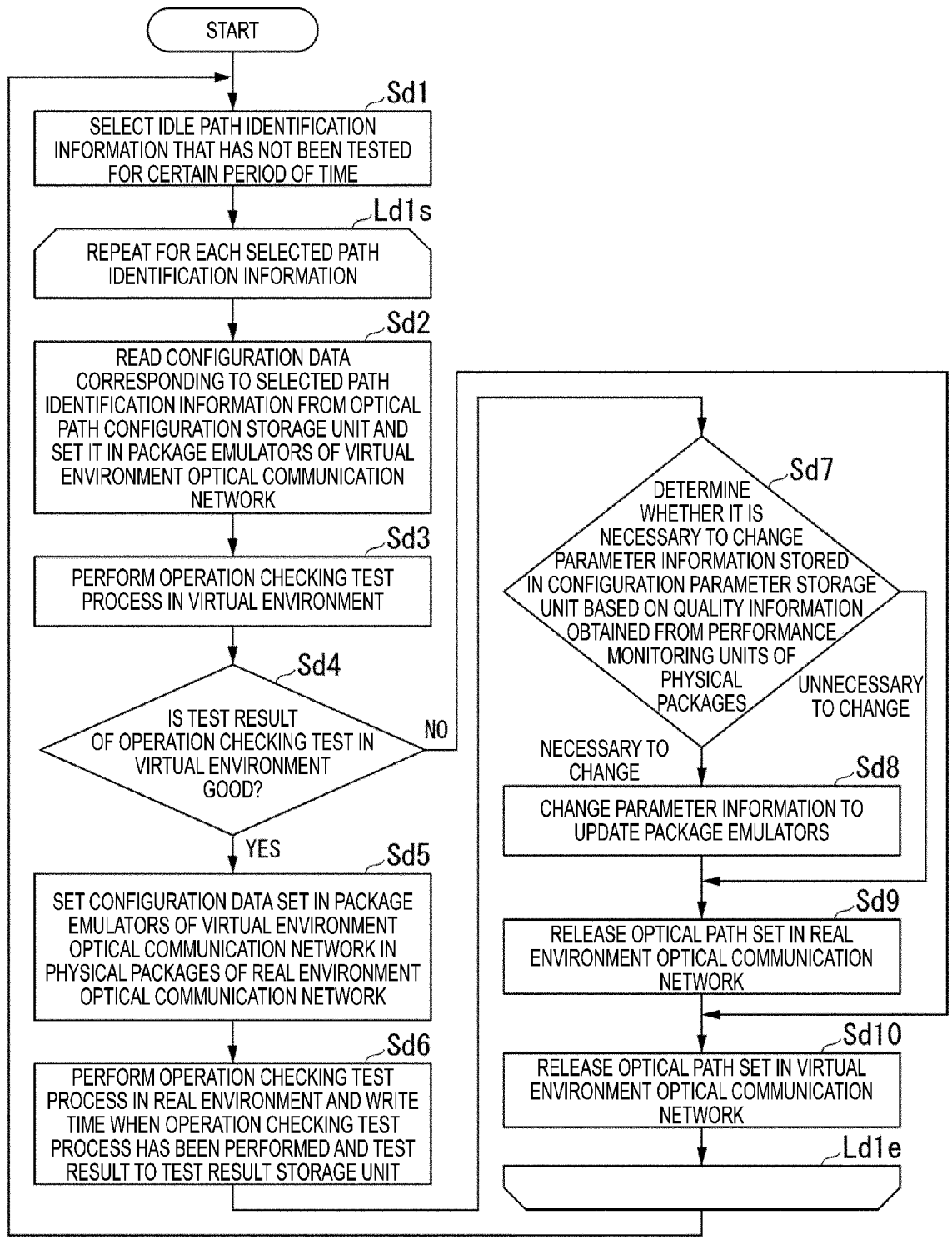
FIG. 23 is a flowchart showing a flow of a process performed by the optical communication network management apparatus of the fifth embodiment.

Process of Optical Communication Network Management Apparatus of Fifth Embodiment Hereinafter, a process performed by the optical communication network management apparatus 1d of the fifth embodiment will be described. FIG. 23 is a flowchart showing a flow of the process performed by the optical communication network management apparatus 1d according to the fifth embodiment. It is assumed that, before the process according to the flowchart of FIG. 23 starts, the process shown in the flowcharts of FIGS. 9 and 10 of the first embodiment has already been completed and optical paths that are running have been set.

The network test unit 24 acquires time information from the internal time measuring unit at regular time intervals. The network test unit 24 detects pieces of path identification information for which the "status" field is idle from the resource table 161. The network test unit 24 refers to the real environment test result table 221 and selects pieces of path identification information, for which the time of the "processing time" field plus a certain predetermined time exceeds the time acquired from the time measuring unit, from the detected pieces of path identification information (step Sd1).

The processing of the following steps Sd2 to Sd10 is performed repeatedly for each piece of path identification information selected by the network test unit 24 (loop of Ld1s to Ld1e).

The network test unit 24 selects one of the pieces of path identification information and outputs a temporary path setting instruction signal including the selected piece of path identification information to the virtual environment optical path setting unit 202. Upon receiving the temporary path setting instruction signal from the network test unit 24, the virtual environment optical path setting unit 202 reads a piece of configuration data corresponding to the piece of path identification information included in the temporary path setting instruction signal from the optical path configuration table 181. The virtual environment optical path setting unit 202 refers to configuration commands and setting order data included in the read piece of configuration data and sets the configuration commands in control units 411-1 to 411-n of corresponding package emulators 41-1 to 41-n in the setting order indicated by the setting order data. As a result, an optical path is set in the virtual environment optical communication network 40 (step Sd2).

In steps Sd3 and Sd4, the same processing as in steps S24 and S25 in FIG. 10 is performed by the virtual environment optical path setting unit 202.

Upon determining in step Sd4 that the result of the operation checking test process is good (YES in step Sd4), the virtual environment optical path setting unit 202 outputs a temporary path setting instruction signal including the piece of path identification information included in the temporary path setting instruction signal received from the network test unit 24 to the real environment optical path setting unit 19. Upon receiving the temporary path setting instruction signal from the network test unit 24, the real environment optical path setting unit 19 performs the same processing as in step S7 of FIG. 9 based on the received temporary path setting instruction signal (step Sd5). In step Sd6, the same processing as in step S8 of FIG. 9 is performed by the real environment optical path setting unit 19.

When the processing of step Sd6 has been completed, the real environment optical path setting unit 19 outputs a completion notification signal including the piece of path identification information included in the temporary path setting instruction signal received from the virtual environment optical path setting unit 202 to the real environment usage optimization unit 13. The real environment usage optimization unit 13 receives the completion notification signal from the real environment optical path setting unit 19 and performs the same processing as in step S9 of FIG. 9 (step Sd7).

Upon determining that it is necessary to change a configuration parameter ("necessary to change" in step Sd7), the real environment usage optimization unit 13 changes the configuration parameter that it is necessary to change from among the configuration parameters stored in the configuration parameter table 141. Upon detecting that a configuration parameter in the configuration parameter table 141 has changed, the virtual environment configuration management unit 201 connects to control units 411-1 to 411-n of package emulators 41-1 to 41-n corresponding to the changed configuration parameter via the virtual environment communication unit 21. The virtual environment configuration management unit 201 rewrites configuration parameters corresponding to the changed configuration parameter in the connected control units 411-1 to 411-n (step Sd8) and the process proceeds to step Sd9.

On the other hand, upon determining that it is unnecessary to change a configuration parameter ("unnecessary to change" is step Sd7) or after the processing of step Sd8, the real environment usage optimization unit 13 outputs a path release instruction signal including the piece of path identification information included in the completion notification signal to the real environment optical path setting unit 19 (step Sd9).

Upon receiving the path release instruction signal from the real environment usage optimization unit 13, the real environment optical path setting unit 19 releases an optical path corresponding to the piece of path identification information included in the path release instruction signal in the real environment optical communication network 3 and outputs a path release instruction signal including the piece of path identification information to the virtual environment optical path setting unit 202 (step Sd9).

In step Sd10, processing is performed in two ways. Upon determining in step Sd4 that the result of the operation checking test process is not good (NO in step Sd4), the virtual environment optical path setting unit 202 releases the optical path set in the virtual environment optical communication network 40 in step Sd2 (step Sd10). On the other hand, upon receiving the path release instruction signal from the real environment optical path setting unit 19, the virtual environment optical path setting unit 202 releases an optical path corresponding to the piece of path identification information included in the path release instruction signal in the virtual environment optical communication network 40 (step Sd10).

When the processing up to step Sd10 has been completed, the processing from step Sd2 is repeated for the next piece of path identification information (loop Ld1e) and then the processing from step Sd1 is repeated.

Although the fifth embodiment described above is configured such that, in step Sd1, pieces of idle path identification information are selected based on the processing time of the operation checking test process performed in the past in the real environment optical communication network 3 and the processing from step Sd1 shown in FIG. 23 is then performed, configurations of the present invention are not limited to this embodiment. All pieces of idle path identification information stored in the resource table 161 may be selected in step Sd1 at regular time intervals, for example, at midnight every day, and processing from step Sd1 shown in FIG. 23 may then be performed.

In the optical communication network management apparatus 1d of the fifth embodiment, the network test unit 24 selects pieces of path identification information corresponding to idle resources at regular time intervals or selects pieces of path identification information corresponding to idle resources which have not been subjected to the operation checking test process of the real environment optical path setting unit 19 for a certain period of time. The real environment optical path setting unit 19 reads a piece of configuration data corresponding to a piece of path identification information selected by the network test unit 24 from the optical path configuration table 181 and temporarily sets an optical path in the real environment optical communication network 3 based on the read piece of configuration data and then performs an operation checking test process on the set optical path according to a test checking procedure included in the piece of configuration data. This ensures that configuration parameters of the real environment optical communication network 3 and configuration parameters of the virtual environment optical communication network 40 can be matched constantly, such that it is possible to maintain the states of the virtual environment optical communication network 40 closer to the states of the real environment optical communication network 3.

Sixth Embodiment

Figure 24:
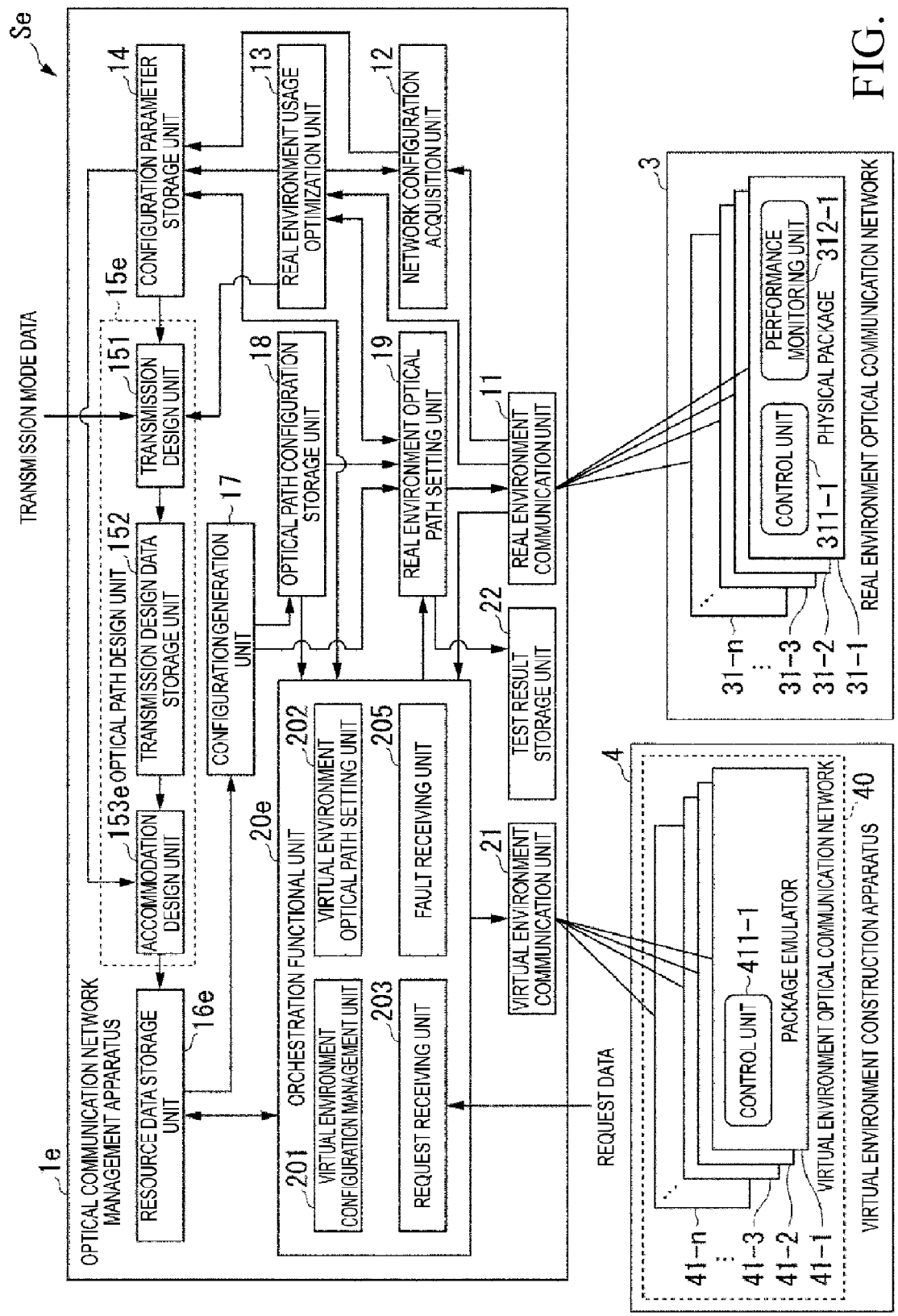
FIG. 24 is a block diagram illustrating a configuration of an optical communication network management system according to a sixth embodiment.

FIG. 24 is a block diagram illustrating a configuration of an optical communication network management system 5e according to a sixth embodiment. The sixth embodiment includes a configuration for switching a main line that is running to a redundant line when a failure has occurred in a real environment optical communication network 3.

In the sixth embodiment, the same components as those of the first embodiment are designated by the same reference signs and different components from those of the first embodiment are described below. The optical communication network management system Se includes an optical communication network management apparatus 1e, the real environment optical communication network 3, and a virtual environment construction apparatus 4.

The optical communication network management apparatus 1e includes a real environment communication unit 11, a network configuration acquisition unit 12, a real environment usage optimization unit 13, a configuration parameter storage unit 14, an optical path design unit 15e, a resource data storage unit 16e, a configuration generation unit 17, an optical path configuration storage unit 18, a real environment optical path setting unit 19, an orchestration functional unit 20e, a virtual environment communication unit 21, and a test result storage unit 22.

The resource data storage unit 16e stores the resource table 161 shown in FIG. 6 and a redundant line table 162 shown in FIG. 25. As shown in FIG. 25, the redundant line table 162 has fields of "main line path identification information," "redundant line path identification information," and "weight." In the "main line path identification information" field, the same pieces of path identification information as those written to the "path identification information" field of the resource table 161 are written. In the "redundant line path identification information" field, pieces of path identification information corresponding to paths that serve as redundant lines when a path of a piece of path identification information written to a corresponding entry of the "main line path identification information" field is used as a main line are written. In the "weight" field, values indicating the weights for the pieces of path identification information of corresponding redundant lines are written, for example, as integer values in a range of 0 to 10.

For example, the weight value is set such that it increases the closer the transmission delay time is. The example shown in FIG. 25 shows examples of redundant lines in the real environment optical communication network 3 shown in FIG. 2, where when the path identification information "1" is used as a main line, paths of the path identification information "2," "3" and "4" are candidates for redundant lines because these are all paths from the site A to the site D. From the viewpoint of transmission delay, the cost of the path of the path identification information "1" is "1" and the cost of the path of the path identification information "2" is also "1" as shown in the resource table 161 of FIG. 6 and thus it is considered that their transmission delay times are closer. Therefore, the weight corresponding to the path identification information "2" which is a redundant line for the path identification information "1" is set to "10." On the other hand, the costs of the paths of the path identification information "3" and "4" are "2." Thus, the weights corresponding to the path identification information "3" and "4" which are redundant lines for the path identification information "1" are set to "5" which is smaller than "10."

The optical path design unit 15e includes a transmission design unit 151, a transmission design data storage unit 152, and an accommodation design unit 153e. The accommodation design unit 153e has the same configuration as the accommodation design unit 153 of the first embodiment and further has the following configuration. The accommodation design unit 153e generates all records of the resource table 161 in the processing of step S5 shown in FIG. 9 and detects the pieces of path identification information of redundant lines for the piece of path identification information of each main line based on data stored in the resource table 161 and data stored in the transmission design table 1521. The accommodation design unit 153e determines weight values for the redundant lines based on their values of the "cost" field of the resource table 161. For example, a table indicating weight values for the costs are stored in an internal storage area of the accommodation design unit 153e in advance and the accommodation design unit 153e refers to the table to determine the weight values. The accommodation design unit 153e generates the redundant line table 162 in the resource data storage unit 16e based on the detected combinations of the piece of path identification information of each main line and the pieces of path identification information of redundant lines and the determined weight values.

The orchestration functional unit 20e includes a virtual environment configuration management unit 201, a virtual environment optical path setting unit 202, a request receiving unit 203, and a fault receiver 205. The fault receiving unit 205 receives a fault notification signal transmitted by a control unit 311-1 to 311-n of a physical package 31-1 to 31-n of the real environment optical communication network 3 via the real environment communication unit 11. Here, the fault notification signal is a signal for notifying that a fault has occurred. The fault receiving unit 205 performs a process of referring to the redundant line table 162, detecting the pieces of path identification information of redundant lines for the piece of path identification information of a faulty optical path included in the received fault notification signal in ascending order of the weight values, and switching the optical path of the main line to the optical path of a redundant line.

Figure 26:
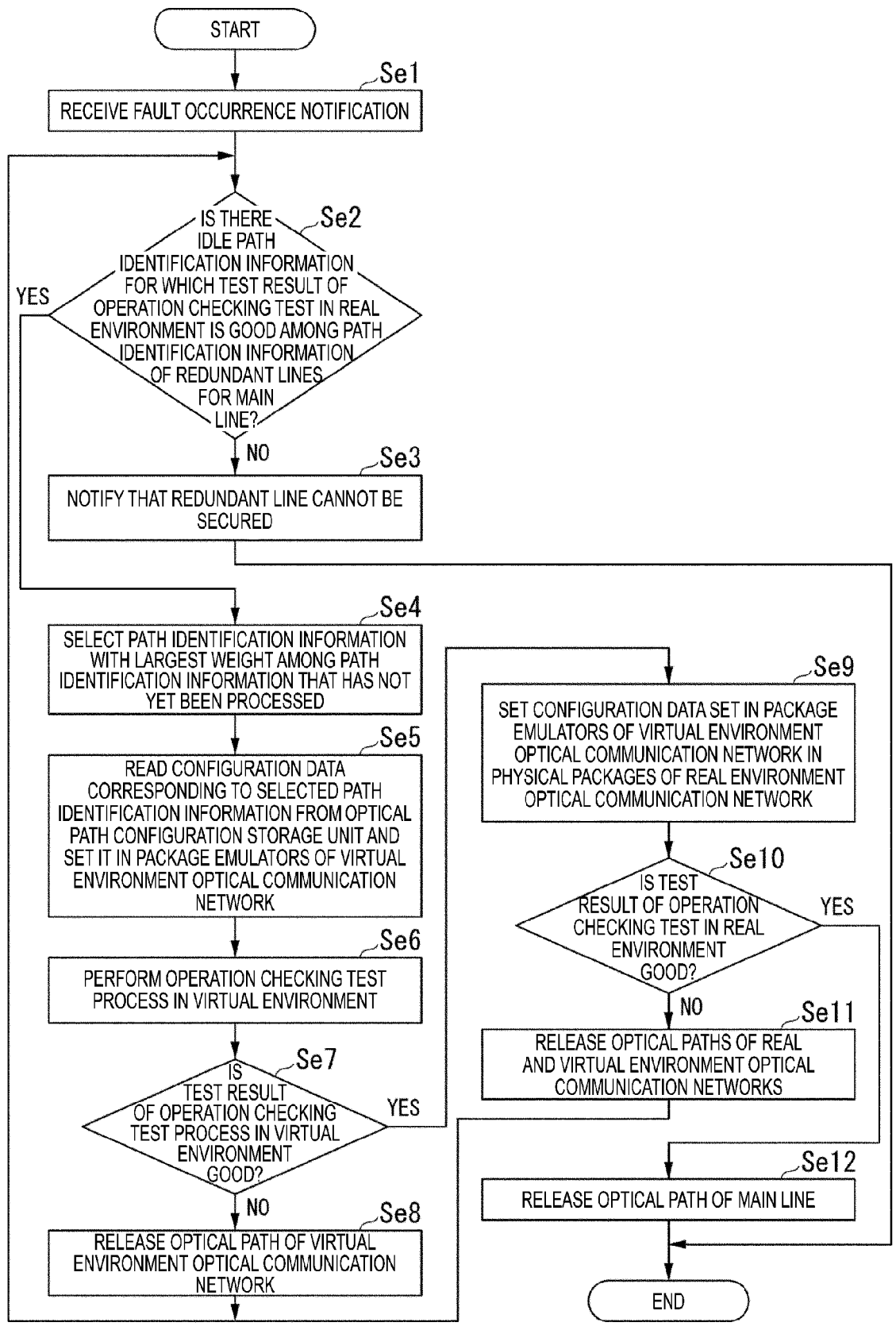
FIG. 26 is a flowchart showing a flow of a process performed by the optical communication network management apparatus of the sixth embodiment.

Process of Optical Communication Network Management Apparatus of Sixth Embodiment Hereinafter, a process performed by the optical communication network management apparatus 1e of the fifth embodiment will be described. FIG. 26 is a flowchart showing a flow of the process performed by the optical communication network management apparatus 1e according to the fifth embodiment. It is assumed that, before the process according to the flowchart of FIG. 26 starts, the process shown in the flowcharts of FIGS. 9 and 10 of the first embodiment has already been completed and optical paths that are running have been set. It is also assumed that the accommodation design unit 153e has generated the redundant line table 162 in the resource data storage unit 16e.

It is assumed that a fault has occurred in one of the physical packages 31-1 to 31-n of the real environment optical communication network 3. A control unit 311-1 to 311-n of the physical package 31-1 to 31-n in which the fault has occurred transmits a fault notification signal including the piece of path identification information of an optical path affected by the fault to the fault receiving unit 205 via the real environment communication unit 11. The fault receiving unit 205 receives the fault notification signal (step Se1).

The fault receiving unit 205 refers to the resource table 161, the redundant line table 162, and the real environment test result table 221 and determines whether there is a piece of path identification information that matches conditions that the piece of path identification information be idle and the test result of an operation checking test process in the real environment optical communication network 3 be good among the pieces of path identification information of redundant lines corresponding to the piece of path identification information of a main line included in the fault notification signal (step Se2). Upon determining that there is no piece of path identification information matching the conditions (NO in step Se2), the fault receiving unit 205 notifies the outside that a redundant line cannot be secured (step Se3) and the process is terminated.

On the other hand, upon determining that there is a piece of path identification information matching the conditions (YES in step Se2), the fault receiving unit 205 selects a piece of path identification information with the largest weight value among pieces of path identification information that have not been processed, that is, among those that have not been selected as redundant lines to which the switching is to be made. The fault receiving unit 205 outputs a path setting request signal including the selected piece of path identification information to the virtual environment optical path setting unit 202 (step Se4). In the initial processing of step Se4, not all pieces of path identification information matching the conditions are processed and thus a piece of path identification information with the largest weight value among the pieces of path identification information matching the conditions is selected.

The virtual environment optical path setting unit 202 receives the path setting request signal from the fault receiving unit 205 and performs the same processing as in step S23 of FIG. 10 based on the path setting request signal (step Se5). In the processing of steps Se6 and Se7, the same processing as in steps S24 and S25 of FIG. 10 is performed by the virtual environment optical path setting unit 202.

Upon determining in step Se7 that the result of the operation checking test process is not good (NO in step Se7), the virtual environment optical path setting unit 202 releases the optical path set in the virtual environment optical communication network 40. When setting of the optical path has failed in step Se5, the virtual environment optical path setting unit 202 does not perform the operation checking test process in step Se6 and determines in step Se7 that the result of the operation checking test process is not good. The virtual environment optical path setting unit 202 outputs a redundant line check instruction signal including the piece of path identification information of the redundant line included in the path setting request to the fault receiving unit 205 (step Se8).

Upon determining in step Se7 that the result of the operation checking test process is good (YES in step Se7), the virtual environment optical path setting unit 202 outputs a path setting completion response signal including the piece of path identification information to the fault receiving unit 205. Upon receiving the path setting completion response signal from the virtual environment optical path setting unit 202, the fault receiving unit 205 outputs a path setting request signal including the piece of path identification information included in the path setting completion response signal to the real environment optical path setting unit 19.

Upon receiving the path setting request signal from the fault receiving unit 205, the real environment optical path setting unit 19 performs the same processing as in step Sb9 shown in FIG. 17 of the third embodiment based on the path design request (step Se9). However, in the case of the processing of step Se9, the real environment optical path setting unit 19 outputs a path setting completion response signal or a path setting impossibility response signal to the fault receiving unit 205.

Upon receiving the path setting completion response signal or the path setting impossibility response signal from the real environment optical path setting unit 19, the fault receiving unit 205 refers to the "test result of operation checking test in real environment" field of the real environment test result table 221 corresponding to the piece of path identification information included in the path setting completion response signal or the path setting impossibility response signal and determines whether the test result of the operation checking test process in the real environment optical communication network 3 is good (step Se10).

Upon determining that the test result of the operation checking test process in the real environment optical communication network 3 is good (YES in step Se10), the fault receiving unit 205 rewrites the "status" field of the resource table 161 corresponding to the piece of path identification information of the redundant line with "busy" and rewrites the "status" field of the resource table 161 corresponding to the piece of path identification information of the main line with "disabled."

The fault receiving unit 205 outputs a path release instruction signal including the piece of path identification information of the main line to the real environment optical path setting unit 19 and the virtual environment optical path setting unit 202. Upon receiving the path release instruction signal from the fault receiving unit 205, the real environment optical path setting unit 19 releases an optical path corresponding to the piece of path identification information included in the path release instruction signal. Upon receiving the path release instruction signal from the fault receiving unit 205, the virtual environment optical path setting unit 202 releases an optical path corresponding to the piece of path identification information included in the path release instruction signal (step Se12) and the process is terminated. As a result, the optical path is switched from the main line to the redundant line.

On the other hand, upon determining that the test result of the operation checking test process in the real environment optical communication network 3 is not good (NO in step Se10), the fault receiving unit 205 outputs a path release instruction signal including the piece of path identification information that is being processed to the real environment optical path setting unit 19 and the virtual environment optical path setting unit 202 and the process proceeds to step Set. Upon receiving the path release instruction signal from the virtual environment usage optimization unit 204, the real environment optical path setting unit 19 releases an optical path corresponding to the piece of path identification information included in the path release instruction signal. Upon receiving the path release instruction signal from the virtual environment usage optimization unit 204, the virtual environment optical path setting unit 202 releases an optical path corresponding to the piece of path identification information included in the path release instruction signal (step Se11).

Upon receiving the redundant line check instruction signal from the virtual environment optical path setting unit 202 through the processing of step Se8, or after the processing of step Se11, the fault receiving unit 205 performs the processing from step Se2 on pieces of path identification information of redundant lines other than the piece of path identification information of the redundant line that has been processed. When there are other pieces of path identification information of redundant lines in the redundant line table 162, the fault receiving unit 205 selects the piece of path identification information of a redundant line with the next largest weight value in step Se4.

Although the weight value is set such that it increases the closer the transmission delay time is in the above example of the sixth embodiment, the weight value may also be set such that the weight value for a path increases the less it overlaps with other paths passing through the optical fiber transmission lines 71 to 75.

When the fault notification signal includes the name of a node affected by a fault or both the name of the node and a package number, rather than including a piece of path identification information, the fault receiving unit 205 may refer to the resource table 161 to determine the piece of path identification information of an optical path affected by the fault.

In the optical communication network management apparatus 1e of the sixth embodiment, the optical path design unit 15e detects, for each piece of path identification information, optical paths that are redundant lines for an optical path that is a main line and associates and stores the optical path that is the main line and the optical paths that are the redundant lines in the resource data storage unit 16e. Upon being notified of fault data indicating a fault from the real environment optical communication network 3, the fault receiving unit 205 refers to the resource data storage unit 16e to select a piece of path identification information corresponding to an optical path that is a main line affected by the fault and pieces of path identification information of redundant lines corresponding to the optical path that is the main line. The virtual environment optical path setting unit 202 reads pieces of configuration data corresponding to the piece of path identification information of the main line and the pieces of path identification information of the redundant lines selected by the fault receiving unit 205 from the optical path configuration table 181 and performs optical path switching from the main line to a redundant line in the virtual environment optical communication network 40 based on the read pieces of configuration data. The real environment optical path setting unit 19 performs optical path switching from the main line to a redundant line in the real environment optical communication network 3 based on the pieces of configuration data that the virtual environment optical path setting unit 202 has used to perform optical path switching from the main line to the redundant line in the virtual environment optical communication network 40. Thus, it is possible to verify switching to a redundant line in the virtual environment optical communication network 40 in advance and it is possible to prevent the occurrence of an unexpected fault due to switching to a redundant line in the real environment optical communication network 3.

Steps Sb3 and Sb4 of FIG. 17 of the third embodiment may be applied to the sixth embodiment to perform a transmission design process and an accommodation design process again such that resources for redundant lines can be secured when there are no resources for redundant lines in the resource table 161. In the sixth embodiment, a configuration in which the "period" field is provided in the resource table 161 shown supplementarily may be added to the third embodiment to record the setting start date and time and the setting end date and time of each optical path in the resource table 161, such that when a redundant line is needed, a resource for the redundant line is secured by limiting the period of the resource for the redundant line.

Seventh Embodiment

Figure 27:
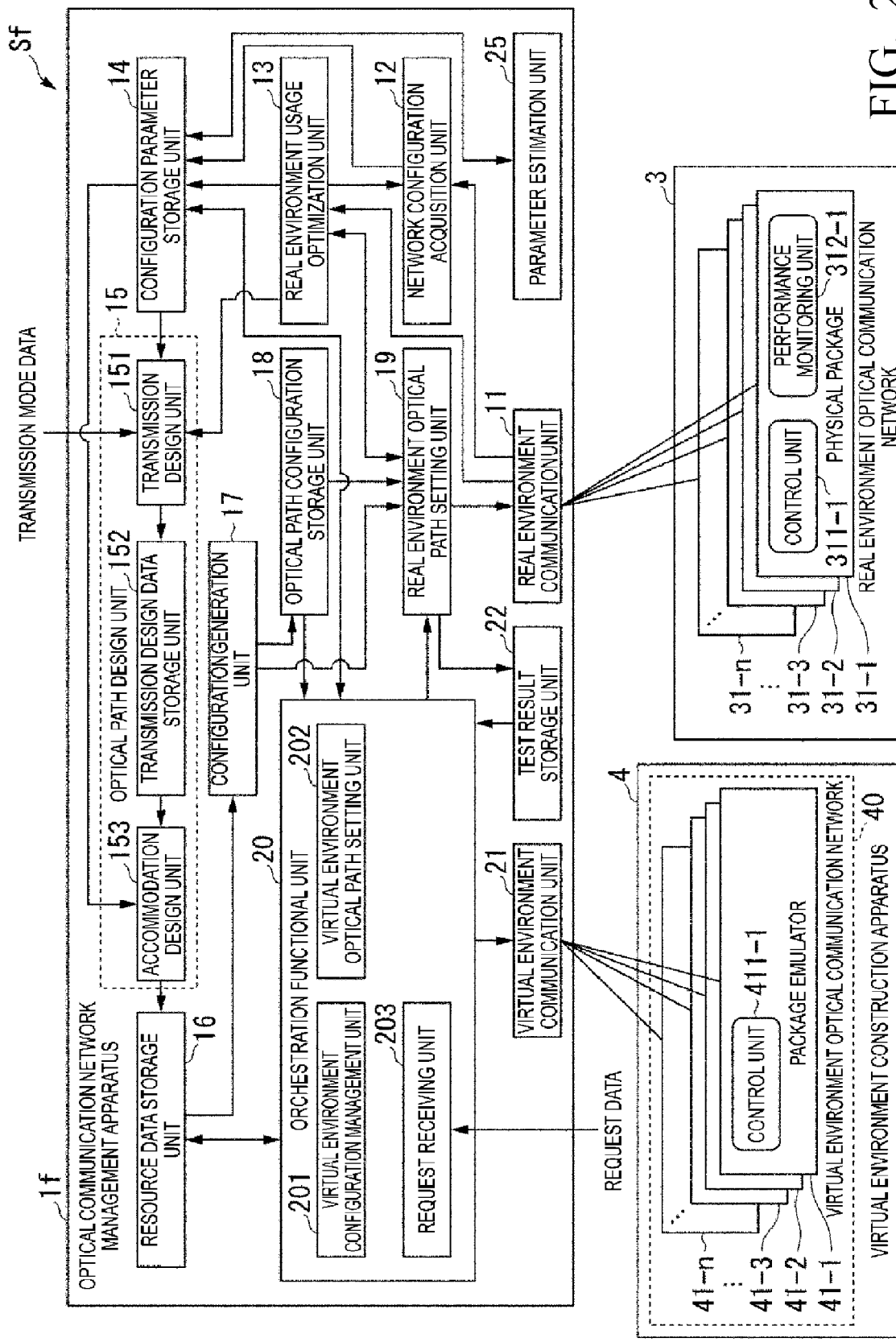
FIG. 27 is a block diagram illustrating a configuration of an optical communication network management system according to a seventh embodiment.

FIG. 27 is a block diagram illustrating a configuration of an optical communication network management system Sf according to a seventh embodiment.

In the seventh embodiment, the same components as those of the first embodiment are designated by the same reference signs and different components from those of the first embodiment are described below. The optical communication network management system Sf includes an optical communication network management apparatus 1f, a real environment optical communication network 3, and a virtual environment construction apparatus 4.

The optical communication network management apparatus 1f includes a real environment communication unit 11, a network configuration acquisition unit 12, a real environment usage optimization unit 13, a configuration parameter storage unit 14, an optical path design unit 15, a resource data storage unit 16, a configuration generation unit 17, an optical path configuration storage unit 18, a real environment optical path setting unit 19, an orchestration functional unit 20, a virtual environment communication unit 21, a test result storage unit 22, and a parameter estimator 25.

When a new configuration parameter is written to a configuration parameter table 141 stored in the configuration parameter storage unit 14, the parameter estimation unit 25 performs the following processing. That is, when a configuration parameter in the configuration parameter table 141 is deficient, the parameter estimation unit 25 estimates an approximate value of the deficient configuration parameter and rewrites the deficient configuration parameter with the approximate value. Here, a configuration parameter is said to be deficient, for example, when a configuration parameter required for the virtual environment configuration management unit 201 to generate a package emulator 41-1 to 41-n in the virtual environment construction apparatus 4 is insufficient or when its value deviates from a predetermined allowable range of physical values of a realistic configuration parameter.

The parameter estimation unit 25 estimates approximate values of configuration parameters by performing simulation or machine learning using physical values of realistic configuration parameters that are known in advance, physical values of configuration parameters of physical packages 31-1 to 31-n other than physical packages 31-1 to 31-n which are deficient in configuration parameters, or the like.

The parameter estimation unit 25 may receive communication quality data indicating a communication quality that the real environment usage optimization unit 13 has received from a performance monitoring unit 312-1 to 312-n from the real environment usage optimization unit 13 and compare the communication quality data with a configuration parameter stored in the configuration parameter table 141 corresponding to the communication quality data, and even when there is a discrepancy between the communication quality data and the configuration parameter, estimate an approximate value of the configuration parameter and write the estimated approximate value to the configuration parameter table 141.

In the optical communication network management apparatus 1f of the seventh embodiment, when there is a configuration parameter insufficient to generate the virtual environment optical communication network 40 or a configuration parameter does not fall within a predetermined allowable range among configuration parameters stored in the configuration parameter storage unit 14, the parameter estimation unit 25 estimates an appropriate configuration parameter for the configuration parameter and rewrites the configuration parameter stored in the configuration parameter storage unit 14 with the estimated configuration parameter. As a result, it is possible to compensate for the insufficiency of configuration parameters and increase the accuracy of configuration parameters, such that the states of the virtual environment optical communication network 40 can be further brought closer to the states of the real environment optical communication network 3.

In the first to seventh embodiments described above, the virtual environment construction apparatus 4 is illustrated as a separate apparatus from the optical communication network management apparatus 1 to 1f, but may also be incorporated and integrated into the optical communication network management apparatus 1 to 1*f*.

In the configurations of the first to seventh embodiments described above, the accommodation design unit 153 or 153*e* performs an accommodation design process on logical optical paths set in the optical fiber transmission lines 71 to 75, but optical paths are associated with wavelengths, for example, when the node devices 61 to 64 are wavelength division multiplexing (WDM) devices. In this case, the accommodation design unit 153 or 153*e* may be configured to perform an accommodation design process taking into consideration wavelength multiplexing.

In the configuration of the first to seventh embodiments described above, the transmission mode data given to the transmission design unit 151 or 151*b* includes the start site, the end site, and the communication capacity, but may also include required optical power, an amplification level, a modulation method, or the like.

In the first to seventh embodiments described above, the number of relay node devices 61 to 64 is used as a value to be recorded in the "cost" field of the resource table 161 shown in FIG. 6, but another indicator such as, for example, the distance of an actual path may also be used as a value of the cost.

The configuration of the real environment optical communication network 3 illustrated in FIG. 2 above is an example and the number of node devices 61 to 64 may be any number as long as it is at least two or greater. Further, in FIG. 2, one node device 61 to 64 is installed at each of the sites 51 to 54, but a plurality of node devices 61 to 64 may also be installed at one site 51 to 54.

In the first to seventh embodiments described above, the performance monitoring units 312-1 to 312-*n* are configured to measure loss and OSNR, but may also be configured to measure optical power, a bit error rate (BER), or the like.

In the first to seventh embodiments described above, it is assumed that the control units 411-1 to 411-*n* of the package emulators 41-1 to 41-*n* are constructed through the same manager applications as those constructing the control units 311-1 to 311-*n* of the physical packages 31-1 to 31-*n*, but both do not have to be exactly the same manager applications.

Although the third to seventh embodiments are configured based on the configuration of the first embodiment, the configurations of the third to seventh embodiments may be freely combined and applied into the configuration of the first embodiment such that, for example, the third and fourth embodiments may be combined and applied into the configuration of the first embodiment. The configurations of the third to seventh embodiments may also be freely combined and applied to the second embodiment.

In the optical communication network management apparatus 1 to 1*f* in the first to seventh embodiments described above, the network configuration acquisition unit 12 is configured to acquire configuration parameters of the physical packages 31-1 to 31-*n* from a real environment, but configuration parameters of the physical packages 31-1 to 31-*n* may be acquired by other means. For example, the optical communication network management apparatus 1 to 1*f* in the first to seventh embodiments described above may be configured to store configuration parameters of the physical packages 31-1 to 31-*n* in the configuration parameter storage unit 14 by a program or manually from an external apparatus. In this configuration, the optical communication network management apparatus 1 to 1*f* does not have to include the network configuration acquisition unit 12.

The optical path design unit 15, 15*b*, or 15*e* of the optical communication network management apparatus 1 to 1*f* in the first to seventh embodiments described above may be provided in an external apparatus. In this configuration, the external apparatus including the optical path design unit 15, 15*b*, or 15*e* acquires at least configuration parameters from the optical communication network management apparatus 1 to 1*f*, extracts optical paths, and detects resources required to accommodate the extracted paths. The external apparatus including the optical path design unit 15, 15*b*, or 15*e* records a resource table 161 generated based on the detected resources in the resource data storage unit 16 of the optical communication network management apparatus 1 to 1*f*. The optical communication network management apparatus 1 to 1*f* according to the first to seventh embodiments may also be configured to implement desired functions in cooperation with an external apparatus. In this configuration, the optical communication network management apparatus 1 to 1*f* does not have to include the optical path design unit 15, 15*b*, or 15*e*.

In the first and sixth embodiments described above, processing based on a threshold such as, for example, processing as to whether a value is equal to or less than a threshold or whether a value exceeds a threshold, is performed. However, the present invention is not limited to these embodiments and the determination processing based on a threshold such as that as to "whether a value exceeds a threshold," "whether a value is less than a threshold," "whether a value is equal to or greater than a threshold," and "whether a value is equal to or less than a threshold" is only an example and may be replaced with determination processing as to "whether a value is equal to or greater than a threshold," "whether a value is equal to or less than a threshold," "whether a value exceeds a threshold," and "whether is less than a value a threshold," respectively, depending on how the threshold is defined.

The optical communication network management apparatus 1 to 1*f* and the virtual environment construction apparatus 4 according to the above embodiments may be implemented by a computer. In this case, a program for implementing the functions of the optical communication network management apparatus 1 to 1*f* and the virtual environment construction apparatus 4 may be recorded on a computer readable recording medium and the functions may then be implemented by causing a computer system to read and execute the program recorded on the recording medium. The "computer system" referred to here includes an OS or hardware such as peripheral devices. The "computer readable recording medium" refers to a portable medium such as a flexible disk, a magneto-optical disc, a ROM, or a CD-ROM, a storage device such as a hard disk provided in the computer system, or the like. The "computer readable recording medium" may include something that dynamically holds a program for a short time, like a communication wire in the case in which the program is transmitted via a communication line such as a telephone line or a network such as the Internet, or may include something that holds a program for a certain period of time, like an internal volatile memory of a computer system that serves as a server or a client in that case. The program may be one for realizing some of the above-described functions or one which can realize the above-described functions in combination with a program already recorded in the computer system or may be one implemented using a programmable logic device such as a field programmable gate array (FPGA).

Although embodiments of the present invention have been described in detail with reference to the drawings, specific configurations thereof are not limited to those of the embodiments and also include designs or the like without departing from the spirit of the present invention.

INDUSTRIAL APPLICABILITY

Because both an optical communication network in a real environment and an optical communication network in a virtual environment can be managed, it is possible to improve the communication quality of the optical communication network in the real environment.

REFERENCE SIGNS LIST

1 Optical communication network management apparatus
3 Real environment optical communication network
4 Virtual environment construction apparatus
11 Real environment communication unit
12 Network configuration acquisition unit
13 Real environment usage optimization unit
14 Configuration parameter storage unit
15 Optical path design unit
16 Resource data storage unit
17 Configuration generation unit
18 Optical path configuration storage unit
19 Real environment optical path setting unit
20 Orchestration functional unit
21 Virtual environment communication unit
22 Test result storage unit
31-1 to 31-$n$ Physical package
41-1 to 41-1 Package emulator
151 Transmission design unit
152 Transmission design data storage unit
153 Accommodation design unit
201 Virtual environment configuration management unit
202 Virtual environment optical path setting unit
203 Request receiving unit
311-1 to 311-$n$ Control unit
312-1 to 312-$n$ Performance monitoring unit
411-1 to 411-$n$ Control unit

The invention claimed is:

1. An optical communication network management apparatus comprising:
 a virtual environment configuration manager configured to generate a virtual environment optical communication network by setting configuration parameters of physical packages of a real environment optical communication network in package emulators that a computer program has virtually constructed to implement the physical packages, the real environment optical communication network being constructed by a plurality of node devices in which the physical packages are mounted;
 a configuration generator configured to generate pieces of configuration data based on pieces of resource data indicating resources required for optical paths detected based on the configuration parameters and a requested transmission mode;
 a virtual environment optical path setter configured to set the optical paths in the virtual environment optical communication network based on the pieces of configuration data generated by the configuration generator; and
 a real environment optical path setter configured to set the optical paths in the real environment optical communication network based on the pieces of configuration data that have been used to set the optical paths.

2. The optical communication network management apparatus according to claim 1, further comprising a network configuration acquisitor configured to acquire the configuration parameters from the physical packages,
 wherein the virtual environment configuration manager is configured to set the configuration parameters acquired by the network configuration acquisitor in the package emulators to generate the virtual environment optical communication network.

3. The optical communication network management apparatus according to claim 1, further comprising an optical path designer configured to detect optical paths based on the configuration parameters and the requested transmission mode and generate the pieces of resource data for the detected optical paths,
 wherein the configuration generator is configured to generate the pieces of configuration data based on the pieces of resource data generated by the optical path designer.

4. The optical communication network management apparatus according to claim 1, wherein the real environment optical path setter is configured to optimize the configuration parameters by temporarily setting the optical paths in the real environment optical communication network and changing the configuration parameters based on communication quality data indicating a communication quality of which the real environment optical communication network has notified the real environment optical path setter.

5. The optical communication network management apparatus according to claim 1, wherein each of the pieces of configuration data includes configuration commands, setting order data indicating a setting order of the configuration commands, and test checking procedure data indicating a test checking procedure,
 the virtual environment optical path setter is configured to apply the configuration commands in an order indicated by the setting order data included in the piece of configuration data to set the optical path in the virtual environment optical communication network and perform an operation checking test process on the optical path that has been successfully set based on the test checking procedure data, and
 the real environment optical path setter is configured to, when a test result of the operation checking test process satisfies a predetermined condition, set the optical path in the real environment optical communication network using the piece of configuration data that the virtual environment optical path setter has applied to the virtual environment optical communication network.

6. The optical communication network management apparatus according to claim 1, further comprising a virtual environment usage optimizer configured to perform an optimization process that includes causing a freely defined fault in the virtual environment optical communication network and changing the configuration parameters such that the fault is avoidable or changing the optical path such that the fault is avoidable based on a cause of the caused fault and a result of the fault.

7. The optical communication network management apparatus according to claim 6, wherein the virtual environment configuration manager is configured to generate a plurality of the virtual environment optical communication networks, and
 the virtual environment usage optimizer is configured to cause different faults in the plurality of the virtual environment optical communication networks to perform the optimization process.

8. The optical communication network management apparatus according to claim 1, wherein the real environment optical path setter is configured to, upon setting the optical path in the real environment optical communication network based on the piece of configuration data, perform an operation checking test process on the set optical path according to a test checking procedure included in the piece of configuration data, the optical communication network management apparatus further comprises a network tester configured to select a piece of path identification information corresponding to an idle resource at regular time intervals or select a piece of path identification information corresponding to an idle resource which has not been subjected to the operation checking test process for a certain period of time, and the real environment optical path setter is configured to temporarily set the optical path in the real environment optical communication network based on the piece of configuration data corresponding to the piece of path identification information selected by the network tester and perform the operation checking test process on the set optical path according to the test checking procedure included in the piece of configuration data.

9. The optical communication network management apparatus according to claim 1, further comprising a resource data storage unit configured to, for each piece of path identification information, associate an optical path that is a main line and an optical path that is a redundant line for the optical path that is the main line; and a fault receiver configured to, upon being notified of fault data indicating a fault from the real environment optical communication network, select the piece of path identification information corresponding to an optical path that is a main line affected by the fault and the piece of path identification information of a redundant line corresponding to the optical path that is the main line, with reference to the resource data storage, wherein the virtual environment optical path setter is configured to perform optical path switching from the main line to the redundant line in the virtual environment optical communication network based on the pieces of configuration data corresponding to the piece of path identification information of the main line and the piece of path identification information of the redundant line selected by the fault receiver, and the real environment optical path setter is configured to perform optical path switching from the main line to the redundant line in the real environment optical communication network based on the pieces of configuration data that the virtual environment optical path setter has used to perform the optical path switching from the main line to the redundant line in the virtual environment optical communication network.

10. The optical communication network management apparatus according to claim 1, further comprising a parameter estimator configured to, when the configuration parameter is insufficient to generate the virtual environment optical communication network or the configuration parameter does not fall within a predetermined allowable range, estimate an appropriate configuration parameter for the configuration parameter and rewrite the configuration parameter with the estimated configuration parameter.

* * * * *